United States Patent
Sun et al.

(10) Patent No.: US 11,463,885 B2
(45) Date of Patent: Oct. 4, 2022

(54) SOUNDING REFERENCE SIGNAL ENHANCEMENTS FOR UNLICENSED SPECTRUM

(71) Applicant: QUALCOMM Incorporated, San Diego, CA (US)

(72) Inventors: Jing Sun, San Diego, CA (US); Tanumay Datta, Bangalore (IN); Kapil Bhattad, Bangalore (IN); Ananta Narayanan Thyagarajan, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/914,794

(22) Filed: Jun. 29, 2020

(65) Prior Publication Data

US 2021/0022006 A1 Jan. 21, 2021

(51) Int. Cl.
*H04W 16/14* (2009.01)
*H04W 72/04* (2009.01)
(Continued)

(52) U.S. Cl.
CPC ........... *H04W 16/14* (2013.01); *H04L 1/0068* (2013.01); *H04L 5/005* (2013.01);
(Continued)

(58) Field of Classification Search
CPC ........... H04W 74/0808; H04W 72/042; H04W 72/0413; H04W 8/24; H04W 16/14
See application file for complete search history.

(56) References Cited

U.S. PATENT DOCUMENTS

2011/0090983 A1* 4/2011 Zhang ................ H04L 27/2607
375/295
2018/0302915 A1* 10/2018 Einhaus ............ H04W 72/1215
(Continued)

FOREIGN PATENT DOCUMENTS

JP 2018532330 A 11/2018

OTHER PUBLICATIONS

International Search Report and Written Opinion—PCT/US2020/040348—ISA/EPO—dated Sep. 30, 2020.

*Primary Examiner* — Jackie Zuniga Abad
(74) *Attorney, Agent, or Firm* — QUALCOMM Incorporated

(57) ABSTRACT

A user equipment (UE) may employ an extended cyclic prefix, a postfix, or both for sounding reference signal (SRS) transmissions, such that gaps between SRS transmissions are long enough for UE antenna switching operations, but shorter in duration than any maximum channel vacancy time durations set by a wireless communications system. Further, UEs may transmit SRSs to base stations in accordance with an SRS configuration. For example, a base station may provide SRS configuration information to a UE that indicates, for example, information related to SRS scheduling, subband information, a cyclic prefix length, a cyclic postfix length, listen-before-talk (LBT) type information, an SRS trigger, an SRS cancellation procedure, or any combinations thereof. Based on such SRS configuration information, a UE may perform partial subband SRS techniques, subband selection techniques, SRS bandwidth adaptation techniques, LBT type configuration techniques, etc.

26 Claims, 24 Drawing Sheets

(51) Int. Cl.
  *H04L 5/00*    (2006.01)
  *H04L 25/02*   (2006.01)
  *H04L 1/00*    (2006.01)
  *H04L 27/26*   (2006.01)
  *H04W 8/24*    (2009.01)
  *H04W 74/08*   (2009.01)

(52) U.S. Cl.
  CPC ...... *H04L 25/0226* (2013.01); *H04L 27/2607* (2013.01); *H04W 8/24* (2013.01); *H04W 72/042* (2013.01); *H04W 72/0413* (2013.01); *H04W 74/0808* (2013.01)

(56) References Cited

U.S. PATENT DOCUMENTS

| | | |
|---|---|---|
| 2019/0141639 A1 | 5/2019 | Rahman et al. |
| 2020/0275430 A1* | 8/2020 | Salem .................. H04L 5/0055 |
| 2022/0078841 A1* | 3/2022 | Tiirola .............. H04W 74/0808 |

* cited by examiner

SRS Configuration 215

SRS 220

SOUNDING REFERENCE SIGNAL ENHANCEMENTS FOR UNLICENSED SPECTRUM

CROSS REFERENCE

The present Application for Patent claims the benefit of Indian Provisional Patent Application No. 201941028561 by SUN et al., entitled "HANDLING GAPS IN UPLINK TRANSMISSION IN NEW RADIO UNLICENSED," filed Jul. 16, 2019, assigned to the assignee hereof, and expressly incorporated by reference herein.

BACKGROUND

The following relates generally to wireless communications, and more specifically to sounding reference signal (SRS) enhancements for unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The present disclosure relates to methods, systems, devices, and apparatuses that support sounding reference signal (SRS) enhancements for unlicensed spectrum. In various aspects, the described techniques provide for configuring and managing uplink reference signal transmissions (e.g., SRS transmissions) in shared (e.g., unlicensed) radio frequency spectrum.

Wireless communications systems may support user equipment (UE) transmission of SRS transmissions using transmit antenna switching techniques. For example, a UE may transmit a first SRS transmission in a first symbol using a first antenna configuration (e.g., a first transmit antenna), perform antenna switching operations in a second symbol, and then transmit a second SRS transmission in a third symbol using a second antenna configuration (e.g., a second transmit antenna). To not exceed a maximum channel vacancy time duration (e.g., 16 us) between SRS transmissions (e.g., between transmission of the first and second SRS transmissions), a UE may employ SRS transmissions with an extended cyclic prefix (CP), a postfix, or both. That is, a UE may transmit SRS transmissions with extended CPs and/or postfixes, such that the SRS transmissions may extend into symbols between SRS transmissions (e.g., into symbols used for antenna switching operations). As such, a UE may determine the length of such extended CPs and/or extended postfixes such that gaps between SRS transmissions are long enough for antenna switching operations (e.g., based on antenna switching capabilities of the UE), but shorter in duration than any maximum channel vacancy time durations observed by the wireless communications system.

Wireless communications systems may further support base station indication of subband information (e.g., subband configuration information for UE transmission of SRS transmissions) via signaling of SRS configuration information (e.g., such as group common physical downlink control channel (GC-PDCCH), a downlink control information (DCI) triggering SRS, or both). In some cases, wireless communications systems may support SRS transmissions in a subset of configured subbands (e.g., when one or more configured subbands are not available due to UE listen-before-talk (LBT) procedures). Further, wireless communications systems may support partial SRS transmission (e.g., either by puncturing an SRS transmission or creating a shorter SRS sequence based on configured subbands that are unavailable). In some aspects, UE procedures for SRS bandwidth adaptation may depend on the timeline of when SRS configuration information (e.g., such as GC-PDCCH, DCI, or both) is received. Further, the described techniques provide for UE identification or determination of a type of LBT procedure that should be used for SRS transmissions (e.g., a type of LBT procedure may be identified based on SRS configuration information, such as GC-PDCCH and/or DCI, previous LBT type configuration for prior uplink transmissions, etc.).

A method of wireless communication at a UE is described. The method may include identifying scheduling of a first uplink reference signal transmission and a second uplink reference signal transmission for a shared radio frequency channel, identifying a transmission gap between the first uplink reference signal transmission and the second uplink reference signal transmission, modifying at least one of the first uplink reference signal transmission or the second uplink reference signal transmission based on the identified transmission gap and a maximum channel vacancy time duration, and transmitting the first uplink reference signal transmission and the second uplink reference signal transmission.

An apparatus for wireless communication at a UE is described. The apparatus may include a processor, memory coupled with the processor, and instructions stored in the memory. The instructions may be executable by the processor to cause the apparatus to identify scheduling of a first uplink reference signal transmission and a second uplink reference signal transmission for a shared radio frequency channel, identify a transmission gap between the first uplink reference signal transmission and the second uplink reference signal transmission, modify at least one of the first uplink reference signal transmission or the second uplink reference signal transmission based on the identified transmission gap and a maximum channel vacancy time duration, and transmit the first uplink reference signal transmission and the second uplink reference signal transmission.

Another apparatus for wireless communication at a UE is described. The apparatus may include means for identifying scheduling of a first uplink reference signal transmission and a second uplink reference signal transmission for a shared radio frequency channel, identifying a transmission gap between the first uplink reference signal transmission and the second uplink reference signal transmission, modifying at least one of the first uplink reference signal transmission or the second uplink reference signal transmission based on the identified transmission gap and a maximum channel vacancy time duration, and transmitting the first uplink reference signal transmission and the second uplink reference signal transmission.

A non-transitory computer-readable medium storing code for wireless communication at a UE is described. The code may include instructions executable by a processor to identify scheduling of a first uplink reference signal transmission and a second uplink reference signal transmission for a shared radio frequency channel, identify a transmission gap between the first uplink reference signal transmission and the second uplink reference signal transmission, modify at least one of the first uplink reference signal transmission or the second uplink reference signal transmission based on the identified transmission gap and a maximum channel vacancy time duration, and transmit the first uplink reference signal transmission and the second uplink reference signal transmission.

In some aspects of the method, apparatuses, and non-transitory computer-readable medium described herein, modifying the at least one of the first uplink reference signal transmission or the second uplink reference signal transmission may include operations, features, means, or instructions for extending a cyclic prefix of the second uplink reference signal transmission into the identified transmission gap, where a time duration between the first uplink reference signal transmission and the extended cyclic prefix of the second uplink reference signal transmission may be less than the maximum channel vacancy time duration. In some aspects of the method, apparatuses, and non-transitory computer-readable medium described herein, modifying the at least one of the first uplink reference signal transmission or the second uplink reference signal transmission may include operations, features, means, or instructions for adding a postfix to the first uplink reference signal transmission during the identified transmission gap, where a time duration between the postfix of the first uplink reference signal transmission and the second uplink reference signal transmission may be less than the maximum channel vacancy time duration.

Some aspects of the method, apparatuses, and non-transitory computer-readable medium described herein may further include operations, features, means, or instructions for identifying an antenna switching time, where modifying the at least one of the first uplink reference signal transmission or the second uplink reference signal transmission may be based on the identified antenna switching time. In some examples of the method, apparatuses, and non-transitory computer-readable medium described herein, the first uplink reference signal transmission and the second uplink reference signal transmission may be scheduled in a time period reserved by a base station for the shared radio frequency channel.

In some examples of the method, apparatuses, and non-transitory computer-readable medium described herein, transmitting the modified first uplink reference signal transmission and the modified second uplink reference signal transmission may include operations, features, means, or instructions for transmitting the modified first uplink reference signal transmission via a first antenna, switching a transmission path from the first antenna to a second antenna after transmitting the modified first uplink reference signal transmission, and transmitting the modified second uplink reference signal transmission via the second antenna. Some examples of the method, apparatuses, and non-transitory computer-readable medium described herein may further include operations, features, means, or instructions for identifying scheduling of a third uplink reference signal transmission and a fourth uplink reference signal transmission, where the first, second, third, and fourth uplink reference signal transmissions may be scheduled to be within a single slot.

A method of wireless communication at a UE is described. The method may include identifying scheduling of a first uplink reference signal transmission and a second uplink reference signal transmission for a shared radio frequency channel, identifying a transmission gap between the first uplink reference signal transmission and the second uplink reference signal transmission based on a configured subcarrier spacing, transmitting the first uplink reference signal transmission, performing a LBT procedure during the transmission gap after transmitting the first uplink reference signal transmission, and transmitting the second uplink reference signal transmission based on the performed LBT procedure.

An apparatus for wireless communication at a UE is described. The apparatus may include a processor, memory coupled with the processor, and instructions stored in the memory. The instructions may be executable by the processor to cause the apparatus to identify scheduling of a first uplink reference signal transmission and a second uplink reference signal transmission for a shared radio frequency channel, identify a transmission gap between the first uplink reference signal transmission and the second uplink reference signal transmission based on a configured subcarrier spacing, transmit the first uplink reference signal transmission, perform a LBT procedure during the transmission gap after transmitting the first uplink reference signal transmission, and transmit the second uplink reference signal transmission based on the performed LBT procedure.

Another apparatus for wireless communication at a UE is described. The apparatus may include means for identifying scheduling of a first uplink reference signal transmission and a second uplink reference signal transmission for a shared radio frequency channel, identifying a transmission gap between the first uplink reference signal transmission and the second uplink reference signal transmission based on a configured subcarrier spacing, transmitting the first uplink reference signal transmission, performing a LBT procedure during the transmission gap after transmitting the first uplink reference signal transmission, and transmitting the second uplink reference signal transmission based on the performed LBT procedure.

A non-transitory computer-readable medium storing code for wireless communication at a UE is described. The code may include instructions executable by a processor to identify scheduling of a first uplink reference signal transmission and a second uplink reference signal transmission for a shared radio frequency channel, identify a transmission gap between the first uplink reference signal transmission and the second uplink reference signal transmission based on a configured subcarrier spacing, transmit the first uplink reference signal transmission, perform a LBT procedure during the transmission gap after transmitting the first uplink reference signal transmission, and transmit the second uplink reference signal transmission based on the performed LBT procedure.

In some examples of the method, apparatuses, and non-transitory computer-readable medium described herein, the transmission gap includes a number of symbols between the first uplink reference signal transmission and the second uplink reference signal transmission, the number of symbols based on the configured subcarrier spacing.

A method of wireless communication at a UE is described. The method may include identifying one or more subbands configured for a first uplink reference signal transmission in a shared radio frequency channel, identifying one or more available subbands for transmission of the first uplink reference signal transmission, determining a difference between the configured one or more subbands and the one or more available subbands, modifying the first uplink reference signal transmission based on the difference, and transmitting the modified first uplink reference signal transmission based on the one or more available subbands.

An apparatus for wireless communication at a UE is described. The apparatus may include a processor, memory coupled with the processor, and instructions stored in the memory. The instructions may be executable by the processor to cause the apparatus to identify one or more subbands configured for a first uplink reference signal transmission in a shared radio frequency channel, identify one or more available subbands for transmission of the first uplink reference signal transmission, determine a difference between the configured one or more subbands and the one or more available subbands, modify the first uplink reference signal transmission based on the difference, and transmit the modified first uplink reference signal transmission based on the one or more available subbands.

Another apparatus for wireless communication at a UE is described. The apparatus may include means for identifying one or more subbands configured for a first uplink reference signal transmission in a shared radio frequency channel, identifying one or more available subbands for transmission of the first uplink reference signal transmission, determining a difference between the configured one or more subbands and the one or more available subbands, modifying the first uplink reference signal transmission based on the difference, and transmitting the modified first uplink reference signal transmission based on the one or more available subbands.

A non-transitory computer-readable medium storing code for wireless communication at a UE is described. The code may include instructions executable by a processor to identify one or more subbands configured for a first uplink reference signal transmission in a shared radio frequency channel, identify one or more available subbands for transmission of the first uplink reference signal transmission, determine a difference between the configured one or more subbands and the one or more available subbands, modify the first uplink reference signal transmission based on the difference, and transmit the modified first uplink reference signal transmission based on the one or more available subbands.

In some examples of the method, apparatuses, and non-transitory computer-readable medium described herein, identifying the one or more available subbands may include operations, features, means, or instructions for receiving a group common physical downlink control channel message, where the group common physical downlink control channel message indicates the one or more available subbands.

In some examples of the method, apparatuses, and non-transitory computer-readable medium described herein, modifying the first uplink reference signal transmission may include operations, features, means, or instructions for receiving a SRS request scheduling the first uplink reference signal transmission, identifying a first timing between the group common physical downlink control channel message and the SRS request, and identifying a second timing between the group common physical downlink control channel message and the first uplink reference signal transmission, where the first uplink reference signal transmission may be modified based on at least one of the first timing and the second timing.

Some examples of the method, apparatuses, and non-transitory computer-readable medium described herein may further include operations, features, means, or instructions for modifying a type of a first LBT procedure based on at least one of the first timing and the second timing. In some examples of the method, apparatuses, and non-transitory computer-readable medium described herein, identifying the one or more available subbands may include operations, features, means, or instructions for receiving DCI scheduling the first uplink reference signal transmission, where the DCI includes an indication of the one or more available subbands for transmission of the first uplink reference signal transmission. In some examples of the method, apparatuses, and non-transitory computer-readable medium described herein, modifying the first uplink reference signal transmission based on the difference may include operations, features, means, or instructions for dropping the first uplink reference signal transmission for at least one subband based on the difference.

In some examples of the method, apparatuses, and non-transitory computer-readable medium described herein, modifying the first uplink reference signal transmission based on the difference may include operations, features, means, or instructions for transmitting the first uplink reference signal transmission over a set of subbands including an intersection of the one or more configured subbands and the one or more available subbands. In some examples of the method, apparatuses, and non-transitory computer-readable medium described herein, identifying the one or more available subbands may include operations, features, means, or instructions for performing an LBT procedure on the scheduled one or more subbands, and identifying the one or more available subbands as subbands which the LBT procedure determines may be clear for transmission of the first uplink reference signal transmission.

In some examples of the method, apparatuses, and non-transitory computer-readable medium described herein, the one or more available subbands for transmission of the first uplink reference signal transmission may be identified based on a UE capability associated with transmissions spanning a plurality of subbands. In some examples of the method, apparatuses, and non-transitory computer-readable medium described herein, modifying the first uplink reference signal transmission may include operations, features, means, or instructions for identifying a set of tones associated with the difference, and puncturing the first uplink reference signal transmission based on the set of tones, where the first uplink reference signal transmission may be modified based on the puncturing. In some examples of the method, apparatuses, and non-transitory computer-readable medium described herein, modifying the first uplink reference signal transmission may include operations, features, means, or instructions for modifying a sequence length associated with the first uplink reference signal transmission based on the difference.

A method of wireless communication at a UE is described. The method may include receiving DCI scheduling at least a first uplink reference signal transmission for a shared radio frequency channel, identifying a first type of a first LBT procedure for transmission of the first uplink reference signal transmission based on the received SRS request, performing the first LBT procedure based on the identified first type, and transmitting the first uplink reference signal transmission based on the performed first LBT procedure.

An apparatus for wireless communication at a UE is described. The apparatus may include a processor, memory coupled with the processor, and instructions stored in the memory. The instructions may be executable by the processor to cause the apparatus to receive DCI scheduling at least a first uplink reference signal transmission for a shared radio frequency channel, identify a first type of a first LBT procedure for transmission of the first uplink reference signal transmission based on the received SRS request, perform the first LBT procedure based on the identified first type, and transmit the first uplink reference signal transmission based on the performed first LBT procedure.

Another apparatus for wireless communication at a UE is described. The apparatus may include means for receiving DCI scheduling at least a first uplink reference signal transmission for a shared radio frequency channel, identifying a first type of a first LBT procedure for transmission of the first uplink reference signal transmission based on the received SRS request, performing the first LBT procedure based on the identified first type, and transmitting the first uplink reference signal transmission based on the performed first LBT procedure.

A non-transitory computer-readable medium storing code for wireless communication at a UE is described. The code may include instructions executable by a processor to receive DCI scheduling at least a first uplink reference signal transmission for a shared radio frequency channel, identify a first type of a first LBT procedure for transmission of the first uplink reference signal transmission based on the received SRS request, perform the first LBT procedure based on the identified first type, and transmit the first uplink reference signal transmission based on the performed first LBT procedure.

Some examples of the method, apparatuses, and non-transitory computer-readable medium described herein may further include operations, features, means, or instructions for receiving a group common physical downlink control channel transmission, where the first type may be identified based on the group common physical downlink control channel transmission. In some examples of the method, apparatuses, and non-transitory computer-readable medium described herein, the first type may be identified based on the DCI. In some examples of the method, apparatuses, and non-transitory computer-readable medium described herein, the DCI includes an indication triggering the first uplink reference signal transmission.

Some examples of the method, apparatuses, and non-transitory computer-readable medium described herein may further include operations, features, means, or instructions for identifying an absence of an indication canceling the first uplink reference signal transmission in the DCI, where the first uplink reference signal transmission may be transmitted based on the absence of the indication in the DCI. In some examples of the method, apparatuses, and non-transitory computer-readable medium described herein, the DCI includes an indication canceling a second uplink reference signal transmission. In some examples of the method, apparatuses, and non-transitory computer-readable medium described herein, the DCI includes a UE-specific indication of the first type, a UE group-specific indication of the first type, an SRS-specific indication of the first type, or a combination thereof.

Some examples of the method, apparatuses, and non-transitory computer-readable medium described herein may further include operations, features, means, or instructions for identifying a gap between a downlink transmission and the first uplink reference signal transmission based on the received DCI, where the first type may be identified based on a duration of the gap. Some examples of the method, apparatuses, and non-transitory computer-readable medium described herein may further include operations, features, means, or instructions for identifying a grant for an uplink transmission, identifying a second type of a second LBT procedure for the uplink transmission based on the grant, and determining the first type based on the second type and a gap between the uplink transmission and the first uplink reference signal transmission.

In some examples of the method, apparatuses, and non-transitory computer-readable medium described herein, the DCI may be received during a first time period reserved by a base station for the shared radio frequency channel and the DCI includes an SRS resource set configuration for a second time period reserved by the base station for the shared radio frequency channel. In some examples of the method, apparatuses, and non-transitory computer-readable medium described herein, the first type may be identified based on the SRS resource set configuration and the first uplink reference signal transmission may be transmitted during the second time period reserved by the base station for the shared radio frequency channel.

A method of wireless communication at a base station is described. The method may include transmitting a SRS request to a UE, where the SRS request indicates scheduling of a first uplink reference signal transmission and a second uplink reference signal transmission for a shared radio frequency channel by the UE, identifying a transmission gap between the first uplink reference signal transmission and the second uplink reference signal transmission, determining a modification of at least one of the first uplink reference signal transmission or the second uplink reference signal transmission based on the identified transmission gap and a maximum channel vacancy time duration, and receiving the first uplink reference signal transmission and the second uplink reference signal transmission.

An apparatus for wireless communication at a base station is described. The apparatus may include a processor, memory coupled with the processor, and instructions stored in the memory. The instructions may be executable by the processor to cause the apparatus to transmit a SRS request to a UE, where the SRS request indicates scheduling of a first uplink reference signal transmission and a second uplink reference signal transmission for a shared radio frequency channel by the UE, identify a transmission gap between the first uplink reference signal transmission and the second uplink reference signal transmission, determine a modification of at least one of the first uplink reference signal transmission or the second uplink reference signal transmission based on the identified transmission gap and a maximum channel vacancy time duration, and receive the first uplink reference signal transmission and the second uplink reference signal transmission.

Another apparatus for wireless communication at a base station is described. The apparatus may include means for transmitting a SRS request to a UE, where the SRS request indicates scheduling of a first uplink reference signal transmission and a second uplink reference signal transmission for a shared radio frequency channel by the UE, identifying a transmission gap between the first uplink reference signal transmission and the second uplink reference signal transmission, determining a modification of at least one of the first uplink reference signal transmission or the second uplink reference signal transmission based on the identified transmission gap and a maximum channel vacancy time duration, and receiving the first uplink reference signal transmission and the second uplink reference signal transmission.

A non-transitory computer-readable medium storing code for wireless communication at a base station is described. The code may include instructions executable by a processor to transmit a SRS request to a UE, where the SRS request indicates scheduling of a first uplink reference signal transmission and a second uplink reference signal transmission for a shared radio frequency channel by the UE, identify a transmission gap between the first uplink reference signal transmission and the second uplink reference signal transmission, determine a modification of at least one of the first uplink reference signal transmission or the second uplink reference signal transmission based on the identified transmission gap and a maximum channel vacancy time duration, and receive the first uplink reference signal transmission and the second uplink reference signal transmission.

In some examples of the method, apparatuses, and non-transitory computer-readable medium described herein, receiving the first uplink reference signal transmission and the second uplink reference signal transmission may include operations, features, means, or instructions for receiving the second uplink reference signal transmission based on a cyclic prefix of the second uplink reference signal transmission extended into the identified transmission gap, where a time duration between the first uplink reference signal transmission and the extended cyclic prefix of the second uplink reference signal transmission may be less than the maximum channel vacancy time duration.

In some examples of the method, apparatuses, and non-transitory computer-readable medium described herein, receiving the first uplink reference signal transmission and the second uplink reference signal transmission may include operations, features, means, or instructions for receiving the first uplink reference signal transmission based on a postfix of the first uplink reference signal transmission extended into the identified transmission gap, where a time duration between the second uplink reference signal transmission and the postfix of the first uplink reference signal transmission may be less than the maximum channel vacancy time duration. In some examples of the method, apparatuses, and non-transitory computer-readable medium described herein, the first uplink reference signal transmission and the second uplink reference signal transmission may be scheduled in a time period reserved by the base station for the shared radio frequency channel.

Some examples of the method, apparatuses, and non-transitory computer-readable medium described herein may further include operations, features, means, or instructions for identifying scheduling of a third uplink reference signal transmission and a fourth uplink reference signal transmission for the shared radio frequency channel, where the SRS request indicates the scheduling of the first uplink reference signal transmission, the second uplink reference signal transmission, the third uplink reference signal transmission, and the fourth uplink reference signal transmission within a single slot. In some examples of the method, apparatuses, and non-transitory computer-readable medium described herein, the transmission gap may be identified based on a subcarrier spacing configuration of the UE. In some examples of the method, apparatuses, and non-transitory computer-readable medium described herein, the transmission gap includes a number of symbols between the first uplink reference signal transmission and the second uplink reference signal transmission, the number of symbols based on the subcarrier spacing configuration of the UE.

A method of wireless communication at a base station is described. The method may include identifying one or more subbands configured for a first uplink reference signal transmission by a UE in a shared radio frequency channel, identifying one or more available subbands for transmission of the first uplink reference signal transmission, transmitting an indication of the one or more available subbands, determining a difference between the configured one or more subbands and the one or more available subbands, and receiving the first uplink reference signal transmission based on the indication of the one or more available subbands.

An apparatus for wireless communication at a base station is described. The apparatus may include a processor, memory coupled with the processor, and instructions stored in the memory. The instructions may be executable by the processor to cause the apparatus to identify one or more subbands configured for a first uplink reference signal transmission by a UE in a shared radio frequency channel, identify one or more available subbands for transmission of the first uplink reference signal transmission, transmit an indication of the one or more available subbands, determine a difference between the configured one or more subbands and the one or more available subbands, and receive the first uplink reference signal transmission based on the indication of the one or more available subbands.

Another apparatus for wireless communication at a base station is described. The apparatus may include means for identifying one or more subbands configured for a first uplink reference signal transmission by a UE in a shared radio frequency channel, identifying one or more available subbands for transmission of the first uplink reference signal transmission, transmitting an indication of the one or more available subbands, determining a difference between the configured one or more subbands and the one or more available subbands, and receiving the first uplink reference signal transmission based on the indication of the one or more available subbands.

A non-transitory computer-readable medium storing code for wireless communication at a base station is described. The code may include instructions executable by a processor to identify one or more subbands configured for a first uplink reference signal transmission by a UE in a shared radio frequency channel, identify one or more available subbands for transmission of the first uplink reference signal transmission, transmit an indication of the one or more available subbands, determine a difference between the configured one or more subbands and the one or more available subbands, and receive the first uplink reference signal transmission based on the indication of the one or more available subbands.

In some examples of the method, apparatuses, and non-transitory computer-readable medium described herein, transmitting the indication of the one or more available subbands may include operations, features, means, or instructions for transmitting a group common physical downlink control channel message, where the group common physical downlink control channel message indicates the one or more available subbands. Some examples of the method, apparatuses, and non-transitory computer-readable medium described herein may further include operations, features, means, or instructions for identifying a first timing between the group common physical downlink control channel message and a SRS request based on the one or more available subbands, identifying a second timing between the group common physical downlink control channel message and the first uplink reference signal transmission based on the one or more available subbands, and transmitting the SRS request based on the first timing, where the indication includes at least one of the first timing and the second timing.

Some examples of the method, apparatuses, and non-transitory computer-readable medium described herein may further include operations, features, means, or instructions for transmitting DCI scheduling the first uplink reference signal transmission, where the DCI includes the indication of the one or more available subbands. In some examples of the method, apparatuses, and non-transitory computer-readable medium described herein, receiving the first uplink reference signal transmission based on the indication of the one or more available subbands may include operations, features, means, or instructions for receiving the first uplink reference signal transmission over a set of subbands including an intersection of the one or more configured subbands and the one or more available subbands.

In some examples of the method, apparatuses, and non-transitory computer-readable medium described herein, receiving the first uplink reference signal transmission based on the indication of the one or more available subbands may include operations, features, means, or instructions for identifying a set of punctured tones associated with the difference, and receiving the first uplink reference signal transmission based on the punctured set of tones. In some examples of the method, apparatuses, and non-transitory computer-readable medium described herein, receiving the first uplink reference signal transmission based on the indication of the one or more available subbands may include operations, features, means, or instructions for identifying a sequence length associated with the first uplink reference signal transmission based on the difference, and receiving the first uplink reference signal transmission based on the sequence length.

A method of wireless communication at a base station is described. The method may include identifying a first type of a first LBT procedure for a UE transmission of a first uplink reference signal transmission for a shared radio frequency channel, transmitting an SRS request in DCI scheduling at least the first uplink reference signal transmission, where the SRS request is transmitted based on the first type, and receiving the first uplink reference signal transmission based on the transmitted SRS request.

An apparatus for wireless communication at a base station is described. The apparatus may include a processor, memory coupled with the processor, and instructions stored in the memory. The instructions may be executable by the processor to cause the apparatus to identify a first type of a first LBT procedure for a UE transmission of a first uplink reference signal transmission for a shared radio frequency channel, transmit an SRS request in DCI scheduling at least the first uplink reference signal transmission, where the SRS request is transmitted based on the first type, and receive the first uplink reference signal transmission based on the transmitted SRS request.

Another apparatus for wireless communication at a base station is described. The apparatus may include means for identifying a first type of a first LBT procedure for a UE transmission of a first uplink reference signal transmission for a shared radio frequency channel, transmitting an SRS request in DCI scheduling at least the first uplink reference signal transmission, where the SRS request is transmitted based on the first type, and receiving the first uplink reference signal transmission based on the transmitted SRS request.

A non-transitory computer-readable medium storing code for wireless communication at a base station is described. The code may include instructions executable by a processor to identify a first type of a first LBT procedure for a UE transmission of a first uplink reference signal transmission for a shared radio frequency channel, transmit a sounding reference signal request in DCI scheduling at least the first uplink reference signal transmission, where the SRS request is transmitted based on the first type, and receive the first uplink reference signal transmission based on the transmitted SRS request.

Some examples of the method, apparatuses, and non-transitory computer-readable medium described herein may further include operations, features, means, or instructions for transmitting a group common physical downlink control channel transmission indicating the first type. In some examples of the method, apparatuses, and non-transitory computer-readable medium described herein, the DCI indicates the first type. In some examples of the method, apparatuses, and non-transitory computer-readable medium described herein, the DCI includes an indication canceling a second uplink reference signal transmission. In some examples of the method, apparatuses, and non-transitory computer-readable medium described herein, the DCI includes a UE-specific indication of the first type, a UE group-specific indication of the first type, an SRS-specific indication of the first type, or a combination thereof.

Some examples of the method, apparatuses, and non-transitory computer-readable medium described herein may further include operations, features, means, or instructions for identifying a gap between a downlink transmission and the scheduled first uplink reference signal transmission based on the first type, where the first uplink reference signal transmission may be scheduled based on the gap to indicate the first type. Some examples of the method, apparatuses, and non-transitory computer-readable medium described herein may further include operations, features, means, or instructions for transmitting a grant for an uplink transmission, where the grant includes an indication of the first type.

In some examples of the method, apparatuses, and non-transitory computer-readable medium described herein, the DCI may be transmitted during a first time period reserved by the base station for the shared radio frequency channel and the DCI includes an SRS resource set configuration for a second time period reserved by the base station for the shared radio frequency channel. In some examples of the method, apparatuses, and non-transitory computer-readable medium described herein, the first type may be indicated based on the SRS resource set configuration and the first uplink reference signal transmission may be received during the second time period reserved by the base station for the shared radio frequency channel.

DETAILED DESCRIPTION

Figure 1:
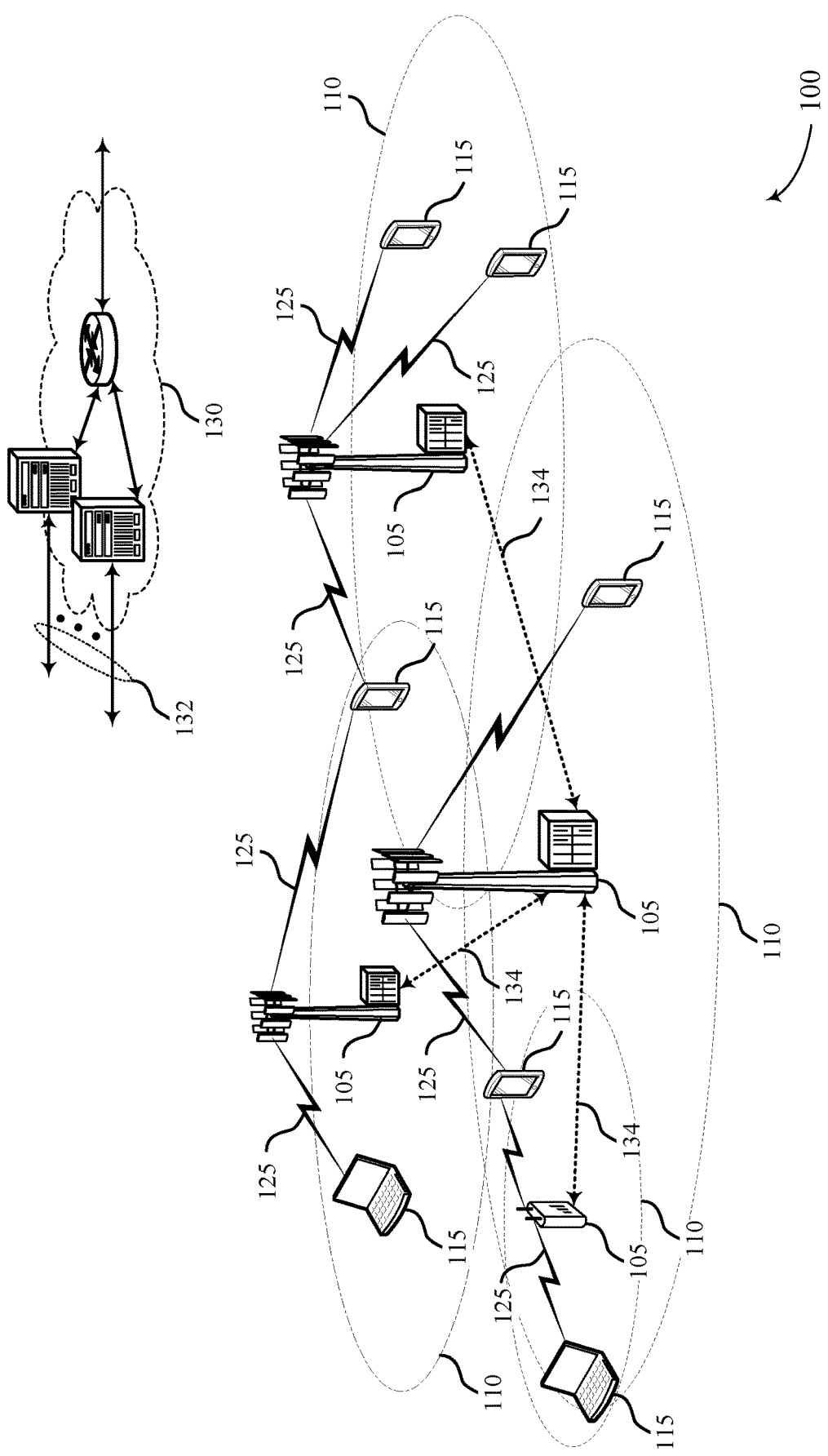
FIG. 1 illustrates an example of a system for wireless communications that supports sounding reference signal (SRS) enhancements for unlicensed spectrum in accordance with aspects of the present disclosure.

In some examples, a base station may configure one or more user equipment (UEs) to transmit sounding reference signals (SRSs). The base station may perform measurements on the SRS transmissions and determine one or more channel metrics of the UE. Additionally, in some cases the UE and the base station may communicate using a channel of a shared radio frequency spectrum band. Shared radio frequency channels may include channels of shared radio frequency spectrum bands (e.g., spectrum that is licensed to more than one operator or licensed but subject to opportunistic use by other users) or unlicensed radio frequency spectrum bands (e.g., spectrum that is not licensed to an operator and is typically subject to use constraints such as power limitations, transmission bandwidth restrictions, or transmission duration restrictions). A wireless device which wants to transmit on a shared radio frequency channel may first perform a listen-before-talk (LBT) procedure, such as a clear channel assessment (CCA) procedure, before transmitting (e.g., to determine whether any other wireless device is currently transmitting in the shared radio frequency spectrum band). If the shared radio frequency spectrum band is available, the wireless device may transmit after completing the LBT procedure. If the shared radio frequency channel is unavailable, the wireless device may continue to perform the LBT procedure or back off the LBT procedure (e.g., perform a subsequent LBT procedure at a later time) before attempting to transmit on the shared radio frequency channel. In some cases a base station may perform an LBT procedure and reserve the shared radio frequency channel for a channel occupancy time (COT) that includes configured SRS resources for a UE. Alternatively, the configured SRS resources may be outside of COT resources reserved by the base station. Challenges are present for SRS transmissions via shared radio frequency channels due to potential use of the shared radio frequency channels by other devices, which may result in inaccurate or out-of-date metrics at the base station regarding the UE channel quality.

The described techniques provide for configuration and managing uplink reference signal transmissions (e.g., SRS transmissions) in shared radio frequency spectrum. Wireless communications systems may support UE transmission of SRS transmissions using transmit antenna switching techniques. Switching antennas for transmission may take a finite amount of time, and the SRS may be configured to provide time for a UE to switch transmit antennas. For example, a UE may transmit a first SRS transmission in a first symbol using a first antenna configuration (e.g., a first transmit antenna), perform antenna switching operations in a second symbol, and then transmit a second SRS transmission in a third symbol using a second antenna configuration (e.g., a second transmit antenna). However, if a symbol period (e.g., 71.35 us for 15 kilohertz (kHz) subcarrier spacing with cyclic prefix) is longer than a maximum channel vacancy time duration (e.g., 16 microseconds (p)), other devices may start transmitting and occupy the channel before the UE can transmit the second SRS. According to various aspects, a UE may employ SRS transmissions with an extended cyclic prefix and/or a postfix in order to not exceed the maximum channel vacancy time duration between SRS transmissions. That is, a UE may transmit SRS transmissions with extended cyclic prefixes (CPs) and/or postfixes, such that the SRS transmissions may extend into symbols between SRS transmissions (e.g., into symbols used for antenna switching operations). For example, a UE may determine the length of such extended CPs and/or postfixes such that gaps between SRS transmissions are long enough for antenna switching operations (e.g., based on antenna switching capabilities of the UE), but shorter in duration than any maximum channel vacancy time durations set by the wireless communications system.

Wireless communications systems may further support base station indication of subband information (e.g., subband configuration information for UE transmission of SRS transmissions) via signaling of SRS configuration information (e.g., such as group common physical downlink control channel (GC-PDCCH) and/or downlink control information (DCI) triggering SRS). In some cases, wireless communications systems may support SRS transmissions in a subset of configured subbands (e.g., when one or more configured subbands are not available due to prior reservation by other devices besides the UE or base station). Further, wireless communications systems may support partial SRS transmission (e.g., either by puncturing an SRS transmission or creating a shorter SRS sequence based on configured subbands that are unavailable). In some aspects, UE procedures for SRS bandwidth adaptation may depend on the timeline of when SRS configuration information (e.g., such as GC-PDCCH and/or DCI) is received. Further, the described techniques provide for UE identification or determination of a type of LBT procedure that should be used for SRS transmissions (e.g., a type of LBT procedure may be identified based on SRS configuration information, such as GC-PDCCH and/or DCI, previous LBT type configuration for prior uplink transmissions, etc.).

Aspects of the disclosure are initially described in the context of wireless communications systems. Examples of SRS configurations, process flow examples, and an example timeline describing aspects of SRS enhancements for unlicensed spectrum are then discussed. Aspects of the disclosure are further illustrated by and described with reference to apparatus diagrams, system diagrams, and flowcharts that relate to SRS enhancements for unlicensed spectrum.

FIG. 1 illustrates an example of a wireless communications system 100 that supports SRS enhancements for unlicensed spectrum. The wireless communications system 100 includes base stations 105, UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some aspects, a base station 105 may be movable and therefore provide communication coverage for a moving geographic coverage area 110. In some aspects, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some aspects, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. For example, a transmitting device may perform a clear channel assessment (CCA). A CCA may include an energy detection or energy sensing procedure to determine whether there are any other active transmissions on a channel. For example, each UE 115 may randomly choose a backoff counter (with may be a certain duration or a number of symbols) and listen to the channel including resources the UEs 115 are contending for until the counter decrements to zero. If the counter reaches zero for a certain UE 115 and no other transmissions are detected, the UE 115 may start transmitting. If the counter does not reach zero before another signal is detected, the UE 115 has lost contention for resource and refrains from transmitting. In some aspects, a UE 115 may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some aspects, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals (e.g., SRS transmissions) multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some aspects, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some aspects, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some aspects, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some aspects, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some aspects, NR shared spectrum may increase spectrum utilization and spectral efficiency, specifically through dynamic vertical (e.g., across the frequency domain) and horizontal (e.g., across the time domain) sharing of resources. In some cases, shared spectrum bands (e.g., or shared radio frequency channel) may refer to bandwidth that is unlicensed (e.g., where any operator or wireless device is allowed to contend for and use the spectrum) or shared among more than one operator or wireless device (e.g., where more than one operator is allowed to contend for and use the spectrum).

The described techniques provide for configuration and managing uplink reference signal transmissions (e.g., SRS transmissions) in shared (e.g., unlicensed) radio frequency spectrum. Wireless communications system 100 may support UE 115 transmission of SRS transmissions using transmit antenna switching techniques. For example, a UE 115 may transmit a first SRS transmission in a first symbol using a first antenna configuration (e.g., a first transmit antenna), perform antenna switching operations in a second symbol, and then transmit a second SRS transmission in a third symbol using a second antenna configuration (e.g., a second transmit antenna). In order to not exceed a maximum channel vacancy time duration (e.g., 16 us) between SRS transmissions (e.g., between transmission of the first and second SRS transmissions), a UE 115 may employ SRS transmissions with an extended cyclic prefix and/or a postfix. That is, a UE 115 may transmit SRS transmissions with extended CPs and/or extended postfixes, such that the SRS transmissions may extended into symbols between SRS transmissions (e.g., into symbols used for antenna switching operations). As such, a UE 115 may determine the length of such extended CPs and/or extended postfixes such that gaps between SRS transmissions are long enough for antenna switching operations (e.g., based on antenna switching capabilities of the UE 115), but shorter in duration than any maximum channel vacancy time durations set by the wireless communications system.

Wireless communications system 100 may further support base station 105 indication of subband information (e.g., subband configuration information for UE transmission of SRS transmissions) via signaling of SRS configuration information (e.g., such as GC-PDCCH and/or DCI triggering SRS). In some cases, wireless communications system 100 may support SRS transmissions in a subset of configured subbands (e.g., due to one or more configured subbands not being available due to UE 115 LBT procedures). Further, wireless communications system 100 may support partial SRS transmission (e.g., either by puncturing an SRS transmission or creating a shorter SRS sequence based on configured subbands that are unavailable). In some aspects, UE 115 procedures for SRS bandwidth adaptation may depend on the timeline of when SRS configuration information (e.g., such as GC-PDCCH and/or DCI) is received. Further, the described techniques provide for UE 115 identification or determination of a type of LBT procedure that should be used for SRS transmissions (e.g., a type of LBT procedure may be identified based on SRS configuration information, such as GC-PDCCH and/or DCI, previous LBT type configuration for prior uplink transmissions, etc.).

For example, UEs 115 may transmit SRSs to base stations 105 in accordance with an SRS configuration. For example, a base station 105 may provide SRS configuration information to a UE 115 that indicates, for example, information related to SRS slot periods, SRS symbol periods, timing offsets, sets of SRS resources, subband information, an initial SRS transmission time, a cyclic prefix length, a cyclic postfix length, LBT type information, an SRS trigger, an SRS cancellation procedure, or any combinations thereof. In some cases, the SRS configuration information may provide more efficient LBT procedures. For example, the techniques described herein may reduce the occurrence of LBT procedures (e.g., as extended CPs and/or postfixes may reduce or eliminate any LBT procedures between SRS transmissions transmitted by a UE employing antenna switching techniques). The techniques herein may also enhance the likelihood of successful LBT (e.g., via configuration of one or more types of LBT procedures the UE 115 is to perform for SRS transmissions). Further, the described techniques may also provide for more efficient SRS transmissions (e.g., via the described partial subband SRS techniques, subband selection techniques, SRS bandwidth adaptation techniques, LBT type configuration techniques, etc.).

Figure 2:
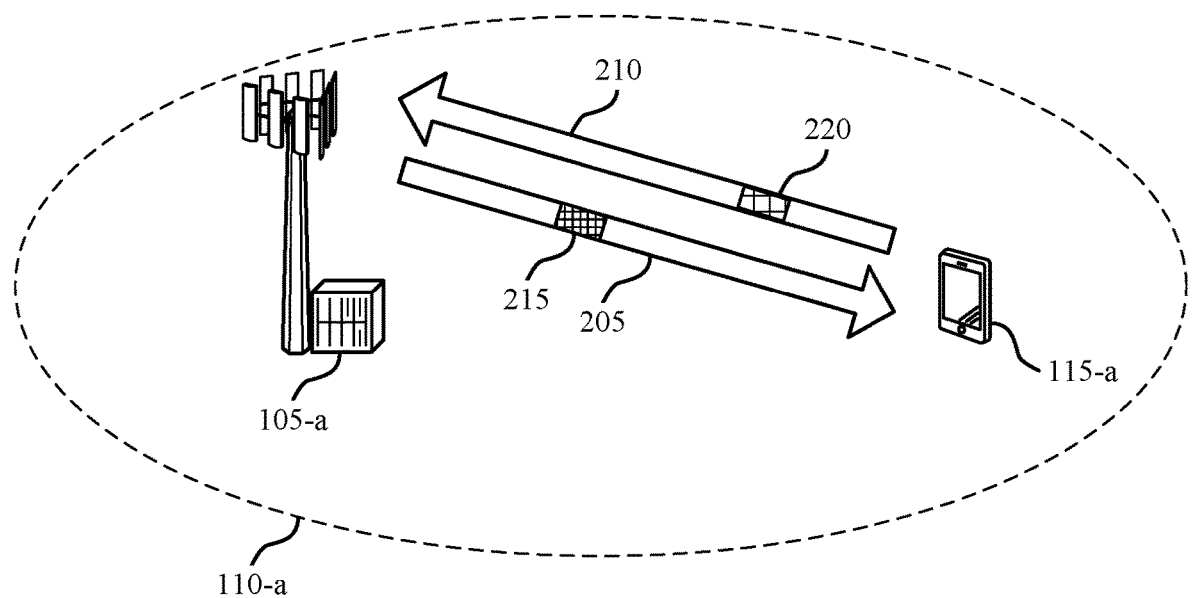
FIG. 2 illustrates an example of a wireless communications system that supports SRS enhancements for unlicensed spectrum in accordance with aspects of the present disclosure.
Figure 2:
Figure 2:

FIG. 2 illustrates an example of a wireless communications system 200 that supports SRS enhancements for unlicensed spectrum in accordance with aspects of the present disclosure. In some aspects, wireless communications system 200 may implement aspects of wireless communications system 100. In this example, wireless communications system 200 includes base station 105-a and UE 115-a, which may be examples of corresponding devices as discussed with respect to FIG. 1. The base station 105-a may transmit data and control information to the UE 115-a via downlink communications 205, and the UE 115-a may transmit data and control information to the base station 105-a via uplink communications 210. In this example, base station 105-a may transmit SRS configuration information 215 (e.g., an SRS request) to UE 115-a, which may configure one or more SRS transmissions 220 by the UE 115-a.

SRS transmissions 220 may be transmitted by UE 115-a during periodic and semi-persistent SRS slot occasions (e.g., which may be fixed on a long term basis in an NR communications system). Additionally or alternatively, aperiodic SRS transmissions 220 may be scheduled by a control message (e.g., DCI may convey SRS configuration information 215, which may indicate a request for an SRS transmission 220 and time-frequency resources for UE 115-a to transmit the SRS transmission 220). In some aspects, wireless communications system 200 (e.g., a NR-U communications system) may employ communications over shared radio frequency channels. Wireless devices (e.g., base station 105-a, UE 115-a, and other wireless devices)

may contend for access to communicate over such channels (e.g., via LBT procedures). Shared radio frequency channels may thus be acquired (e.g., via successful LBT procedures indicating the shared radio frequency channel is available) before transmission of periodic and semi-persistent SRS transmissions 220. A contention-based random access procedure, for example, an LBT may also be defined according to multiple categories. Examples of LBT categories include a category one LBT (Cat1 LBT), a category two LBT (Cat2 LBT), a category three LBT (Cat3 LBT), and a category four LBT (Cat4 LBT). A Cat1 LBT may include no LBT. A Cat2 LBT may include an LBT without a random backoff (e.g., a timing backoff, or the like). A Cat3 LBT may include an LBT with a random backoff and a fixed size contention window. A Cat4 LBT may include an LBT with a random backoff and a variable size contention window.

As such, UE 115-a may receive SRS configuration information 215 and may acquire the shared radio frequency channel (e.g., may reserve or acquire a COT), via an LBT procedure over the shared radio frequency channel, for periodic and semi-persistent SRS transmissions 220. In other cases, periodic and semi-persistent SRS transmissions 220 may be configured within a base station 105-a acquired COT (e.g., the base station 105-a may clear resources within the COT for the SRS transmission 220 and UE 115-a may perform a shortened LBT procedure, such as a one-shot LBT). For configuration of aperiodic SRS transmission 220, if a configured SRS transmission 220 falls outside a base station 105-a acquired COT, the UE 115-a may attempt to acquire the channel on its own (e.g., the UE 115-a may perform a Category 4 (Cat4) LBT procedure, and transmission of the SRS transmission 220 may depend on the success of the Cat4 LBT procedure). However, inside a base station 105-a acquired COT, the base station 105-a may send DCI (e.g., SRS configuration information 215) for UE 115-a to transmit aperiodic SRS transmissions 220 within the base station 105-a acquired COT. For example, if the base station 105-a acquires a COT (e.g., via a successful LBT procedure), the base station 105-a may trigger an aperiodic SRS transmission 220 from the UE 115-a in the COT, instead of risking having the UE 115-a try a separate LBT after the COT (e.g., which may or may not result in successful channel acquisition and subsequent SRS transmission by the UE 115-a). In some cases, the base station 105-a may trigger an aperiodic SRS transmission 220, and the UE 115-a may skip a subsequent SRS transmission 220 (e.g., a subsequent persistent or semi-persistent SRS configured by the SRS configuration) based on the aperiodic SRS transmission 220 (e.g., if the aperiodic SRS transmission 220 was within a predetermined time threshold of the subsequent persistent of semi-persistent SRS transmission 220).

Wireless communications system 200 may support efficient UE transmission of SRS transmissions 220 using transmit antenna switching techniques. For example, UE 115-a may transmit a first SRS transmission 220 in a first symbol using a first antenna configuration (e.g., a first transmit antenna), perform antenna switching operations in a second symbol, and then transmit a second SRS transmission 220 in a third symbol using a second antenna configuration (e.g., a second transmit antenna). Where a symbol period exceeds a maximum channel vacancy time duration (e.g., 16 us), UE 115-a may employ SRS transmissions 220 with extended CP and/or postfix. That is, UE 115-a may transmit SRS transmissions 220 with extended CPs and/or postfixes, such that the SRS transmissions 220 may extend into symbols between SRS transmissions (e.g., into symbols used for antenna switching operations). As such, UE 115-a may determine the length of such extended CPs and/or extended postfixes such that gaps between SRS transmissions 220 are long enough for antenna switching operations (e.g., based on antenna switching capabilities of the UE 115-a), but shorter in duration than any maximum channel vacancy time durations set by the wireless communications system (e.g., as described in more detail herein, for example, with reference to FIG. 3).

Wireless communications system 200 may further support base station 105-a indication of subband information (e.g., subband configuration information for UE 115-a transmission of SRS transmissions 220) via GC-PDCCH and/or DCI triggering SRS. In some cases, wireless communications system 200 may support SRS transmissions 220 in a subset of configured subbands (e.g., when one or more configured subbands are not available due to failure of LBT procedures in the one or more configured subbands). Further, wireless communications system 200 may support partial SRS transmission (e.g., either by puncturing or creating shorter SRS sequence). In some aspects, UE 115-a procedures for SRS bandwidth adaptation may depend on the timeline of when SRS configuration information 215 (e.g., such as GC-PDCCH and/or DCI) is received. Further, a UE 115-a may identify or determine what type of LBT procedure should be used for SRS transmissions 220 (e.g., via SRS configuration information 215, such as GC-PDCCH and/or DCI).

Depending upon LBT success, available subbands (e.g., subbands available for SRS in shared radio frequency spectrum) in a COT may differ. For example, base station 105-a may perform LBT over various subbands, and an acquired COT may be associated with subbands corresponding to successful LBT (e.g., and some subbands of a COT may be unavailable for use based on failed LBT procedures). Hence, inside a COT, the subband availability (e.g., for SRS transmissions 220) may be indicated to the UE 115-a, and outside a COT (e.g., outside one or more COTs that may be acquired by base station 105-a), UE 115-a may adapt subbands (e.g., subbands configured for SRS) according to availability (e.g., according to which of the subbands configured for SRS pass LBT).

For SRS within a base station 105-a acquired COT, the subband information (e.g., configured available subbands for SRS transmissions 220) may be provided to the UE 115-a. In some cases, the subband information may be indicated via GC-PDCCH (e.g., which may include information common for all UEs). In some cases, subband information may be indicated by DCI triggering SRS (e.g., additional information bits may be included in DCI to indicate subband information in addition to the SRS trigger). In some aspects, DCI triggering SRS may include subband information if GC-PDCCH indicates all subbands are available, but the base station 105-a wants the UE 115-a to send SRS in a subset of subbands (e.g., DCI may indicate a subset of subbands indicated by GC-PDCCH for triggered SRS transmissions 220).

If the SRS is transmitted outside a COT (e.g., outside a base station 105-a acquired COT), configured SRS subbands (e.g., subbands configured by base station 105-a for UE 115-a transmission of SRS) and available subbands (e.g., subbands corresponding to successful LBT performed by UE 115-a) may differ. For example, base station 105-a may configure some subbands (e.g., subbands 1, 2, 4) for SRS transmission 220 by UE 115-a, where the SRS transmission 220 is configured outside of any base station 105-a acquired COT. However, as the UE 115-a may perform LBT prior to transmission (e.g., as the SRS is configured outside any base station 105-a acquired COT), in some cases the configured SRS subbands may be different than the available subbands. In some aspects, if such a scenario arises where the configured SRS subbands are different than the available subbands, the UE 115-a may drop SRS (e.g., may not transmit SRS). In other examples, the UE 115-a may transmit SRS in subbands corresponding to the intersection of the two sets (e.g., the UE 115-a may transmit SRS in configured SRS subbands that are also available subbands). In some aspects, the bandwidth may be fixed as the configured bandwidth, but the subbands used for SRS may float per availability (e.g., SRS may be configured at one 20 MHz subband, but may be transmitted on another available 20 MHz subband, such that the configured 20 MHz subband "floats" to a next or closest available 20 MHz subband). In some cases, bandwidth and subbands may be a function of checked out subbands.

In some cases, wireless communications system 200 may support partial subband SRS transmissions 220, where one or more SRSs may be transmitted by a UE 115-a in a subset of configured subbands. In such cases, SRS tones outside the band may be punctured (e.g., any configured SRS tones outside available subbands may be punctured). In such cases, new SRSs may not be generated (e.g., when configured subbands and available subbands differ, the UE 115-a may support partial subband SRS transmission using the subset of configured subbands that are available by puncturing the subset of configured subbands that are unavailable, instead of generating new SRS). Alternatively, an SRS with shorter length may be generated (e.g., such that the newly generated SRS may be transmitted over the subset of configured subbands that are available by reducing SRS length, which may improve peak-to-average power ratio (PAPR) compared to puncturing techniques).

If a subset of subbands are checked out, and shorter SRS is generated, the number of resource blocks (RBs) may be lesser due to guardbands. Further, since SRS may use a Zadoff-Chu (ZC) sequence of prime number length, the SRS signal tones may be lesser than the number of available RBs*12. In such a situation, the virtual to physical tone mapping may begin at one end and a few tones at the other end may be left vacant or the tones may be mapped symmetrically to leave out a same number of tones at both ends. UE 115-a may use a subset of available subbands depending on the UE 115-a capability. For example, some UEs may use, due to UE capability, contiguous subbands (e.g., if subbands 1, 2, and 4 are checked out via LBT procedures, the UE may use subbands 1 and 2 for SRS transmission 220, as subbands 1 and 2 are contiguous in the set of checked out subbands).

UE 115-a may identify or determine what type of LBT procedure should be used for SRS transmissions 220 (e.g., via SRS configuration information 215, such as GC-PDCCH and/or DCI). In some cases, the LBT type may be identified based on GC-PDCCH. For example, GC-PDCCH may include an explicit bit indicating what LBT type is to be used by the UE 115-a for periodic/semi-persistent SRS, where the bit may be used to indicate between LBT types (e.g., between Cat1 or Cat2 LBT). In some aspects, a gap may be determined from the slot format indication (SFI) and the LBT type may be determined based on the gap. For example, The UE may determine the number of symbols in the gap and the length of each symbol based on the subcarrier spacing, and may use a Cat1 LBT (e.g., no LBT) where the gap is smaller than a maximum channel vacancy time duration, and may use a Cat2 LBT (e.g., one-shot LBT) when the gap is larger than the maximum channel vacancy time duration. In some cases, DCI may be configured (e.g., or extended) to indicate periodic or semi-persistent SRS activation or deactivation as well as LBT type.

In some aspects, gap information may be signaled in DCI which may be used by UE 115-a to determine LBT type. For example, DCI may indicate where a downlink portion of a COT ends, and if UE 115-a determines that a configured SRS is after the downlink portion ends, the UE 115-a may know the gap (e.g., between when the downlink portion ends and the configured SRS) and UE 115-a may infer the LBT type (e.g., Cat1 where the gap is less than a maximum channel vacancy time duration and Cat2 where the gap is greater). If SRS is scheduled to be after an uplink transmission and UE 115-a is not scheduled in the previous uplink transmission, UE 115-a may assume a Cat2 LBT. If UE 115-a is scheduled in the previous uplink, UE 115-a may determine LBT type based on the gap (e.g., the gap between the previous uplink transmission and the SRS). For a flexible slot followed by an uplink slot, if UE 115-a is scheduled on the flexible slot (e.g., either downlink or uplink) and can determine the gap based on the scheduling, UE 115-a may determine the LBT type based on the above techniques (e.g., Cat1 where the gap is less than a maximum channel vacancy time duration and Cat2 where the gap is greater). If UE 115-a is not scheduled within the flexible slot followed by an uplink slot, UE 115-a may use Cat2 LBT.

If granted PUSCH/PUCCH and triggered SRS are continuous, the UE 115-a may use the same LBT type for SRS that may be applied for PUSCH/PUCCH as provided in the LBT type for PUSCH/PUCCH (e.g., the UE 115-a may use the same LBT type for SRS as the LBT type indicated in the grant corresponding to the PUSCH/PUCCH). Such may apply to periodic signal or semi-persistent signal (e.g., periodic/semi-persistent PUCCH, SRS, physical random access channel (PRACH), cell group (CG), etc.) as well as to the case of aperiodic signals where UE 115-a is indicated with Cat4 via an uplink grant but base station 105-a acquires the medium before UE 115-a transmission. Enable or disable of LBT type may be configured for different channels commonly or independently. For example, the same bit in the GC-PDCCH may enable/disable all PRACH/periodic SRS/semi-persistent SRS, etc., or independent bits in GC-PDCCH may be used to enable or disable some or all of PRACH/periodic SRS/semi-persistent SRS, etc.

As discussed, DCI for periodic/semi-persistent SRS may carry LBT type information. In general, DCI may be used to enable and/or cancel SRS and indicate or change LBT type (e.g., and may be part of GC-PDCCH). In some cases, DCI may indicate whether to transmit or not transmit SRS (e.g., DCI may configure/enable SRS or DCI may cancel configured SRS). If DCI includes an SRS trigger (e.g., if DCI includes an indication for SRS transmission), DCI may also indicate LBT type. In some cases, DCI may be used to cancel SRS (e.g., SRS may be sent by default unless DCI cancels SRS, such as by including an indication that UE 115-a is not to transmit SRS). Such DCI may indicate a different LBT type than a default LBT type for SRS. For example, a default LBT type for SRS may be Cat2 LBT or some other LBT type configured by RRC signaling, and DCI may indicate a different LBT type to be used for SRS transmission 220. In some cases, a UE 115-a not detecting an "SRS activating DCI" field may cancel SRS (e.g., periodic/semi-persistent SRS may be transmitted upon detecting DCI). In such cases, the DCI may specify the LBT type to be used for SRS transmission 220 (e.g., which may offer timeline advantages over AP-SRS, similar to two-stage grant). DCI governing LBT type for periodic/semi-persistent SRS within a COT may be UE specific, UE group specific, and/or SRS specific (e.g., some SRS may be configured with Cat1 LBT, some other SRS may be configured with Cat2 LBT).

If aperiodic SRS falls in another COT, base station 105-*a* may schedule uplink/downlink accordingly to allow SRS transmission 220. If UE 115-*an* LBT and base station 105-*an* LBT are running in parallel, and base station 105-*a* wins the medium, UE 115-*a* may not receive the GC-PDCCH before SRS transmission 220 and, in that case, base station 105-*a* may have options whether or not to allow SRS transmission 220. GC-PDCCH may be transmitted at a later point after the start of the COT, and GC-PDCCH may take time to be received and processed at the UE 115-*a*. The timeline may occur if SRS transmission 220 is scheduled for a symbol occurring before GC-PDCCH detection at UE 115-*a*. As such, LBT type configuration for aperiodic SRS inside another COT may be added as part of SRS resource set configuration (e.g., SRS resource set configuration may include an indication of LBT type for aperiodic SRS inside another COT). In some aspects, base station 105-*a* may handle SRS transmission 220 inside another COT for aperiodic SRS. For example, base station 105-*a* may create a gap for SRS if SRS is within UE 115-*a* processing time of receiving GC-PDCCH, or handling SRS transmission 220 may be up to base station 105-*a* implementation. If base station 105-*a* decides not to create a gap for SRS transmission, UE 115-*a* Cat4 LBT may fail if base station 105-*a* starts transmitting even before GC-PDCCH is transmitted by the base station 105-*a* and/or decoded at UE 115-*a*. In some cases, UE 115-*an* LBT may pass and the UE 115-*a* may transmit SRS which may result in interference.

Figure 3A:
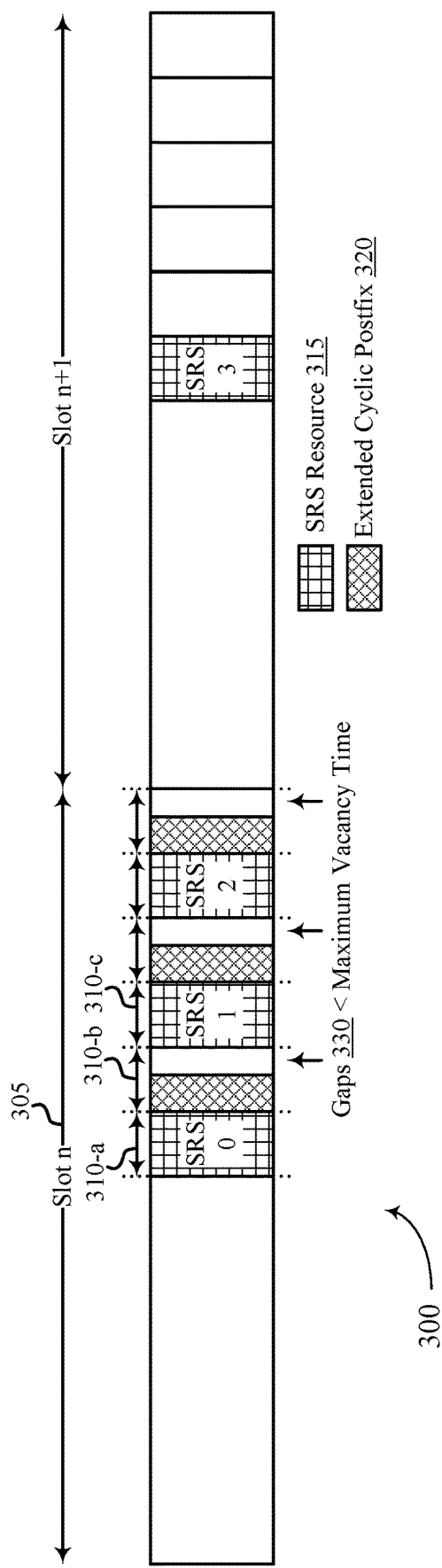
FIGS. 3A and 3B illustrate example SRS configurations that support SRS enhancements for unlicensed spectrum in accordance with aspects of the present disclosure.
Figure 3B:
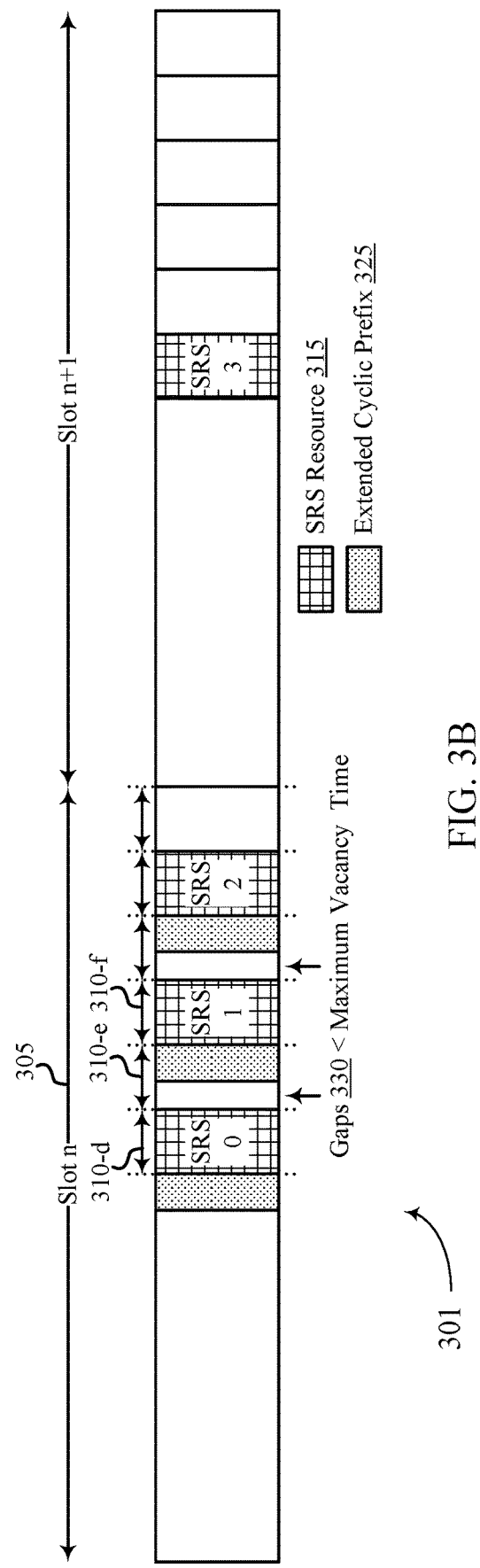

FIGS. 3A and 3B illustrate example SRS configurations 300 and 301 that support SRS enhancements for unlicensed spectrum. In some aspects, SRS configurations 300 and 301 may implement aspects of wireless communications system 100 and/or wireless communications system 200. For example, SRS configurations 300 and 301 may illustrate examples of SRS resources 315 configured by a base station 105 and/or SRS transmission by a UE 115 (e.g., using SRS resources 315) within one or more slots 305. Specifically, SRS configurations 300 and 301 illustrate aspects of SRS transmission using UE transmit antenna switching techniques, where SRS is extended (e.g., via cyclic postfixes 320 and extended prefixes 325) into symbols 310 between configured SRS resources 315. In the examples of FIGS. 3A and 3B, a UE associated with the SRS configurations 300 and 301 may employ 1T4R (one transmit antenna, four receive antenna) antenna switching for aperiodic SRS. That is, in this example, a UE may have four antennas and use one antenna to transmit SRS, where the transmit antenna is switched between SRS transmissions over SRS resources 315 (e.g., 'SRS 0,' 'SRS 1,' 'SRS 2,' and 'SRS 3').

As discussed herein, wireless communications systems may support efficient UE transmission of SRS using transmit antenna switching techniques. Generally, wireless communications systems may employ cyclic postfix 320 and/or extended cyclic prefix 325 on SRS to reduce the gap 330 to less than a maximum channel vacancy time duration (e.g., 16 us), such that the UE 115 may transmit a next SRS without performing LBT procedures (e.g., without performing LBT procedures between SRS transmissions within the COT). SRS configuration 300 may illustrate implementation of cyclic postfixes 320 for SRS symbols that come earlier, and SRS configuration 301 may illustrate implementation of extended CPs 325 for SRS symbols that come that come later. In some cases, cyclic postfixes 320 and/or extended CPs 325 may be implemented on symbols where a gap 330 is to be reduced (e.g., to be less than a maximum channel vacancy time duration), and not necessarily on all symbols.

In the example of FIG. 3A, a UE 115 may transmit an SRS transmission using a first SRS resource 315 (e.g., 'SRS 0') in a first symbol 310-*a* using a first antenna configuration (e.g., a first transmit antenna), perform antenna switching operations in a second symbol 310-*b*, and then transmit a second SRS transmission using a second SRS resource 315 (e.g., 'SRS 1') in a third symbol 310-*c* using a second antenna configuration (e.g., a second transmit antenna). SRS configuration 300 illustrates usage of cyclic postfixes 320 for SRS transmissions such that the gap 330 between transmissions of SRS (e.g., the gap 330 within symbol 310-*b*) allows enough time for UE transmit antenna switching operations while not exceeding a maximum channel vacancy time duration (e.g., 16 us).

For example, in some wireless communications systems, one symbol gaps may be configured between SRS resources (e.g., for a subcarrier spacing=15/30 kHz) to transmit SRS with transmit or receive antenna switching. Further, a wireless communications system may be associated with a maximum channel vacancy time duration such that communication resources within the wireless communications system are efficiently utilized. A maximum channel vacancy time duration may refer to a maximum time duration for which reservation of a channel (e.g., a shared radio frequency channel) may be maintained by a wireless device if the wireless device is not actively transmitting (e.g., before the wireless device may relinquish control of the shared radio frequency channel). As such, a wireless device (e.g., a UE 115) may not transmit with a gap exceeding the maximum channel vacancy time (e.g., with a gap 330>'Maximum Vacancy Time') in a base station acquired COT. If a wireless device acquires a shared radio frequency channel and a gap 330 between transmissions by the wireless device exceeds the maximum channel vacancy time duration, the wireless device may perform additional LBT procedures to reacquire the shared radio frequency channel. However, in some cases (e.g., in NR-U), a UE 115 may perform Cat4 LBT procedures before transmitting, and a Cat4 LBT procedure may not be able to be completed within one symbol. As such, a UE 115 may thus not transmit SRS using transmit antenna switching techniques, as some LBT procedures between SRS transmissions (e.g., LBT procedures arising due to symbol gaps between SRS transmissions exceeding the maximum channel vacancy time duration) may take more time to complete than the symbol duration between the configured SRS resources.

As such, for efficient transmission of SRS using transmit antenna switching techniques, a UE 115 may transmit SRS with postfixes 320 and/or extended CPs 325 such that gaps 330 between SRS transmissions provide enough time for antenna switching operations (e.g., which may depend on UE antenna switching capabilities) yet may not exceed a network configured (e.g., or specified) maximum channel vacancy time durations.

In some cases, wireless communications systems may increase the number of gap symbols (e.g., the number of symbols between SRS resources) as a function of subcarrier spacing to allow enough time for LBT procedures (e.g., Cat4 LBT) to be successful. In some cases, determination of the number of gap symbols may depend on a priority type. For example, for 15, 30, or 60 kHz subcarrier spacing, symbol gaps of 1, 2, or 4 symbols respectively, may be created (e.g., configured). In some cases, increasing numbers of symbols in the gap as a function of subcarrier spacing to allow more time for LBT procedures may be implemented in addition to or as an alternative to postfixes 320 and/or extended CPs 325 for SRS.

In the example of FIG. 3A, a UE 115 may transmit, using a first antenna configuration, an SRS transmission using SRS resource 315 in a first symbol 310-a and a cyclic postfix 320 into a portion of symbol 310-b. The UE 115 may then perform antenna switching operations in a gap 330 and transmit, using a second antenna configuration, a second SRS transmission in a third symbol 310-c (e.g., which may include SRS in the third symbol 310-c and a cyclic postfix 320 into a portion of a next symbol 310). In some cases, the cyclic postfix 320 (e.g., a length of the cyclic postfix 320) may be configured by a base station 105 or determined by a UE 115 based on UE transmit antenna switching capabilities (e.g., an amount of time used by the UE to switch antenna configurations), a maximum channel vacancy time duration, or both. For example, cyclic postfixes 320 may be employed such that a gap 330 remaining between the end of the SRS transmission (e.g., the end of the cyclic postfix 320) and the beginning of the next SRS transmission (e.g., the beginning of the next symbol 310-c) does not exceed the maximum channel vacancy time duration and such that the gap 330 allows enough time for the UE 115 to perform transmit antenna switching operations to switch transmit antenna configurations between SRS transmissions. Such techniques may allow for UE transmission of a next SRS without performing additional LBT procedures (e.g., as the UE 115 may occupy the shared radio frequency channel after success of an initial LBT procedure, and may extend SRS transmissions such that any gaps 330 between SRS transmissions do not exceed the maximum channel vacancy time duration and thus do not have additional LBT procedures).

In the example of FIG. 3B, a UE 115 may transmit, using a first antenna configuration, an SRS transmission using SRS resource 315 in a first symbol 310-d (e.g., the SRS transmission may also include an extended cyclic prefix 325, such that the SRS transmission begins in a portion of a symbol preceding symbol 310-d). The UE 115 may then perform antenna switching operations in a gap 330 and transmit, using a second antenna configuration, a second SRS transmission starting in a remaining portion of the second symbol 310-e through the third symbol 310-f (e.g., the second SRS transmission may include an extended cyclic prefix 325 in a remaining portion of symbol 310-e and SRS in symbol 310-f). In some cases, the extended cyclic prefix 325 (e.g., a length of the extended cyclic prefix 325) may be configured by a base station 105 or determined by a UE 115 based on UE transmit antenna switching capabilities (e.g., an amount of time used by the UE to switch antenna configurations), a maximum channel vacancy time duration, or both. For example, extended CPs 325 may be employed such that a gap 330 remaining between the end of the SRS transmission (e.g., the end of the symbol 310-d) and the beginning of the next SRS transmission (e.g., the beginning of the cyclic prefix 325) does not exceed the maximum channel vacancy time duration and such that the gap 330 allows enough time for the UE to perform transmit antenna switching operations to switch transmit antenna configurations between SRS transmissions. Such techniques may allow for UE transmission SRS, using transmit antenna switching techniques, without performing additional LBT procedures (e.g., as the UE may occupy the shared radio frequency channel after success of an initial LBT procedure, and may extend SRS transmissions such that any gaps 330 between SRS transmissions do not exceed the maximum channel vacancy time duration and may not have additional LBT procedures).

Figure 4:
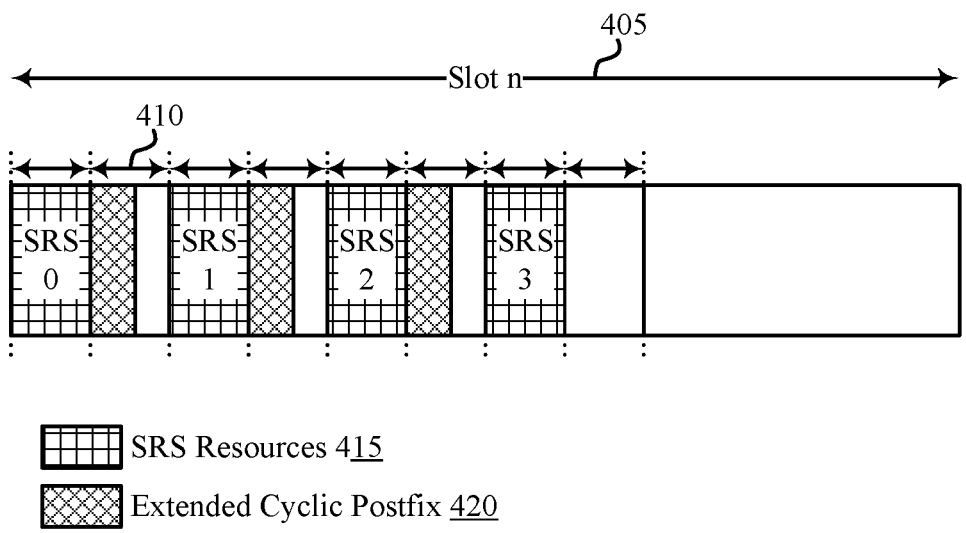
FIG. 4 illustrates an example of an SRS configuration that supports SRS enhancements for unlicensed spectrum in accordance with aspects of the present disclosure.

FIG. 4 illustrates an example of an SRS configuration 400 that supports SRS enhancements for unlicensed spectrum in accordance with aspects of the present disclosure. In some aspects, SRS configuration 400 may implement aspects of wireless communications system 100 and/or wireless communications system 200. For example, SRS configuration 400 may illustrate examples of SRS resources 415 configured by a base station and/or SRS transmission by a UE 115 (e.g., using SRS resources 415) within a slot 405. Specifically, SRS configuration 400 illustrates flexible SRS configuration, where SRS resources 415 may be configured for any symbols 410 of a slot 405. Further, SRS configuration 400 may illustrate aspects of SRS transmission using UE transmit antenna switching techniques, where SRS is extended (e.g., via extended cyclic postfix 420) into symbols 410 between configured SRS resources 415.

Some wireless communications systems (e.g., NR systems) may employ SRS resource 415 configuration in certain portions of a slot 405. For example, some wireless communications systems may only support SRS configuration in the last six symbols of a slot (e.g., as shown with reference to FIGS. 3A and 3B). Hence, such wireless communications systems may not accommodate four SRS transmissions in a single slot with a one-symbol gap between SRS transmissions. That is, in such deployments, three SRS transmissions may be supported per slot, as a symbol gap between SRS transmissions (e.g., for UE transmit antenna switching) may consume the additional three symbols of the six total symbols available for SRS transmission configuration.

However, some wireless communications systems (e.g., NR-U systems) may allow SRS transmission in any (e.g., all) symbols 410 of a slot 405. As such, multiple symbol SRS (e.g., multiple SRS resources 415 where each SRS resource 415 corresponds to a symbol 410) with gaps in between may be accommodated within a slot 405 and across slot pattern support may be removed (e.g., support for SRS configuration across more than one slot may not be necessary). For example, in some cases, SRS resource 415 configurations for multiple SRS transmissions may be limited to one slot 405 (e.g., to reduce the number of slots, and thus communication resources, used for SRS transmissions by a UE 115). In some cases, SRS transmissions from a UE 115 may be transmitted within a single slot. For example, in some cases, a base station 105 may transmit SRS configuration information (e.g., an SRS request) to a UE 115, and the SRS configuration information may indicate the slot 405, subbands, LBT type, antenna switching configurations, etc. for SRS transmission by the UE 115. The UE 115 may receive such SRS configuration information and identify SRS resources 415 within the slot 405 (e.g., either implicitly from slot and subband information or explicitly from an indication of time-frequency resources included in the SRS configuration information).

Example SRS configuration 400 may illustrate four SRS transmissions from one UE 115 within a single slot 405. The four SRS transmissions may be configured to be transmitted using SRS resources 415 (e.g., 'SRS 0,' 'SRS 1,' 'SRS 2,' and 'SRS 3') and, in some cases, SRS resources 415 may be separated by a symbol gap (e.g., for UE transmit antenna switching). As discussed herein, a UE 115 may, for example, employ cyclic postfixes 420 for SRS transmissions such that the cyclic postfixes 420 extend the SRS transmissions into a portion of the symbol gaps between SRS resources 415.

Alternatively, extended CPs may be used (e.g., for 'SRS 1,' 'SRS 2,' and 'SRS 3'), although not illustrated in FIG. 4.

Figure 5:
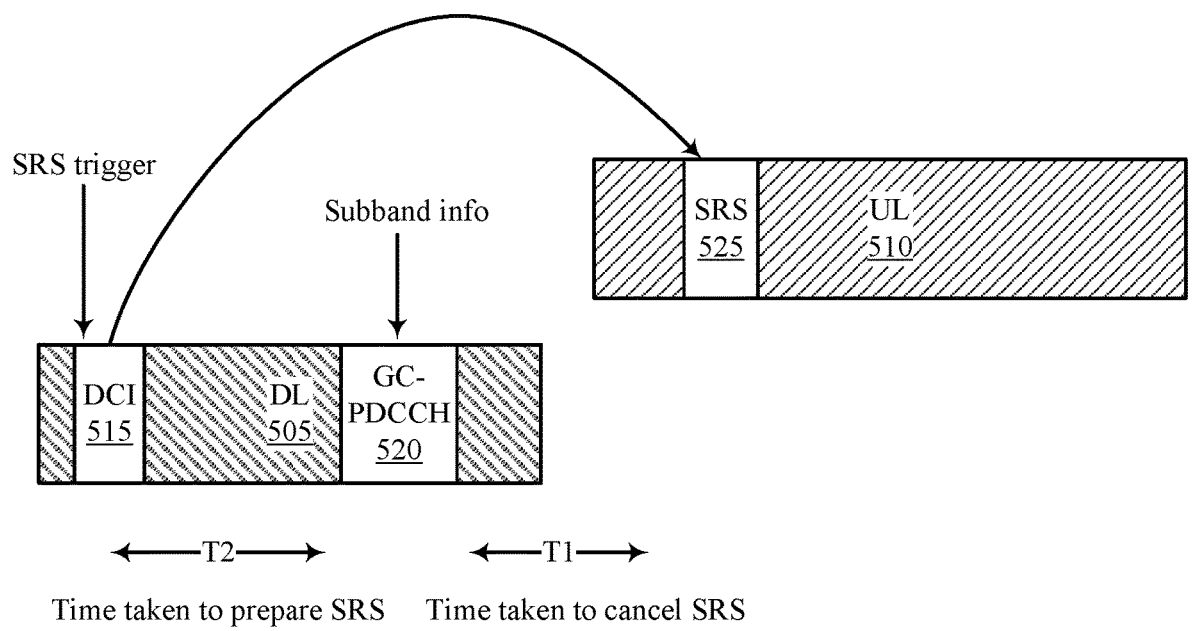
FIG. 5 illustrates an example of a timeline that supports SRS enhancements for unlicensed spectrum in accordance with aspects of the present disclosure.

FIG. 5 illustrates an example of a timeline 500 that supports SRS enhancements for unlicensed spectrum in accordance with aspects of the present disclosure. In some aspects, timeline 500 may be implemented by aspects of wireless communications system 100 and/or wireless communications system 200. Example timeline 500 may illustrate downlink communications 505 transmitted from a base station to a UE 115, as well as corresponding uplink communications 510 transmitted from a UE 115 to a base station 105. For example, a base station 105 may transmit DCI 515 and/or GC-PDCCH 520 (e.g., via downlink communications 505) for trigging and configuration of SRS 525 (e.g., SRS 525 transmitted by a UE via uplink communications 510).

Example timeline 500 may illustrate DCI 515, GC-PDCCH 520, and SRS 525 relative to a time taken to cancel SRS 525 ('T1') and time taken to prepare SRS 525 ('T2'). In some cases, T1 may be less than or equal to T2 (e.g., T1<T2). If T1 is not separately configured, T1 may be equal to T2 (e.g., T1=T2). DCI 515 triggering SRS 525 may first be transmitted by a base station, where the DCI 515 schedules SRS 525 at some later time beyond T2. GC-PDCCH 520 may include subband information and may be transmitted by a base station after DCI 515. If the checked out subbands are different from the configured bandwidth, a UE may cancel the SRS 525.

If GC-PDCCH 520 comes (e.g., is transmitted by the base station and/or is received by the UE 115) before T2, the UE 115 may use subband information as included in GC-PDCCH 520. If GC-PDCCH 520 comes between T2 and T1, the UE 115 may cancel SRS 525 if subband information is different from what the UE 115 assumes (e.g., full bandwidth). If GC-PDCCH 520 with subband information comes after T1, the UE 115 may drop SRS 525 or transmit SRS 525 using full subband and Cat4 LBT. Such options may also apply if a shorter SRS 525 is to be transmitted (e.g., in such cases T1=T2).

Figure 6:
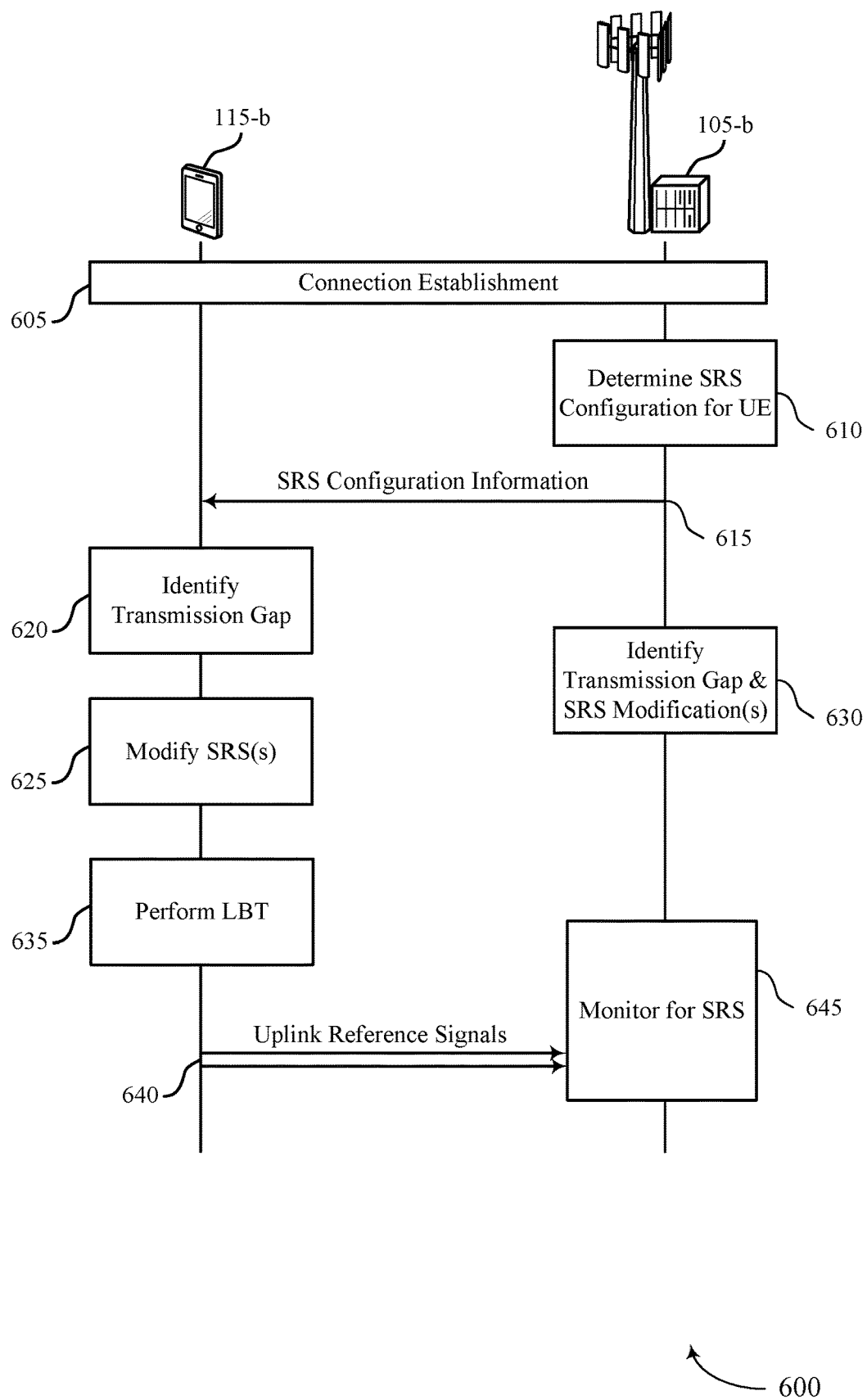
FIG. 6 illustrates an example of a process flow that supports SRS enhancements for unlicensed spectrum in accordance with aspects of the present disclosure.

FIG. 6 illustrates an example of a process flow 600 that supports SRS enhancements for unlicensed spectrum in accordance with aspects of the present disclosure. In some aspects, process flow 600 may be implemented by aspects of wireless communications system 100 and/or wireless communications system 200. The process flow 600 may include a base station 105-b and a UE 115-b, which may be examples of the corresponding devices described with reference to FIGS. 1 and 2. The base station 105-b may provide an SRS configuration and UE 115-b may transmit SRSs based on the SRS configuration in accordance with aspects of techniques discussed herein. In the following description of the process flow 600, the operations between UE 115-b and base station 105-b may be transmitted or may be performed in a different order than the order shown, or at different times. Operations may also be left out of the process flow 600, or other operations may be added to the process flow 600. It is to be understood that while base station 105-b and UE 115-b are shown performing a number of the operations of process flow 600, any wireless device may perform the operations shown.

At 605, UE 115-b and base station 105-b may establish a connection (e.g., according to RRC connection establishment techniques). At 610, base station 105-b may determine an SRS configuration for the UE 115-b, and may transmit SRS configuration information (e.g., an SRS request) to the UE 115-b at 615. The SRS configuration information may include information related to SRS slot periods, SRS symbol periods, timing offsets, sets of SRS resources, subband information, an initial SRS transmission time, a cyclic prefix length, a cyclic postfix length, LBT type information, an SRS trigger, an SRS cancellation procedure, or any combinations thereof. For example, in some cases, the SRS configuration information may indicate scheduling of a first uplink reference signal transmission (e.g., a first SRS transmission) and a second uplink reference signal transmission (e.g., a second SRS transmission), for a shared radio frequency channel, by the UE 115-b. In some aspects, the first uplink reference signal transmission and the second uplink reference signal transmission may be scheduled in a time period (e.g., a COT) reserved by base station 105-b for the shared radio frequency channel. In some cases, the SRS configuration information may be provided as part of the connection establishment procedure (e.g., at 605). In some cases, the SRS configuration information may be provided via DCI, GC-PDCCH, or some combination thereof.

At 620, the UE 115-b may identify a transmission gap between the first uplink reference signal transmission and the second uplink reference signal transmission (e.g., based on scheduling information included in the SRS configuration information received at 615). In some cases, the transmission gap may be identified based on a configured subcarrier spacing (e.g., the transmission gap may include a number of symbols between the first uplink reference signal transmission and the second uplink reference signal transmission, and the number of symbols may depend on the configured subcarrier spacing).

At 625, UE 115-b may modify (e.g., format) the first uplink reference signal transmission and/or the second uplink reference signal transmission based on the identified transmission gap and a maximum channel vacancy time duration. In some aspects, the modification may include extending a cyclic prefix of the second uplink reference signal transmission into the identified transmission gap (e.g., where a time duration between the first uplink reference signal transmission and the extended cyclic prefix of the second uplink reference signal transmission is less than the maximum channel vacancy time duration). Additionally or alternatively, the modification may include adding a postfix to the first uplink reference signal transmission during the identified transmission gap (e.g., where a time duration between the postfix of the first uplink reference signal transmission and the second uplink reference signal transmission is less than the maximum channel vacancy time duration).

In some cases, UE 115-b may identify an antenna switching time, and the cyclic prefix length and/or the cyclic postfix length may be determined based on the antenna switching time (e.g., such that the cyclic prefix length and/or the cyclic postfix length allows enough time for UE transmit antenna switching, while still reducing the transmission gap to be less than the maximum channel vacancy time duration). In some cases, the cyclic prefix length and/or the cyclic postfix length may be determined based on whether the SRS is to be transmitted within a COT (e.g., of the base station 105-b) or outside of the COT.

At 630, base station 105-b may identify a transmission gap between the first uplink reference signal transmission and the second uplink reference signal transmission, and determine a modification of the first uplink reference signal transmission and/or the second uplink reference signal transmission based on the identified transmission gap and a maximum channel vacancy time duration. In some cases, the transmission gap may be identified based on a configured subcarrier spacing (e.g., the transmission gap may include a number of symbols between the first uplink reference signal transmission and the second uplink reference signal transmission, and the number of symbols may depend on the configured subcarrier spacing).

At 635, UE 115-b may perform LBT (e.g., an LBT procedure, such as a Cat4 LBT procedure). In some cases, the type of LBT procedure the UE 115-b performs may be indicated by the SRS configuration information, may be determined based on a type of SRS configured for the first uplink reference signal transmission, etc. However, in some cases (e.g., where the SRS is configured within a symbol that is contiguous with a downlink transmission), UE 115-b may skip the LBT at 635.

At 640, UE 115-b may (e.g., upon successful LBT) transmit the first uplink reference signal transmission and the second uplink reference signal transmission. For example, UE 115-b may transmit the modified first uplink reference signal transmission via a first antenna (e.g., a first antenna configuration), switch a transmission path from the first antenna to a second antenna after transmitting the modified first uplink reference signal transmission, and transmit the modified second uplink reference signal transmission via the second antenna (e.g., a second antenna configuration). As described herein, the antenna switching operations (e.g., transmission path switching) may be performed during the time duration between the first uplink reference signal transmission and the extended cyclic prefix of the second uplink reference signal transmission or during the time duration between the extended postfix of first uplink reference signal transmission and the second uplink reference signal transmission.

In some cases, the SRS configuration information (e.g., received by UE 115-b at 615) may include scheduling of a third uplink reference signal transmission and a fourth uplink reference signal transmission. In such cases, the first, second, third, and fourth uplink reference signal transmissions may be scheduled to be within a single slot, and the UE 115-a may transmit the first, second, third, and fourth uplink reference signal transmissions in the single slot (e.g., where each uplink reference signal transmission may be modified and transmitted using antenna switching operations according to techniques described herein).

At 645, base station 105-b may monitor for uplink reference signal (e.g., SRS) transmissions from the UE 115-b, and may receive the first uplink reference signal transmission and the second uplink reference signal transmission. For example, base station 105-b may receive the first uplink reference signal transmission and the second uplink reference signal transmission based on the SRS configuration determined at 610, based on the transmission gap and uplink reference signal modification identified at 630, etc. In cases where the SRS configuration information includes scheduling of a third uplink reference signal transmission and a fourth uplink reference signal transmission, the base station 105-b may receive the first, second, third, and fourth uplink reference signal transmissions in the single slot.

Figure 7:
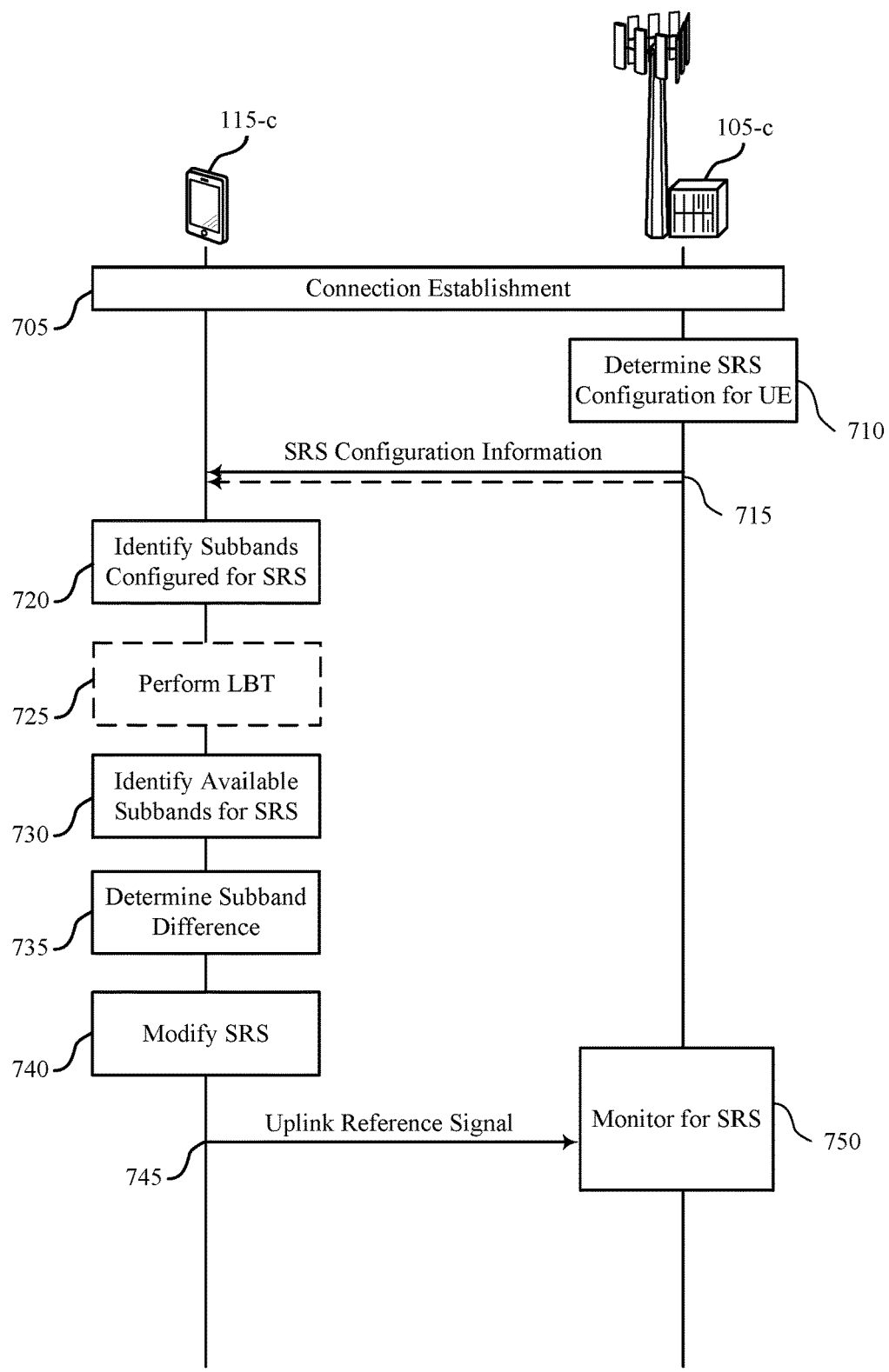
FIG. 7 illustrates an example of a process flow that supports SRS enhancements for unlicensed spectrum in accordance with aspects of the present disclosure.

FIG. 7 illustrates an example of a process flow 700 that supports SRS enhancements for unlicensed spectrum in accordance with aspects of the present disclosure. In some aspects, process flow 700 may be implemented by aspects of wireless communications system 100 and/or wireless communications system 200. The process flow 700 may include a base station 105-c and a UE 115-c, which may be examples of the corresponding devices described with reference to FIGS. 1 and 2. The base station 105-c may provide an SRS configuration and UE 115-c may transmit SRSs based on the SRS configuration in accordance with aspects of techniques discussed herein. In the following description of the process flow 700, the operations between UE 115-c and base station 105-c may be performed in a different order than the order shown, or at different times. Operations may also be left out of the process flow 700, or other operations may be added to the process flow 700. It is to be understood that while base station 105-c and UE 115-c are shown performing a number of the operations of process flow 700, any wireless device may perform the operations shown.

At 705, UE 115-c and base station 105-c may establish a connection (e.g., according to RRC connection establishment techniques). At 710, base station 105-c may determine an SRS configuration for the UE 115-c, and may transmit SRS configuration information (e.g., an SRS request) to the UE 115-c at 715. The SRS configuration information may include information related to SRS slot periods, SRS symbol periods, timing offsets, sets of SRS resources, subband information, an initial SRS transmission time, a cyclic prefix length, a cyclic postfix length, LBT type information, an SRS trigger, an SRS cancellation procedure, or any combinations thereof. For example, in some cases, the SRS configuration information may indicate one or more subbands configured for a first uplink reference signal transmission, one or more available subbands for transmission of the first uplink reference signal transmission, etc. In some cases, the SRS configuration information may be provided as part of the connection establishment procedure (e.g., at 705).

In some cases, the SRS configuration information may refer to one or more transmissions including portions or all of the SRS configuration information for the UE 115-c. For example, the SRS configuration information may be provided via DCI, GC-PDCCH, or some combination thereof. Base station 105-c may identify one or more subbands configured for a first uplink reference signal transmission by UE 115-c in a shared radio frequency channel, identify one or more available subbands for transmission of the first uplink reference signal transmission, determine a difference between the configured one or more subbands and the one or more available subbands, and include an indication of the one or more available subbands (e.g., based on the difference) in the SRS configuration information. The indication may be transmitted in DCI, transmitted in a GC-PDCCH message, or may be conveyed via transmission timing of DCI and GC-PDCCH. In some cases, the UE 115-c may identify the one or more available subbands based on performing LBT.

At 720, UE 115-c may identify one or more subbands configured for a first uplink reference signal transmission in a shared radio frequency channel. At 725, In some aspects, UE 115-c may perform LBT (e.g., an LBT procedure, such as a Cat4 LBT procedure). At 730, UE 115-c may identify one or more available subbands for transmission of the first uplink reference signal transmission (e.g., based on an LBT procedure that may be performed, in some cases, at 725). At 735, UE 115-c may determine a difference between the configured one or more subbands and the one or more available subbands. At 740, UE 115-c may modify the first uplink reference signal transmission based on the SRS configuration information and the one or more available subbands. For example, UE 115-c may modify the first uplink reference signal transmission based on the difference determined at 735.

For example, in some cases, the SRS configuration information 715 may refer to or include an SRS request and GC-PDCCH message, and the GC-PDCCH message may indicate the one or more available subbands. The UE 115-c may receive an SRS request scheduling the first uplink reference signal transmission, identify a first timing between the GC-PDCCH message and the SRS request, and identify a second timing between the GC-PDCCH message and the first uplink reference signal transmission. In this example, UE 115-*c* may modify (e.g., at 740) the first uplink reference signal transmission based on at least one of the first timing and the second timing (e.g., in accordance with the techniques described herein, for example, with reference to FIG. 5). In some cases, the UE 115-*c* may modify a type of an LBT procedure based on at least one of the first timing and the second timing.

In some aspects, the SRS configuration information 715 may refer to or include DCI scheduling the first uplink reference signal transmission, where the DCI comprises an indication of the one or more available subbands for transmission of the first uplink reference signal transmission. In some aspects, UE 115-*c* may perform LBT at 725, and may identify (e.g., at 730) the one or more available subbands as subbands which the LBT procedure determines are clear for transmission of the first uplink reference signal transmission. In some aspects, UE 115-*c* may identify (e.g., at 735) an intersection (e.g., overlap) of the one or more configured subbands and the one or more available subbands (e.g., and the first uplink reference signal transmission may be transmitted over a set of subbands corresponding to the intersection at 745). In some cases, the one or more available subbands for transmission of the first uplink reference signal transmission are identified based on a UE capability (e.g., based on whether or not the UE 115-*c* is capable of transmitting the first uplink reference signal over contiguous subbands).

In some cases, UE 115-*c* may modify the first uplink reference signal transmission (e.g., at 740) by identifying a set of tones associated with the difference (e.g., identify a set of tones associated with the difference in configured subbands identified at 720 and available subbands identified at 730) and puncturing the first uplink reference signal transmission based on the set of tones. In some cases, UE 115-*c* may modify the first uplink reference signal transmission (e.g., at 740) by modifying a sequence length associated with the first uplink reference signal transmission based on the difference (e.g., UE 115-*c* may modify the sequence length associated with the first uplink reference signal transmission based on the intersection or overlap of configured subbands identified at 720 and available subbands identified at 730).

At 745, UE 115-*c* may transmit the modified first uplink reference signal transmission (e.g., based on the one or more available subbands) to base station 105-*c*. At 750, base station 105-*c* may monitor for uplink reference signal (e.g., SRS) transmission from the UE 115-*c*, and may receive the first uplink reference signal transmission. For example, base station 105-*c* may receive the first uplink reference signal transmission based on the SRS configuration information transmitted to UE 115-*c* at 715. In some cases, base station 105-*c* may compute a difference between configured subbands and available subbands, and the base station 105-*c* may detect SRS at 750 based on the computed difference.

Figure 8:
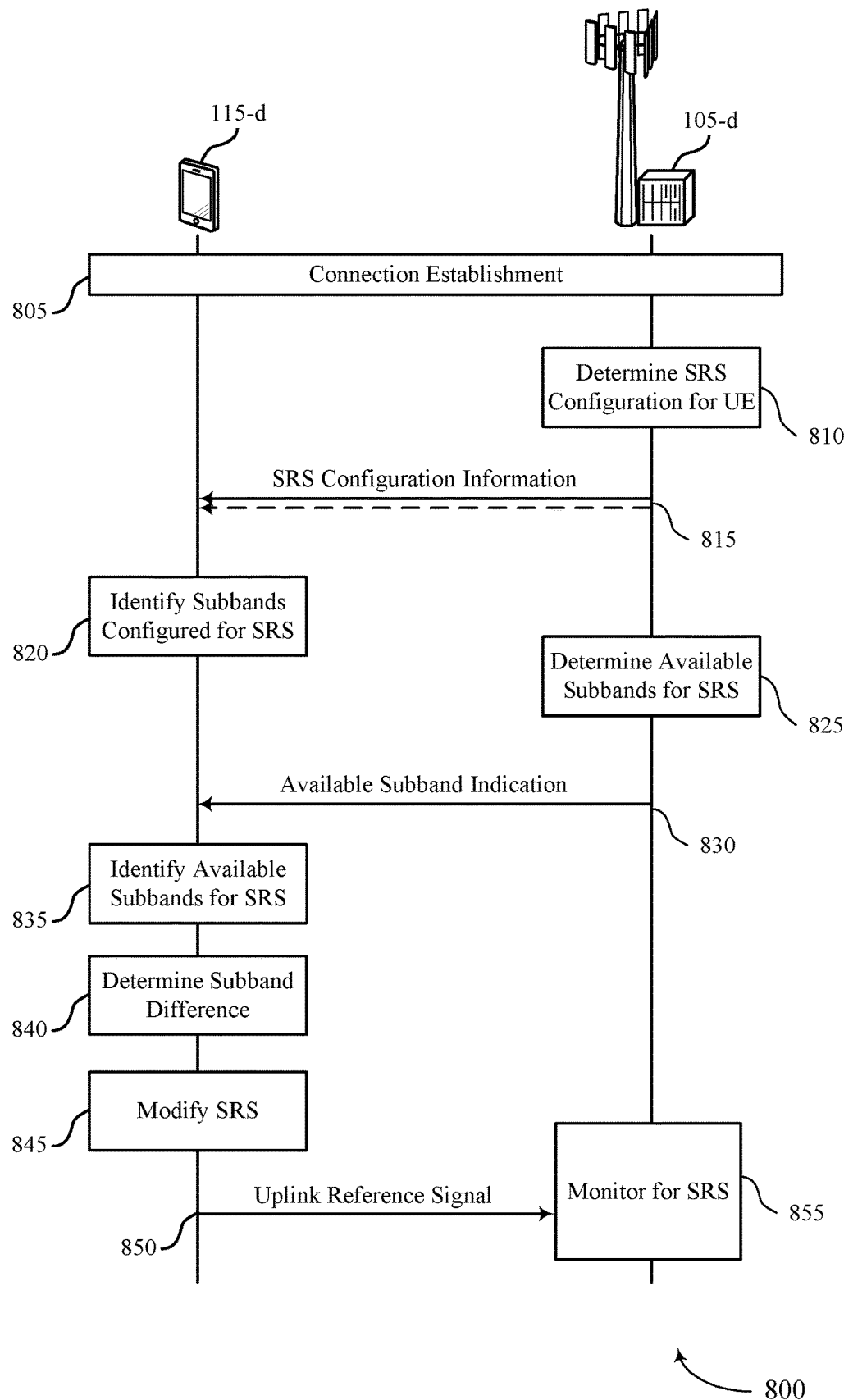
FIG. 8 illustrates an example of a process flow that supports SRS enhancements for unlicensed spectrum in accordance with aspects of the present disclosure.

FIG. 8 illustrates an example of a process flow 800 that supports SRS enhancements for unlicensed spectrum in accordance with aspects of the present disclosure. In some aspects, process flow 800 may be implemented by aspects of wireless communications system 100 and/or wireless communications system 200. The process flow 800 may include a base station 105-*d* and a UE 115-*d*, which may be examples of the corresponding devices described with reference to FIGS. 1 and 2. The base station 105-*d* may provide an SRS configuration and UE 115-*d* may transmit SRSs based on the SRS configuration in accordance with aspects of techniques discussed herein. In the following description of the process flow 800, the operations between UE 115-*d* and base station 105-*d* may be performed in a different order than the order shown, or at different times. Operations may also be left out of the process flow 800, or other operations may be added to the process flow 800. It is to be understood that while base station 105-*d* and UE 115-*d* are shown performing a number of the operations of process flow 800, any wireless device may perform the operations shown.

At 805, UE 115-*d* and base station 105-*d* may establish a connection (e.g., according to RRC connection establishment techniques). At 810, base station 105-*d* may determine an SRS configuration for the UE 115-*d*, and may transmit SRS configuration information (e.g., an SRS request) to the UE 115-*d* at 815. The SRS configuration information may include information related to SRS slot periods, SRS symbol periods, timing offsets, sets of SRS resources, subband information, an initial SRS transmission time, a cyclic prefix length, a cyclic postfix length, LBT type information, an SRS trigger, an SRS cancellation procedure, or any combinations thereof. For example, in some cases, the SRS configuration information may indicate one or more subbands configured for a first uplink reference signal transmission, one or more available subbands for transmission of the first uplink reference signal transmission, etc. In some cases, the SRS configuration information may be provided as part of the connection establishment procedure (e.g., at 805).

In some cases, the SRS configuration information may refer to one or more transmissions including portions or all of the SRS configuration information for the UE 115-*d*. For example, the SRS configuration information may be provided via DCI, GC-PDCCH, or some combination thereof. Base station 105-*d* may identify one or more subbands configured for a first uplink reference signal transmission by UE 115-*d* in a shared radio frequency channel, identify one or more available subbands for transmission of the first uplink reference signal transmission, determine a difference between the configured one or more subbands and the one or more available subbands, and include an indication of the one or more available subbands (e.g., based on the difference) in the SRS configuration information. The indication may be transmitted in DCI, transmitted in a GC-PDCCH message, or may be conveyed via transmission timing of DCI and GC-PDCCH. At 820, UE 115-*d* may identify one or more subbands configured for a first uplink reference signal transmission in a shared radio frequency channel (e.g., based on the SRS configuration information received at 815).

At 825, base station 105-*d* may determine available subbands, and at 830, base station 105-*d* may transmit an indication of the available subbands to the UE 115-*d*. For example, base station 105-*d* may perform LBT (e.g., an LBT procedure, such as a Cat4 LBT procedure), and may identify one or more available subbands for transmission of the first uplink reference signal transmission based on the performed LBT. The base station 105-*d* may then send an indication of the available subbands to the UE 115-*d*. In some cases, the indication at 830 may be sent depending on a difference in the subbands configured for SRS and the available subbands (e.g., in some cases, the indication of available subbands may be transmitted in cases where the available subbands are some subset of the subbands configured for SRS and the indication may not be transmitted when all the subbands configured for SRS are available).

At 835, UE 115-d may identify one or more available subbands for transmission of the first uplink reference signal transmission (e.g., based on the indication of available subbands received at 830, based on an LBT procedure that may be performed, etc.). At 840, UE 115-d may determine a difference between the configured one or more subbands and the one or more available subbands. At 845, UE 115-d may modify the first uplink reference signal transmission based on the SRS configuration information and the indication of available subbands received at 830. For example, the UE 115-d may modify the first uplink reference signal transmission based on the difference determined at 840.

In some aspects, UE 115-d may identify (e.g., at 840) an intersection (e.g., overlap) of the one or more configured subbands and the one or more available subbands (e.g., and the first uplink reference signal transmission may be transmitted over a set of subbands corresponding to the intersection at 850). In some cases, the one or more available subbands for transmission of the first uplink reference signal transmission are identified based on a UE capability (e.g., based on whether or not the UE 115-d is capable of transmitting the first uplink reference signal over contiguous subbands).

In some cases, UE 115-d may modify the first uplink reference signal transmission (e.g., at 845) by identifying a set of tones associated with the difference (e.g., identify a set of tones associated with the difference in configured subbands identified at 820 and available subbands identified at 835) and puncturing the first uplink reference signal transmission based on the set of tones. In some cases, UE 115-d may modify the first uplink reference signal transmission (e.g., at 845) by modifying a sequence length associated with the first uplink reference signal transmission based on the difference (e.g., UE 115-d may modify the sequence length associated with the first uplink reference signal transmission based on the intersection or overlap of configured subbands identified at 820 and available subbands identified at 835).

At 850, UE 115-d may transmit the modified first uplink reference signal transmission (e.g., based on the one or more available subbands) to base station 105-d. At 855, base station 105-d may monitor for uplink reference signal (e.g., SRS) transmission from the UE 115-d, and may receive the first uplink reference signal transmission. For example, base station 105-d may receive the first uplink reference signal transmission based on the SRS configuration information transmitted to UE 115-d at 815. Generally, the base station 105-d may detect SRS at 855 based on the configured subbands (e.g., indicated at 815) and the available subbands (e.g., indicated at 830). In some cases, base station 105-d may compute a difference between configured subbands and available subbands, and the base station 105-d may detect SRS at 855 based on the computed difference (e.g., the base station may detect SRS at 855 based on a difference in subbands configured for SRS, available subbands, and UE capability regarding usage of available subbands).

Figure 9:
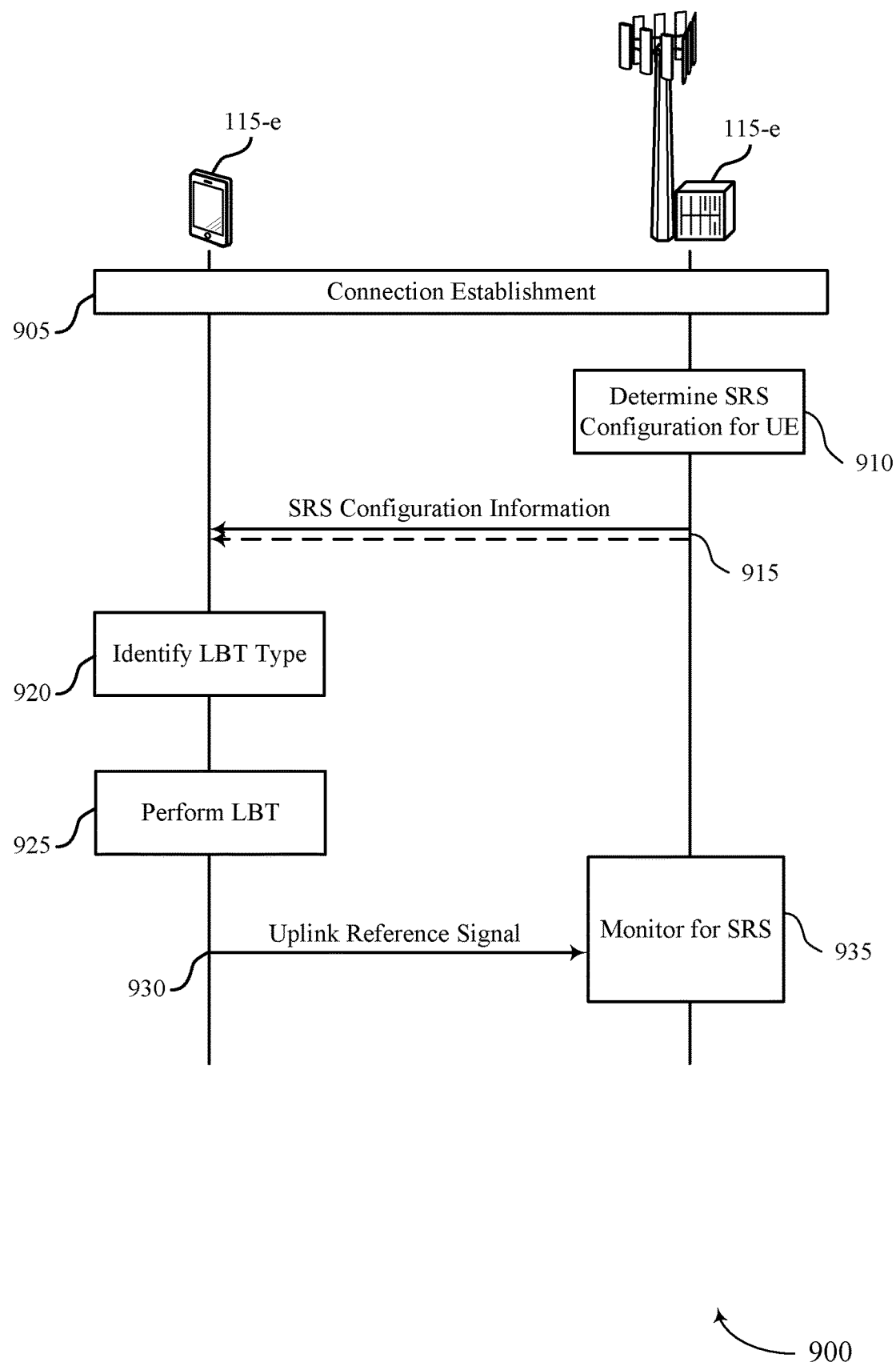
FIG. 9 illustrates an example of a process flow that supports SRS enhancements for unlicensed spectrum in accordance with aspects of the present disclosure.

FIG. 9 illustrates an example of a process flow 900 that supports SRS enhancements for unlicensed spectrum in accordance with aspects of the present disclosure. In some aspects, process flow 900 may be implemented by aspects of wireless communications system 100 and/or wireless communications system 200. The process flow 900 may include a base station 105-e and a UE 115-e, which may be examples of the corresponding devices described with reference to FIGS. 1 and 2. The base station 105-e may provide an SRS configuration and UE 115-e may transmit SRSs based on the SRS configuration in accordance with aspects of techniques discussed herein. In the following description of the process flow 900, the operations between UE 115-e and base station 105-e may be transmitted or may be performed in a different order than the order shown, or at different times. Operations may also be left out of the process flow 900, or other operations may be added to the process flow 900. It is to be understood that while base station 105-e and UE 115-e are shown performing a number of the operations of process flow 900, any wireless device may perform the operations shown.

At 905, UE 115-e and base station 105-e may establish a connection (e.g., according to RRC connection establishment techniques). At 910, base station 105-e may determine an SRS configuration for the UE 115-e, and may transmit SRS configuration information (e.g., an SRS request) to the UE 115-e at 915. The SRS configuration information may include information related to SRS slot periods, SRS symbol periods, timing offsets, sets of SRS resources, subband information, an initial SRS transmission time, a cyclic prefix length, a cyclic postfix length, LBT type information, an SRS trigger, an SRS cancellation procedure, or any combinations thereof. In some cases, the SRS configuration information may be provided as part of the connection establishment procedure (e.g., at 905). In some cases, the SRS configuration information may be provided via DCI, GC-PDCCH, or some combination thereof.

At 920, UE 115-e may identify a first type of a first LBT procedure for transmission of the first uplink reference signal transmission based on the received SRS configuration information (e.g., based on the received SRS request). For example, in some cases, the SRS configuration information may refer to or include a GC-PDCCH transmission, where the first type is identified based on the GC-PDCCH transmission. In some cases, the SRS configuration information may refer to or include DCI, where the first type is identified based on the DCI and the DCI comprises an indication triggering the first uplink reference signal transmission. In some cases, UE 115-e may identify an absence of an indication canceling the first uplink reference signal transmission in the DCI, where the first uplink reference signal transmission is transmitted (e.g., at 930) based on the absence of the indication in the DCI. In some cases, the DCI includes a UE-specific indication of the first type, a UE group-specific indication of the first type, an SRS-specific indication of the first type, or a combination thereof.

In some cases, UE 115-e may identify a gap between a downlink transmission and the first uplink reference signal transmission based on the received DCI, where the first type is identified (e.g., at 920) based on a duration of the gap. In some cases, UE 115-e may identify a grant for an uplink transmission, identify a second type of a second LBT procedure for the uplink transmission based on the grant, and determine (e.g., at 920) the first type based on the second type and a gap between the uplink transmission and the first uplink reference signal transmission.

In some cases, the DCI may be received (e.g., at 915) during a first time period reserved by base station 105-e for the shared radio frequency channel, and the DCI may include an SRS resource set configuration for a second time period reserved by the base station 105-e for the shared radio frequency channel. The first type may be identified (e.g., at 920) based on the SRS resource set configuration, and the first uplink reference signal transmission may be transmitted (e.g., at 930) during the second time period reserved by the base station 105-e for the shared radio frequency channel.

At 925, UE 115-e may perform LBT (e.g., an LBT procedure, such as a Cat4 LBT procedure) based on the first type identified at 920. At 930, UE 115-*e* may transmit the first uplink reference signal transmission based on the LBT procedure performed at 925 (e.g., upon successful LBT). At 935, base station 105-*e* may monitor for uplink reference signal (e.g., SRS) transmission from the UE 115-*e*, and may receive the first uplink reference signal transmission. For example, base station 105-*e* may receive the first uplink reference signal transmission based on the SRS configuration determined at 910.

Figure 10:
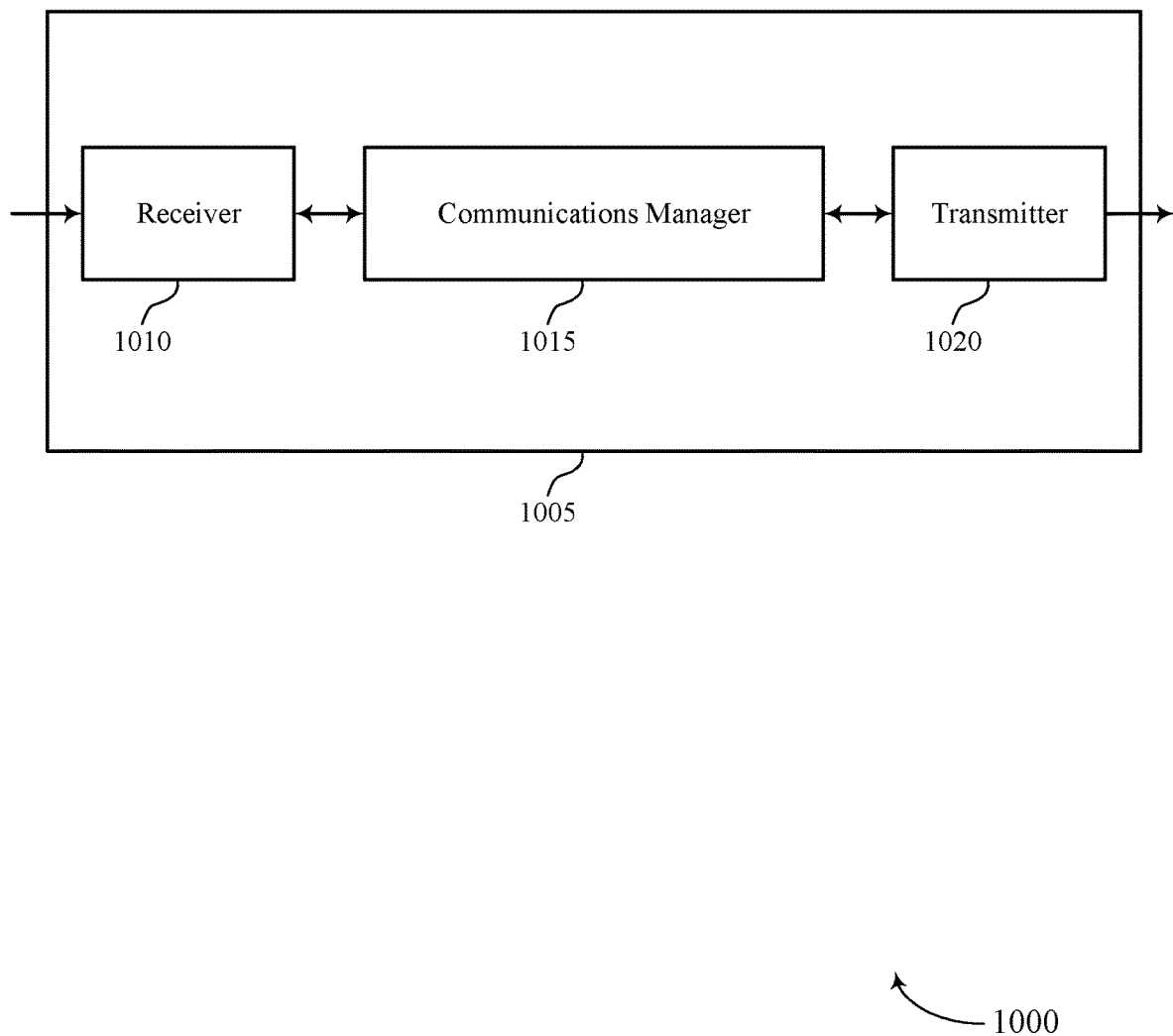
FIGS. 10 and 11 show block diagrams of devices that support SRS enhancements for unlicensed spectrum in accordance with aspects of the present disclosure.

FIG. 10 shows a block diagram 1000 of a device 1005 that supports SRS enhancements for unlicensed spectrum in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to SRS enhancements for unlicensed spectrum, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify scheduling of a first uplink reference signal transmission and a second uplink reference signal transmission for a shared radio frequency channel, identify a transmission gap between the first uplink reference signal transmission and the second uplink reference signal transmission, modify at least one of the first uplink reference signal transmission or the second uplink reference signal transmission based on the identified transmission gap and a maximum channel vacancy time duration, and transmit the first uplink reference signal transmission and the second uplink reference signal transmission.

The communications manager 1015 may also identify scheduling of a first uplink reference signal transmission and a second uplink reference signal transmission for a shared radio frequency channel, identify a transmission gap between the first uplink reference signal transmission and the second uplink reference signal transmission based on a configured subcarrier spacing, transmit the first uplink reference signal transmission, transmit the second uplink reference signal transmission based on the performed LBT procedure, and perform a LBT procedure during the transmission gap after transmitting the first uplink reference signal transmission.

The communications manager 1015 may also identify one or more subbands configured for a first uplink reference signal transmission in a shared radio frequency channel, identify one or more available subbands for transmission of the first uplink reference signal transmission, determine a difference between the configured one or more subbands and the one or more available subbands, modify the first uplink reference signal transmission based on the difference, and transmit the modified first uplink reference signal transmission based on the one or more available subbands.

The communications manager 1015 may also receive DCI scheduling at least a first uplink reference signal transmission for a shared radio frequency channel, identify a first type of a first LBT procedure for transmission of the first uplink reference signal transmission based on the received SRS request, perform the first LBT procedure based on the identified first type, and transmit the first uplink reference signal transmission based on the performed first LBT procedure. The communications manager 1015 may be an example of aspects of the communications manager 1310 described herein.

The actions performed by the communications manager 1015 as described herein may be implemented to realize one or more potential advantages. One implementation may enable a UE to transmit an SRS transmission using transmit antenna switching techniques as well as extended CPs, postfixes, or both. The antenna switching may enable a UE to improve signal quality for communication via a shared channel, which may result in reduced signaling overhead (e.g., due to retransmissions) at the UE, among other advantages.

Based on implementing the antenna switching as described herein, a processor of a UE or base station (e.g., a processor controlling the receiver 1010, the communications manager 1015, the transmitter 1020, or a combination thereof) may reduce the impact or likelihood of inaccurate or out-of-date metrics regarding the UE channel quality while ensuring relatively efficient communications. For example, the SRS transmission techniques described herein may leverage a length of an extended CP, postfix, or both such that gaps between SRS transmissions are long enough for antenna switching operations, which may realize resource allocation improvements, among other benefits.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some aspects, the communications manager 1015, or its sub-components, may be a separate and distinct component in accordance with various aspects of the present disclosure. In some aspects, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some aspects, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
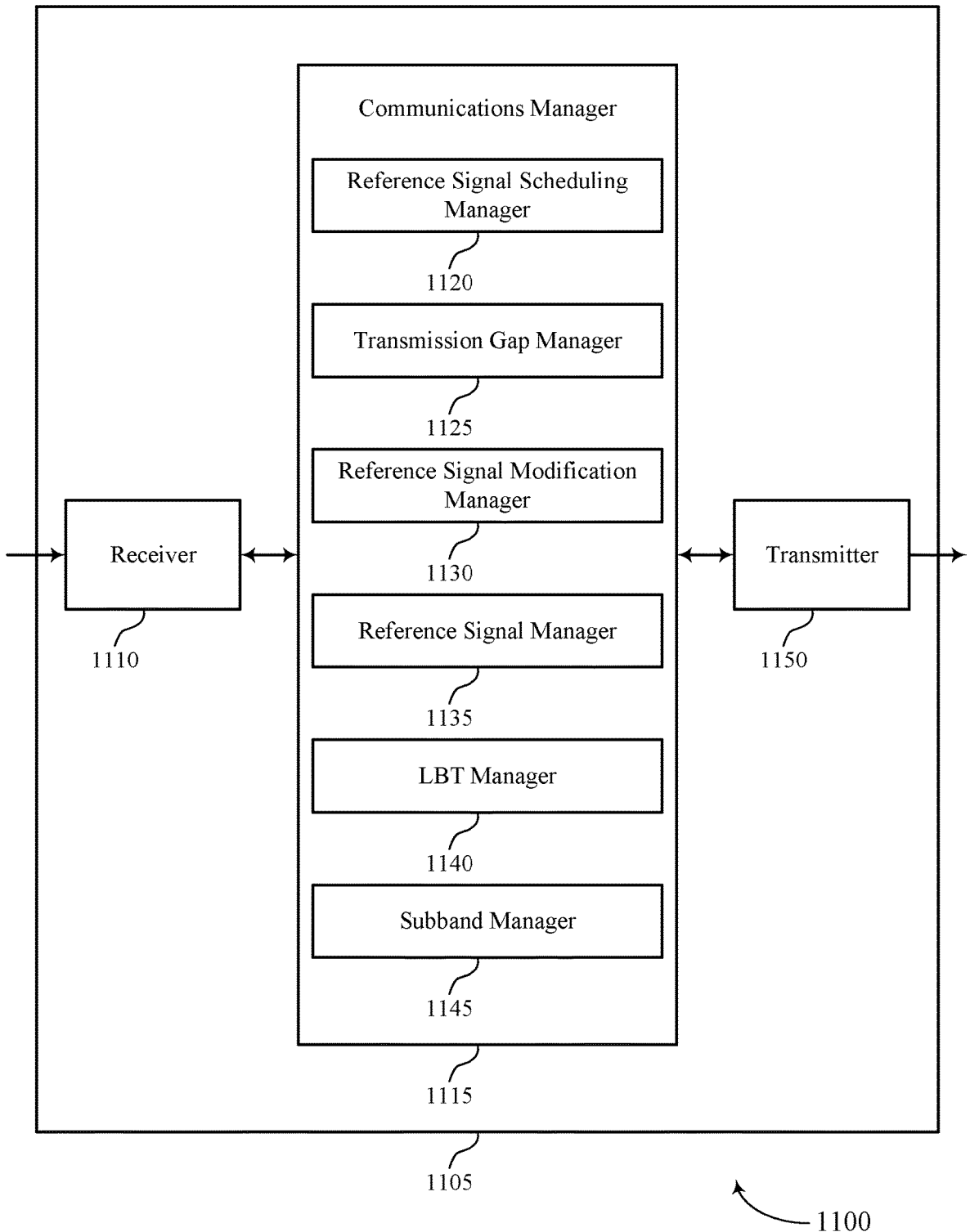

FIG. 11 shows a block diagram 1100 of a device 1105 that supports SRS enhancements for unlicensed spectrum in accordance with aspects of the present disclosure. The device 1105 may be an example of aspects of a device 1005, or a UE 115 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to SRS enhancements for unlicensed spectrum, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reference signal scheduling manager 1120, a transmission gap manager 1125, a reference signal modification manager 1130, a reference signal manager 1135, an LBT manager 1140, and a subband manager 1145. The communications manager 1115 may be an example of aspects of the communications manager 1310 described herein.

The reference signal scheduling manager 1120 may identify scheduling of a first uplink reference signal transmission and a second uplink reference signal transmission for a shared radio frequency channel. The transmission gap manager 1125 may identify a transmission gap between the first uplink reference signal transmission and the second uplink reference signal transmission. The reference signal modification manager 1130 may modify at least one of the first uplink reference signal transmission or the second uplink reference signal transmission based on the identified transmission gap and a maximum channel vacancy time duration. The reference signal manager 1135 may transmit the first uplink reference signal transmission and the second uplink reference signal transmission.

The reference signal scheduling manager 1120 may identify scheduling of a first uplink reference signal transmission and a second uplink reference signal transmission for a shared radio frequency channel. The transmission gap manager 1125 may identify a transmission gap between the first uplink reference signal transmission and the second uplink reference signal transmission based on a configured subcarrier spacing. The reference signal manager 1135 may transmit the first uplink reference signal transmission. The LBT manager 1140 may perform an LBT procedure during the transmission gap after transmitting the first uplink reference signal transmission. The reference signal manager 1135 may transmit the second uplink reference signal transmission based on the performed LBT procedure.

The subband manager 1145 may identify one or more subbands configured for a first uplink reference signal transmission in a shared radio frequency channel, identify one or more available subbands for transmission of the first uplink reference signal transmission, and determine a difference between the configured one or more subbands and the one or more available subbands. The reference signal modification manager 1130 may modify the first uplink reference signal transmission based on the difference. The reference signal manager 1135 may transmit the modified first uplink reference signal transmission based on the one or more available subbands.

The reference signal scheduling manager 1120 may receive DCI scheduling at least a first uplink reference signal transmission for a shared radio frequency channel. The LBT manager 1140 may identify a first type of a first LBT procedure for transmission of the first uplink reference signal transmission based on the received SRS request and perform the first LBT procedure based on the identified first type. The reference signal manager 1135 may transmit the first uplink reference signal transmission based on the performed first LBT procedure.

The transmitter 1150 may transmit signals generated by other components of the device 1105. In some aspects, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
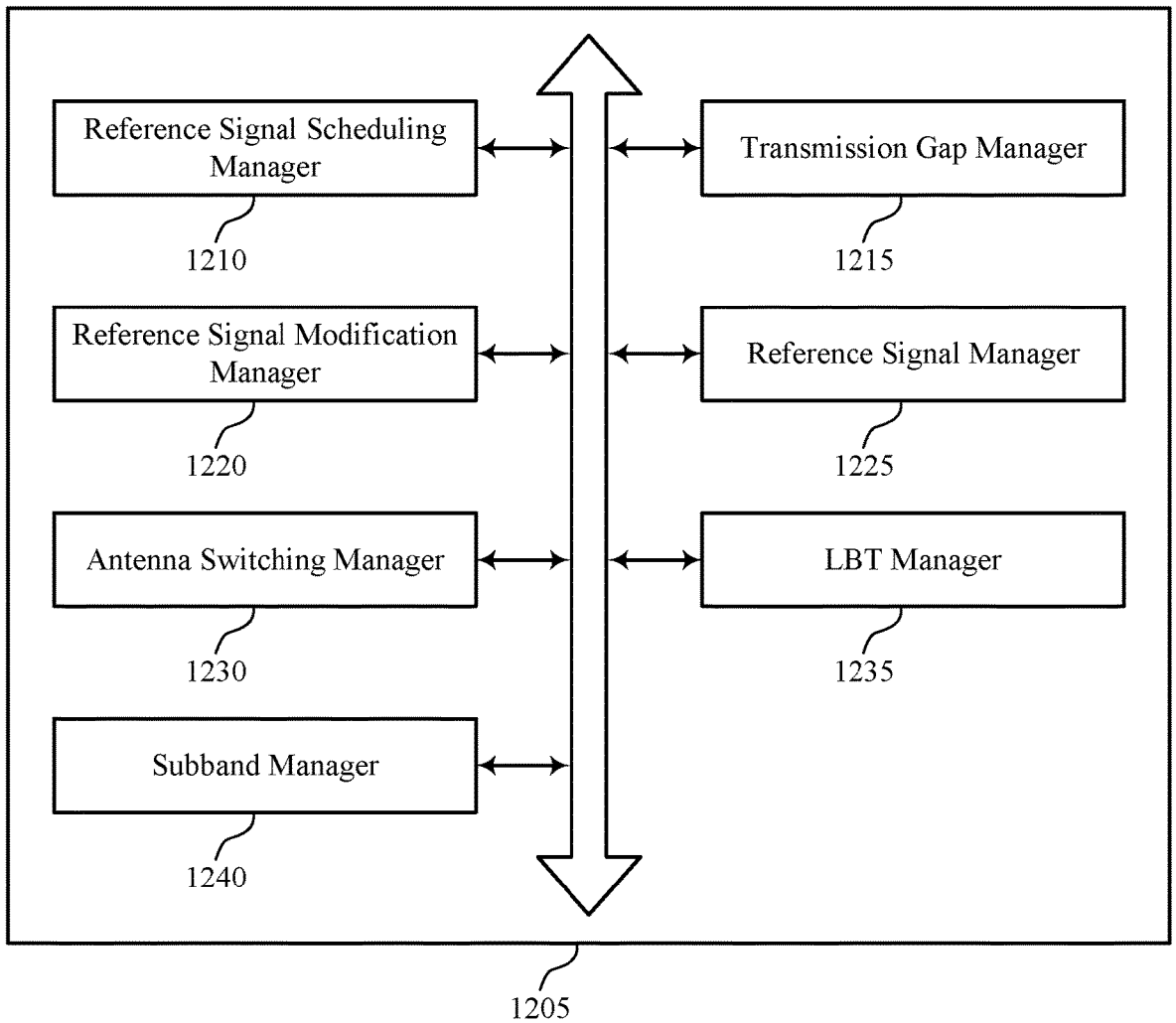
FIG. 12 shows a block diagram of a communications manager that supports SRS enhancements for unlicensed spectrum in accordance with aspects of the present disclosure.

FIG. 12 shows a block diagram 1200 of a communications manager 1205 that supports SRS enhancements for unlicensed spectrum in accordance with aspects of the present disclosure. The communications manager 1205 may be an example of aspects of a communications manager 1015, a communications manager 1115, or a communications manager 1310 described herein. The communications manager 1205 may include a reference signal scheduling manager 1210, a transmission gap manager 1215, a reference signal modification manager 1220, a reference signal manager 1225, an antenna switching manager 1230, an LBT manager 1235, and a subband manager 1240. Each of these modules may communicate, directly or indirectly, with one another (e.g., via one or more buses).

The reference signal scheduling manager 1210 may identify scheduling of a first uplink reference signal transmission and a second uplink reference signal transmission for a shared radio frequency channel. In some aspects, the reference signal scheduling manager 1210 may identify scheduling of a first uplink reference signal transmission and a second uplink reference signal transmission for a shared radio frequency channel. In some aspects, the reference signal scheduling manager 1210 may receive DCI scheduling at least a first uplink reference signal transmission for a shared radio frequency channel. In some aspects, the reference signal scheduling manager 1210 may identify scheduling of a third uplink reference signal transmission and a fourth uplink reference signal transmission, where the first, second, third, and fourth uplink reference signal transmissions are scheduled to be within a single slot.

In some aspects, the reference signal scheduling manager 1210 may receive an SRS request scheduling the first uplink reference signal transmission. In some aspects, receiving DCI scheduling the first uplink reference signal transmission, where the DCI includes an indication of the one or more available subbands for transmission of the first uplink reference signal transmission. In some aspects, the reference signal scheduling manager 1210 may identify an absence of an indication canceling the first uplink reference signal transmission in the DCI, where the first uplink reference signal transmission is transmitted based on the absence of the indication in the DCI. In some cases, the first uplink reference signal transmission and the second uplink reference signal transmission are scheduled in a time period reserved by a base station for the shared radio frequency channel. In some cases, the DCI includes an indication triggering the first uplink reference signal transmission. In some cases, the DCI is received during a first time period reserved by a base station for the shared radio frequency channel and the DCI includes an SRS resource set configuration for a second time period reserved by the base station for the shared radio frequency channel.

The transmission gap manager 1215 may identify a transmission gap between the first uplink reference signal transmission and the second uplink reference signal transmission. In some aspects, the transmission gap manager 1215 may identify a transmission gap between the first uplink reference signal transmission and the second uplink reference signal transmission based on a configured subcarrier spacing. In some aspects, the transmission gap manager 1215 may identify a gap between a downlink transmission and the first uplink reference signal transmission based on the received DCI, where the first type is identified based on a duration of the gap. In some cases, the transmission gap includes a number of symbols between the first uplink reference signal transmission and the second uplink reference signal transmission, the number of symbols based on the configured subcarrier spacing.

The reference signal modification manager 1220 may modify at least one of the first uplink reference signal transmission or the second uplink reference signal transmission based on the identified transmission gap and a maximum channel vacancy time duration. In some aspects, the reference signal modification manager 1220 may modify the first uplink reference signal transmission based on the difference. In some aspects, the reference signal modification manager 1220 may extend a cyclic prefix of the second uplink reference signal transmission into the identified transmission gap, where a time duration between the first uplink reference signal transmission and the extended cyclic prefix of the second uplink reference signal transmission is less than the maximum channel vacancy time duration.

In some aspects, the reference signal modification manager 1220 may add a postfix to the first uplink reference signal transmission during the identified transmission gap, where a time duration between the postfix of the first uplink reference signal transmission and the second uplink reference signal transmission is less than the maximum channel vacancy time duration. In some aspects, the reference signal modification manager 1220 may identify a first timing between the group common physical downlink control channel message and the SRS request. In some aspects, the reference signal modification manager 1220 may identify a second timing between the group common physical downlink control channel message and the first uplink reference signal transmission, where the first uplink reference signal transmission is modified based on at least one of the first timing and the second timing.

In some aspects, the reference signal modification manager 1220 may identify a set of tones associated with the difference. In some aspects, the reference signal modification manager 1220 may puncture the first uplink reference signal transmission based on the set of tones, where the first uplink reference signal transmission is modified based on the puncturing. In some aspects, the reference signal modification manager 1220 may modify a sequence length associated with the first uplink reference signal transmission based on the difference. In some cases, the DCI includes an indication canceling a second uplink reference signal transmission.

The reference signal manager 1225 may transmit the first uplink reference signal transmission and the second uplink reference signal transmission. In some aspects, the reference signal manager 1225 may transmit the first uplink reference signal transmission. In some aspects, the reference signal manager 1225 may transmit the second uplink reference signal transmission based on the performed LBT procedure. In some aspects, the reference signal manager 1225 may transmit the modified first uplink reference signal transmission based on the one or more available subbands. In some aspects, the reference signal manager 1225 may transmit the first uplink reference signal transmission based on the performed first LBT procedure. In some aspects, the reference signal manager 1225 may transmit the modified first uplink reference signal transmission via a first antenna. In some aspects, the reference signal manager 1225 may transmit the modified second uplink reference signal transmission via the second antenna. In some aspects, the reference signal manager 1225 may transmit the first uplink reference signal transmission over a set of subbands including an intersection of the one or more configured subbands and the one or more available subbands.

The LBT manager 1235 may perform an LBT procedure during the transmission gap after transmitting the first uplink reference signal transmission. In some aspects, the LBT manager 1235 may identify a first type of a first LBT procedure for transmission of the first uplink reference signal transmission based on the received SRS request. In some aspects, the LBT manager 1235 may perform the first LBT procedure based on the identified first type. In some aspects, the LBT manager 1235 may modify a type of a first LBT procedure based on at least one of the first timing and the second timing. In some aspects, the LBT manager 1235 may perform an LBT procedure on the scheduled one or more subbands. In some aspects, the LBT manager 1235 may receive a group common physical downlink control channel transmission, where the first type is identified based on the group common physical downlink control channel transmission.

In some aspects, the LBT manager 1235 may identify a grant for an uplink transmission. In some aspects, the LBT manager 1235 may identify a second type of a second LBT procedure for the uplink transmission based on the grant. In some aspects, the LBT manager 1235 may determine the first type based on the second type and a gap between the uplink transmission and the first uplink reference signal transmission. In some cases, the first type is identified based on the DCI. In some cases, the DCI includes a UE-specific indication of the first type, a UE group-specific indication of the first type, an SRS-specific indication of the first type, or a combination thereof. In some cases, the first type is identified based on the SRS resource set configuration and the first uplink reference signal transmission is transmitted during the second time period reserved by the base station for the shared radio frequency channel.

The subband manager 1240 may identify one or more subbands configured for a first uplink reference signal transmission in a shared radio frequency channel. In some aspects, the subband manager 1240 may identify one or more available subbands for transmission of the first uplink reference signal transmission. In some aspects, the subband manager 1240 may determine a difference between the configured one or more subbands and the one or more available subbands. In some aspects, the subband manager 1240 may receive a group common physical downlink control channel message, where the group common physical downlink control channel message indicates the one or more available subbands. In some aspects, the subband manager 1240 may drop the first uplink reference signal transmission for at least one subband based on the difference. In some aspects, the subband manager 1240 may identify the one or more available subbands as subbands which the LBT procedure determines are clear for transmission of the first uplink reference signal transmission. In some cases, the one or more available subbands for transmission of the first uplink reference signal transmission are identified based on a UE capability associated with transmissions spanning a plurality of subbands.

The antenna switching manager 1230 may identify an antenna switching time, where modifying the at least one of the first uplink reference signal transmission or the second uplink reference signal transmission is based on the identified antenna switching time. In some aspects, the antenna switching manager 1230 may switch a transmission path from the first antenna to a second antenna after transmitting the modified first uplink reference signal transmission.

Figure 13:
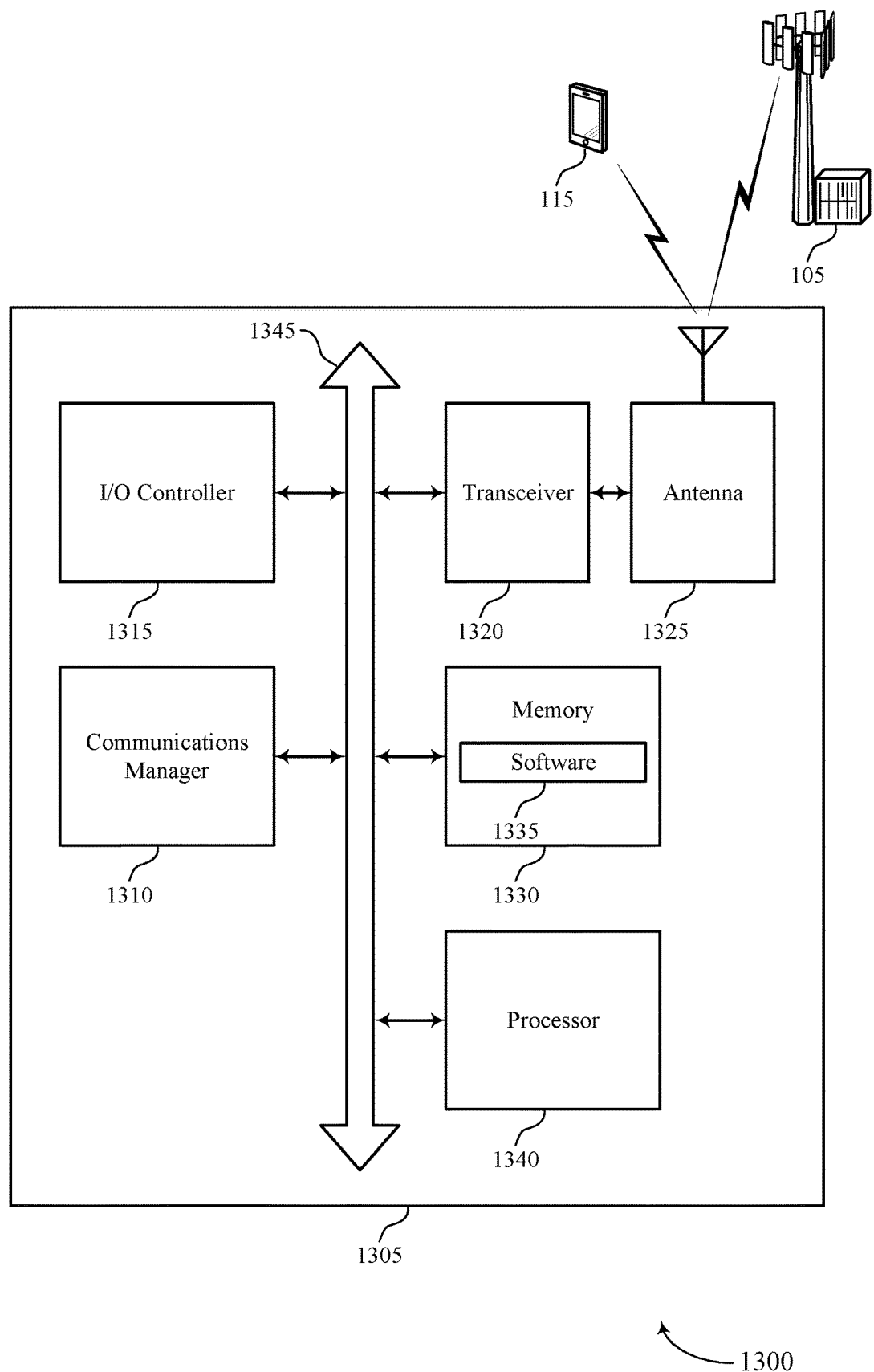
FIG. 13 shows a diagram of a system including a device that supports SRS enhancements for unlicensed spectrum in accordance with aspects of the present disclosure.

FIG. 13 shows a diagram of a system 1300 including a device 1305 that supports SRS enhancements for unlicensed spectrum in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify scheduling of a first uplink reference signal transmission and a second uplink reference signal transmission for a shared radio frequency channel, identify a transmission gap between the first uplink reference signal transmission and the second uplink reference signal transmission, modify at least one of the first uplink reference signal transmission or the second uplink reference signal transmission based on the identified transmission gap and a maximum channel vacancy time duration, and transmit the first uplink reference signal transmission and the second uplink reference signal transmission.

The communications manager 1310 may also identify scheduling of a first uplink reference signal transmission and a second uplink reference signal transmission for a shared radio frequency channel, identify a transmission gap between the first uplink reference signal transmission and the second uplink reference signal transmission based on a configured subcarrier spacing, transmit the first uplink reference signal transmission, transmit the second uplink reference signal transmission based on the performed LBT procedure, and perform a LBT procedure during the transmission gap after transmitting the first uplink reference signal transmission.

The communications manager 1310 may also identify one or more subbands configured for a first uplink reference signal transmission in a shared radio frequency channel, identify one or more available subbands for transmission of the first uplink reference signal transmission, determine a difference between the configured one or more subbands and the one or more available subbands, modify the first uplink reference signal transmission based on the difference, and transmit the modified first uplink reference signal transmission based on the one or more available subbands.

The communications manager 1310 may also receive DCI scheduling at least a first uplink reference signal transmission for a shared radio frequency channel, identify a first type of a first LBT procedure for transmission of the first uplink reference signal transmission based on the received SRS request, perform the first LBT procedure based on the identified first type, and transmit the first uplink reference signal transmission based on the performed first LBT procedure.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and ROM. The memory 1330 may store computer-readable, computer-executable code or software 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting SRS enhancements for unlicensed spectrum).

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
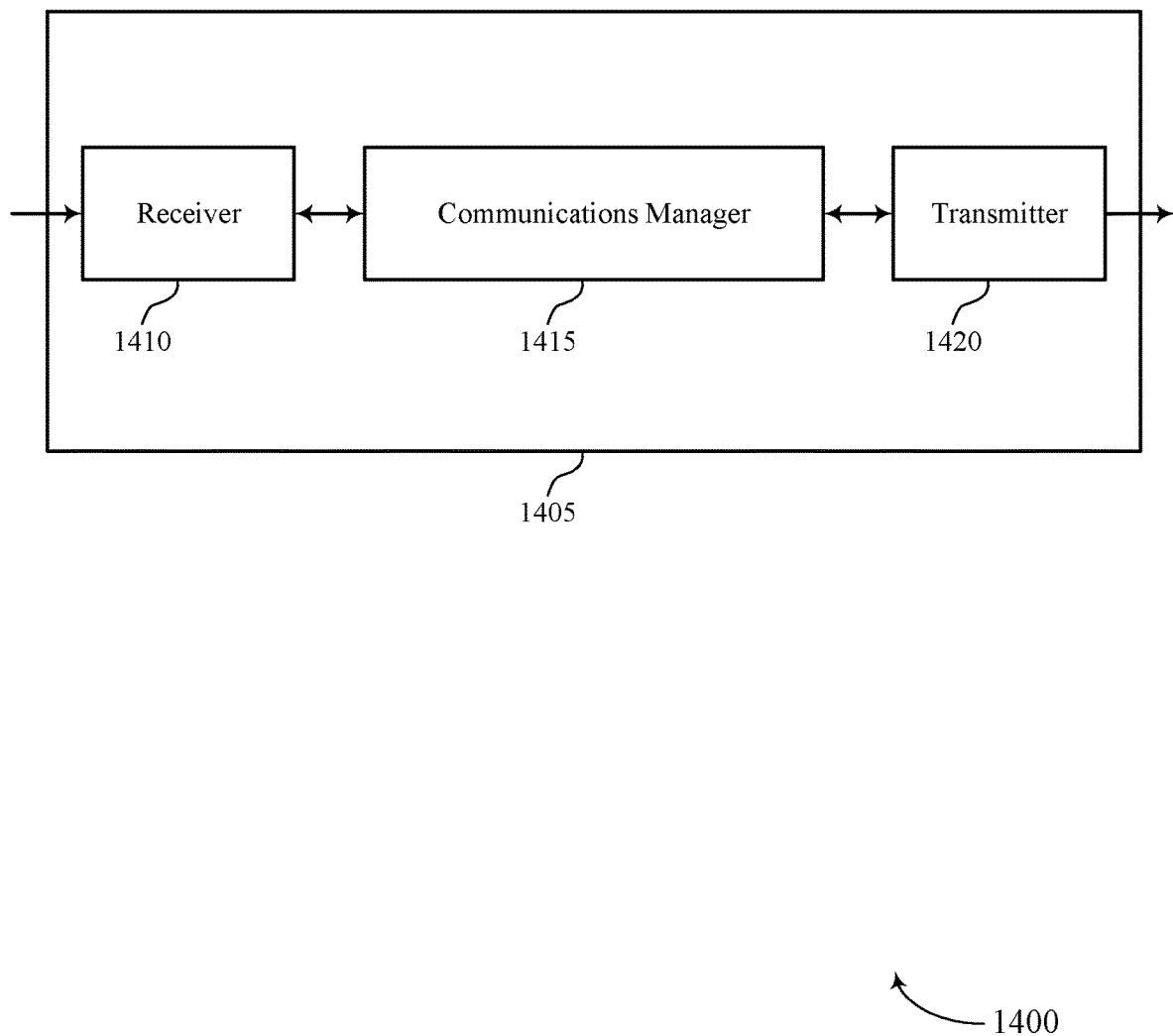
FIGS. 14 and 15 show block diagrams of devices that support SRS enhancements for unlicensed spectrum in accordance with aspects of the present disclosure.

FIG. 14 shows a block diagram 1400 of a device 1405 that supports SRS enhancements for unlicensed spectrum in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to SRS enhancements for unlicensed spectrum, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit a SRS request to a UE, where the SRS request indicates scheduling of a first uplink reference signal transmission and a second uplink reference signal transmission for a shared radio frequency channel by the UE, identify a transmission gap between the first uplink reference signal transmission and the second uplink reference signal transmission, determine a modification of at least one of the first uplink reference signal transmission or the second uplink reference signal transmission based on the identified transmission gap and a maximum channel vacancy time duration, and receive the first uplink reference signal transmission and the second uplink reference signal transmission.

The communications manager 1415 may also identify one or more subbands configured for a first uplink reference signal transmission by a UE in a shared radio frequency channel, identify one or more available subbands for transmission of the first uplink reference signal transmission, transmit an indication of the one or more available subbands, determine a difference between the configured one or more subbands and the one or more available subbands, and receive the first uplink reference signal transmission based on the indication of the one or more available subbands (e.g., the communications manager 1415 may compute the difference between the configured one or more subbands and the one or more available subbands, and the communications manager 1415 may detect SRS based on the computed difference).

The communications manager 1415 may also identify a first type of a first LBT procedure for a UE transmission of a first uplink reference signal transmission for a shared radio frequency channel, transmit an SRS request in DCI scheduling at least the first uplink reference signal transmission, where the SRS request is transmitted based on the first type, and receive the first uplink reference signal transmission based on the transmitted sounding reference signal request. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some aspects, the communications manager 1415, or its sub-components, may be a separate and distinct component in accordance with various aspects of the present disclosure. In some aspects, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some aspects, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
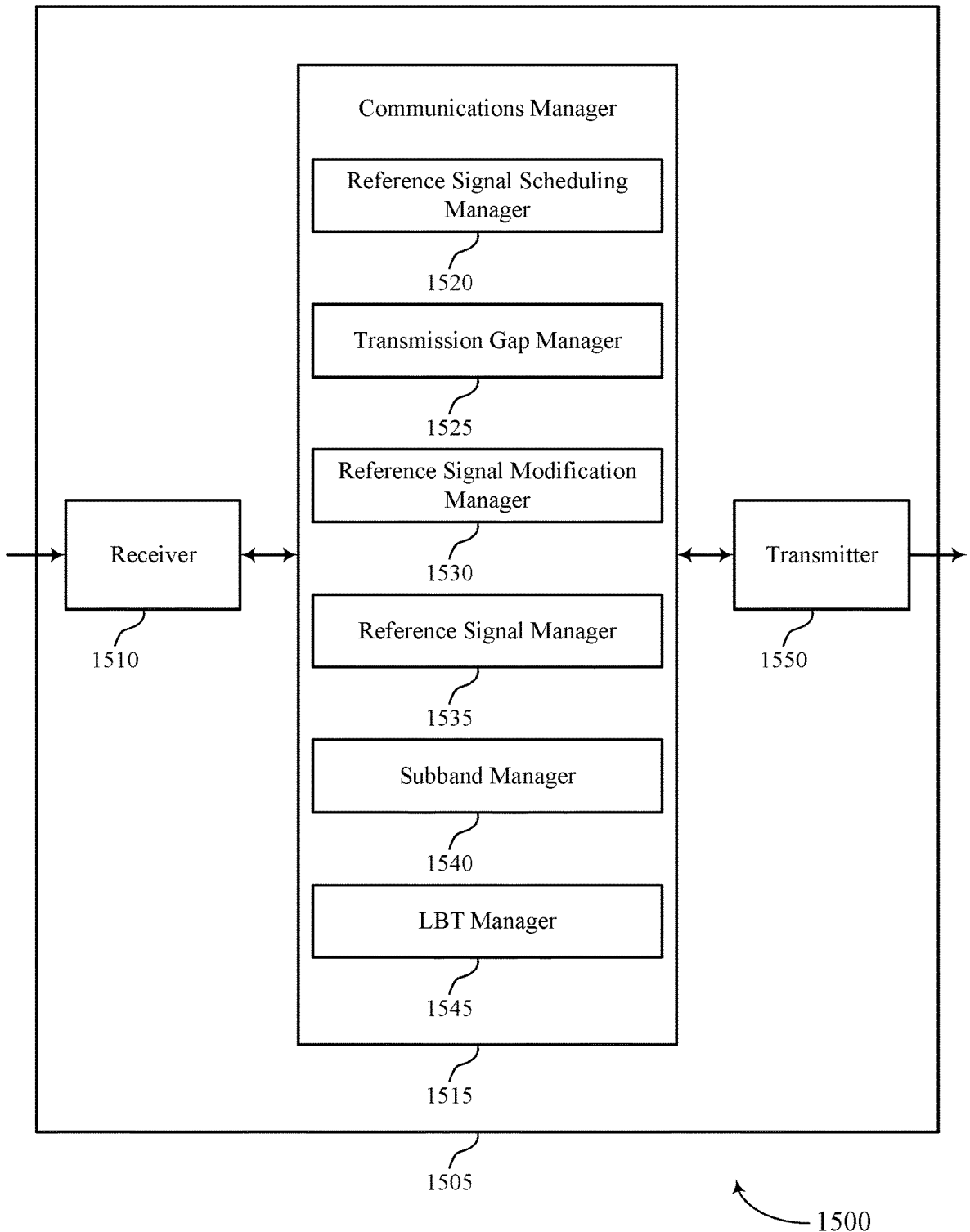

FIG. 15 shows a block diagram 1500 of a device 1505 that supports SRS enhancements for unlicensed spectrum in accordance with aspects of the present disclosure. The device 1405 may be an example of aspects of a device 1505, or a base station 105 as described herein. The device 1505 may include a receiver 1510, a communications manager 1515, and a transmitter 1550. The device 1505 may also include a processor. Each of these components may be in communication with one another (e.g., via one or more buses).

The receiver 1510 may receive information such as packets, user data, or control information associated with various information channels (e.g., control channels, data channels, and information related to SRS enhancements for unlicensed spectrum, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a reference signal scheduling manager 1520, a transmission gap manager 1525, a reference signal modification manager 1530, a reference signal manager 1535, a subband manager 1540, and an LBT manager 1545. The communications manager 1515 may be an example of aspects of the communications manager 1710 described herein.

The reference signal scheduling manager 1520 may transmit an SRS request to a UE, where the SRS request indicates scheduling of a first uplink reference signal transmission and a second uplink reference signal transmission for a shared radio frequency channel by the UE. The transmission gap manager 1525 may identify a transmission gap between the first uplink reference signal transmission and the second uplink reference signal transmission. The reference signal modification manager 1530 may determine a modification of at least one of the first uplink reference signal transmission or the second uplink reference signal transmission based on the identified transmission gap and a maximum channel vacancy time duration. The reference signal manager 1535 may receive the first uplink reference signal transmission and the second uplink reference signal transmission.

The subband manager 1540 may identify one or more subbands configured for a first uplink reference signal transmission by a UE in a shared radio frequency channel, identify one or more available subbands for transmission of the first uplink reference signal transmission, and transmit an indication of the one or more available subbands. The reference signal manager 1535 may determine a difference between the configured one or more subbands and the one or more available subbands, and the reference signal manager 1535 may receive the first uplink reference signal transmission based on the indication of the one or more available subbands (e.g., and based on the determined difference between the configured one or more subbands and the one or more available subbands).

The LBT manager 1545 may identify a first type of a first LBT procedure for a UE transmission of a first uplink reference signal transmission for a shared radio frequency channel. The reference signal scheduling manager 1520 may transmit an SRS request in DCI scheduling at least the first uplink reference signal transmission, where the SRS request is transmitted based on the first type. The reference signal manager 1535 may receive the first uplink reference signal transmission based on the transmitted SRS request.

The transmitter 1550 may transmit signals generated by other components of the device 1505. In some aspects, the transmitter 1550 may be collocated with a receiver 1510 in a transceiver module. For example, the transmitter 1550 may be an example of aspects of the transceiver 1720 described with reference to FIG. 17. The transmitter 1550 may utilize a single antenna or a set of antennas.

Figure 16:
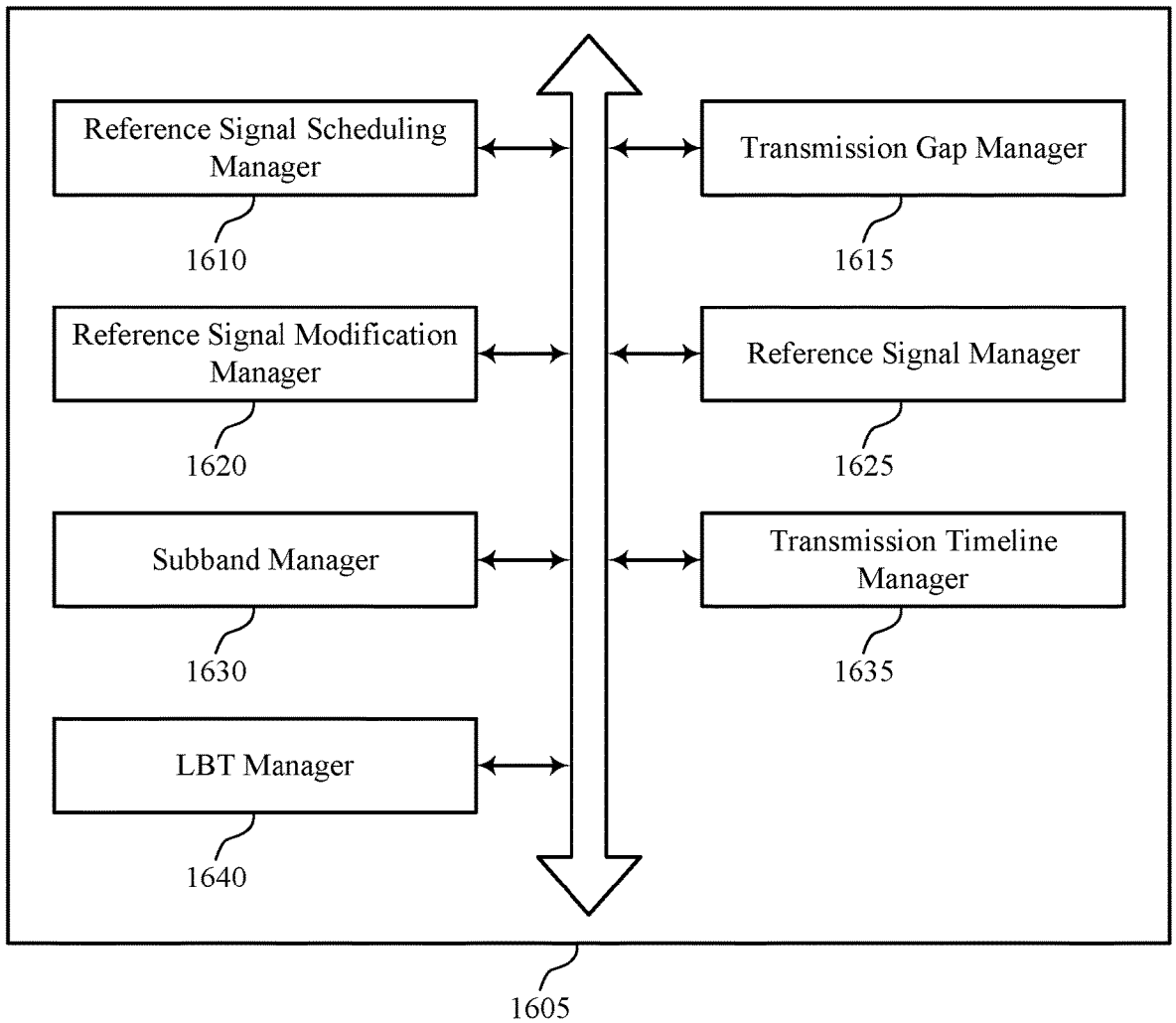
FIG. 16 shows a block diagram of a communications manager that supports SRS enhancements for unlicensed spectrum in accordance with aspects of the present disclosure.

FIG. 16 shows a block diagram 1600 of a communications manager 1605 that supports SRS enhancements for unlicensed spectrum in accordance with aspects of the present disclosure. The communications manager 1605 may be an example of aspects of a communications manager 1415, a communications manager 1515, or a communications manager 1710 described herein. The communications manager 1605 may include a reference signal scheduling manager 1610, a transmission gap manager 1615, a reference signal modification manager 1620, a reference signal manager 1625, a subband manager 1630, a transmission timeline manager 1635, and an LBT manager 1640. Each of these modules may communicate, directly or indirectly, with one another (e.g., via one or more buses).

The reference signal scheduling manager 1610 may transmit an SRS request to a UE, where the SRS request indicates scheduling of a first uplink reference signal transmission and a second uplink reference signal transmission for a shared radio frequency channel by the UE. In some aspects, the reference signal scheduling manager 1610 may transmit an SRS request in DCI scheduling at least the first uplink reference signal transmission, where the SRS request is transmitted based on the first type. In some aspects, the reference signal scheduling manager 1610 may identify scheduling of a third uplink reference signal transmission and a fourth uplink reference signal transmission for the shared radio frequency channel, where the SRS request indicates the scheduling of the first uplink reference signal transmission, the second uplink reference signal transmission, the third uplink reference signal transmission, and the fourth uplink reference signal transmission within a single slot.

In some aspects, transmitting the SRS request based on the first timing, where the indication includes at least one of the first timing and the second timing. In some aspects, transmitting DCI scheduling the first uplink reference signal transmission, where the DCI includes the indication of the one or more available subbands. In some cases, the first uplink reference signal transmission and the second uplink reference signal transmission are scheduled in a time period reserved by the base station for the shared radio frequency channel. In some cases, the DCI includes an indication canceling a second uplink reference signal transmission. In some cases, the DCI is transmitted during a first time period reserved by the base station for the shared radio frequency channel and the DCI includes an SRS resource set configuration for a second time period reserved by the base station for the shared radio frequency channel.

The transmission gap manager 1615 may identify a transmission gap between the first uplink reference signal transmission and the second uplink reference signal transmission. In some aspects, the transmission gap manager 1615 may identify a gap between a downlink transmission and the scheduled first uplink reference signal transmission based on the first type, where the first uplink reference signal transmission is scheduled based on the gap to indicate the first type. In some cases, the transmission gap is identified based on a subcarrier spacing configuration of the UE. In some cases, the transmission gap includes a number of symbols between the first uplink reference signal transmission and the second uplink reference signal transmission, the number of symbols based on the subcarrier spacing configuration of the UE.

The reference signal modification manager 1620 may determine a modification of at least one of the first uplink reference signal transmission or the second uplink reference signal transmission based on the identified transmission gap and a maximum channel vacancy time duration.

The reference signal manager 1625 may receive the first uplink reference signal transmission and the second uplink reference signal transmission. In some aspects, the reference signal manager 1625 may receive the first uplink reference signal transmission based on the indication of the one or more available subbands. In some aspects, the reference signal manager 1625 may receive the first uplink reference signal transmission based on the transmitted SRS request. In some aspects, the reference signal manager 1625 may receive the second uplink reference signal transmission based on a cyclic prefix of the second uplink reference signal transmission extended into the identified transmission gap, where a time duration between the first uplink reference signal transmission and the extended cyclic prefix of the second uplink reference signal transmission is less than the maximum channel vacancy time duration.

In some aspects, the reference signal manager 1625 may receive the first uplink reference signal transmission based on a postfix of the first uplink reference signal transmission extended into the identified transmission gap, where a time duration between the second uplink reference signal transmission and the postfix of the first uplink reference signal transmission is less than the maximum channel vacancy time duration. In some aspects, the reference signal manager 1625 may receive the first uplink reference signal transmission over a set of subbands including an intersection of the one or more configured subbands and the one or more available subbands. In some aspects, the reference signal manager 1625 may receive the first uplink reference signal transmission based on the punctured set of tones. In some aspects, the reference signal manager 1625 may receive the first uplink reference signal transmission based on the sequence length.

The subband manager 1630 may identify one or more subbands configured for a first uplink reference signal transmission by a UE in a shared radio frequency channel. In some aspects, the subband manager 1630 may identify one or more available subbands for transmission of the first uplink reference signal transmission. In some aspects, the subband manager 1630 may determine a difference between the configured one or more subbands and the one or more available subbands. In some aspects, the subband manager 1630 may transmit an indication of the one or more available subbands. In some aspects, the subband manager 1630 may transmit a group common physical downlink control channel message, where the group common physical downlink control channel message indicates the one or more available subbands. In some aspects, the subband manager 1630 may identify a set of punctured tones associated with the difference. In some aspects, the subband manager 1630 may identify a sequence length associated with the first uplink reference signal transmission based on the difference.

The LBT manager 1640 may identify a first type of a first LBT procedure for a UE transmission of a first uplink reference signal transmission for a shared radio frequency channel. In some aspects, the LBT manager 1640 may transmit a group common physical downlink control channel transmission indicating the first type. In some aspects, transmitting a grant for an uplink transmission, where the grant includes an indication of the first type. In some cases, the DCI indicates the first type. In some cases, the DCI includes a UE-specific indication of the first type, a UE group-specific indication of the first type, an SRS-specific indication of the first type, or a combination thereof. In some cases, the first type is indicated based on the SRS resource set configuration and the first uplink reference signal transmission is received during the second time period reserved by the base station for the shared radio frequency channel.

The transmission timeline manager 1635 may identify a first timing between the group common physical downlink control channel message and an SRS request based on the one or more available subbands. In some aspects, the transmission timeline manager 1635 may identify a second timing between the group common physical downlink control channel message and the first uplink reference signal transmission based on the one or more available subbands.

Figure 17:
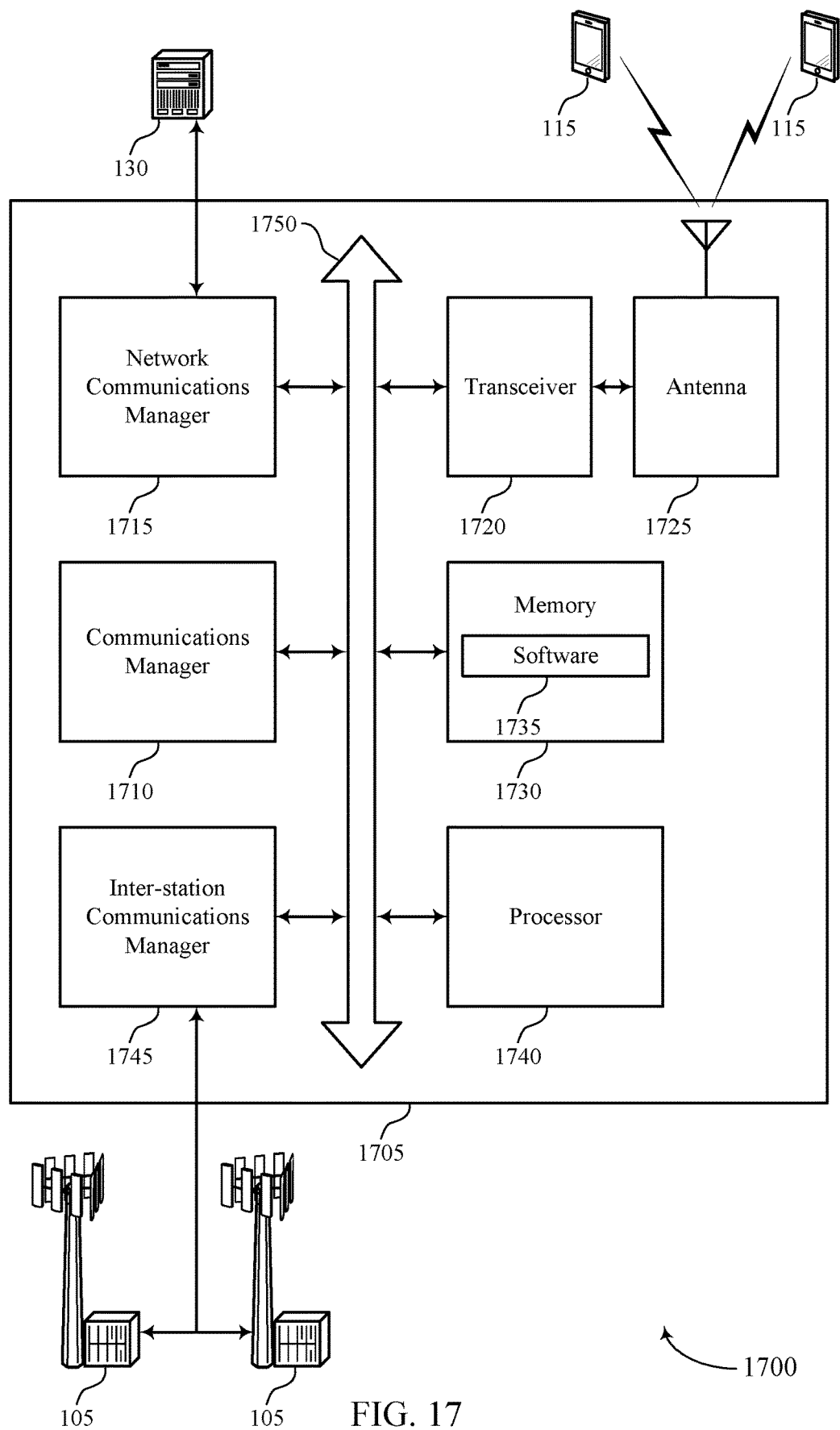
FIG. 17 shows a diagram of a system including a device that supports SRS enhancements for unlicensed spectrum in accordance with aspects of the present disclosure.

FIG. 17 shows a diagram of a system 1700 including a device 1705 that supports SRS enhancements for unlicensed spectrum in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit a SRS request to a UE, where the SRS request indicates scheduling of a first uplink reference signal transmission and a second uplink reference signal transmission for a shared radio frequency channel by the UE, identify a transmission gap between the first uplink reference signal transmission and the second uplink reference signal transmission, determine a modification of at least one of the first uplink reference signal transmission or the second uplink reference signal transmission based on the identified transmission gap and a maximum channel vacancy time duration, and receive the first uplink reference signal transmission and the second uplink reference signal transmission.

The communications manager 1710 may also identify one or more subbands configured for a first uplink reference signal transmission by a UE in a shared radio frequency channel, identify one or more available subbands for transmission of the first uplink reference signal transmission, transmit an indication of the one or more available subbands, determine a difference between the configured one or more subbands and the one or more available subbands, and receive the first uplink reference signal transmission based on the indication of the one or more available subbands.

The communications manager 1710 may also identify a first type of a first LBT procedure for a UE transmission of a first uplink reference signal transmission for a shared radio frequency channel, transmit an SRS request in DCI scheduling at least the first uplink reference signal transmission, where the SRS request is transmitted based on the first type, and receive the first uplink reference signal transmission based on the transmitted SRS request.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1625. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code or software 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting SRS enhancements for unlicensed spectrum).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some aspects, the inter-station communications manager 1745 may provide an X2 interface within an LTE/LTE-A wireless communication network technology to provide communication between base stations 105.

The software 1735 may include instructions to implement aspects of the present disclosure, including instructions to support wireless communications. The software 1735 may be stored in a non-transitory computer-readable medium such as system memory or other type of memory. In some cases, the software 1735 may not be directly executable by the processor 1740 but may cause a computer (e.g., when compiled and executed) to perform functions described herein.

Figure 18:
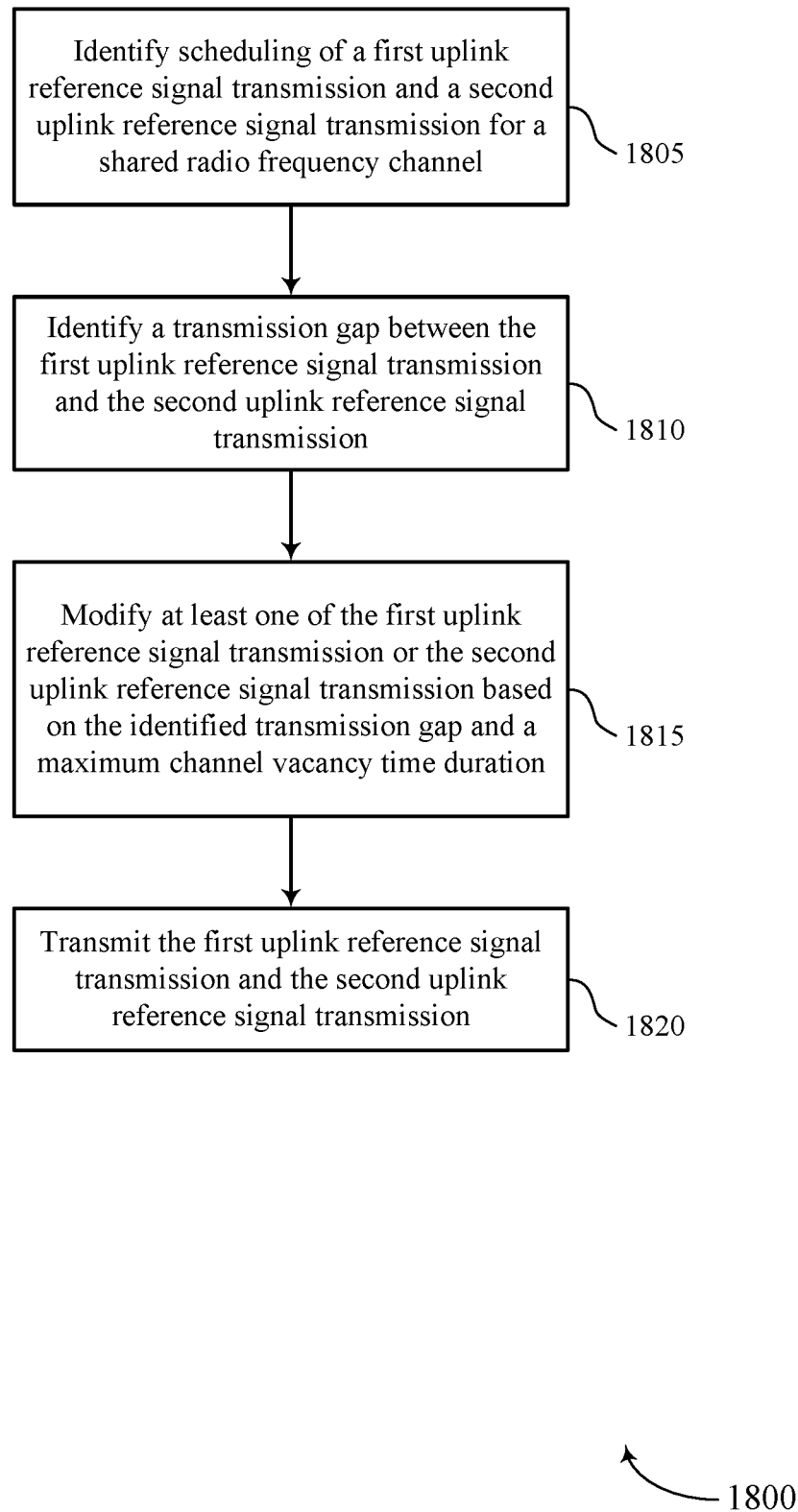
FIGS. 18 through 24 show flowcharts illustrating methods that support SRS enhancements for unlicensed spectrum in accordance with aspects of the present disclosure.

FIG. 18 shows a flowchart illustrating a method 1800 that supports SRS enhancements for unlicensed spectrum in accordance with aspects of the present disclosure. The operations of method 1800 may be implemented by a UE 115 or its components as described herein. For example, the operations of method 1800 may be performed by a communications manager as described with reference to FIGS. 10 through 13. In some aspects, a UE may execute a set of instructions to control the functional elements of the UE to perform the functions described below. Additionally or alternatively, a UE may perform aspects of the functions described below using special-purpose hardware.

At 1805, the UE may identify scheduling of a first uplink reference signal transmission and a second uplink reference signal transmission for a shared radio frequency channel. The operations of 1805 may be performed according to the methods described herein. In some aspects, aspects of the operations of 1805 may be performed by a reference signal scheduling manager as described with reference to FIGS. 10 through 13.

At 1810, the UE may identify a transmission gap between the first uplink reference signal transmission and the second uplink reference signal transmission. The operations of 1810 may be performed according to the methods described herein. In some aspects, aspects of the operations of 1810 may be performed by a transmission gap manager as described with reference to FIGS. 10 through 13.

At 1815, the UE may modify at least one of the first uplink reference signal transmission or the second uplink reference signal transmission based on the identified transmission gap and a maximum channel vacancy time duration. The operations of 1815 may be performed according to the methods described herein. In some aspects, aspects of the operations of 1815 may be performed by a reference signal modification manager as described with reference to FIGS. 10 through 13.

At 1820, the UE may transmit the first uplink reference signal transmission and the second uplink reference signal transmission. The operations of 1820 may be performed according to the methods described herein. In some aspects, aspects of the operations of 1820 may be performed by a reference signal manager as described with reference to FIGS. 10 through 13.

Figure 19:
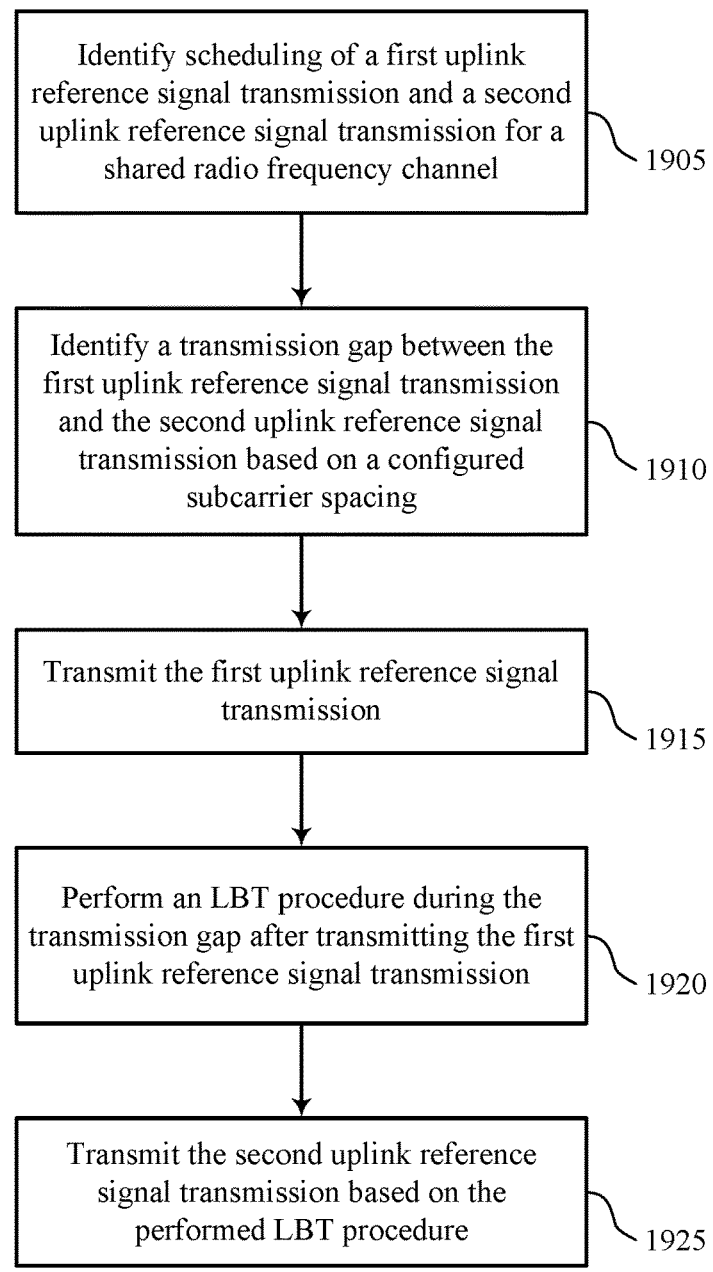

FIG. 19 shows a flowchart illustrating a method 1900 that supports SRS enhancements for unlicensed spectrum in accordance with aspects of the present disclosure. The operations of method 1900 may be implemented by a UE 115 or its components as described herein. For example, the operations of method 1900 may be performed by a communications manager as described with reference to FIGS. 10 through 13. In some aspects, a UE may execute a set of instructions to control the functional elements of the UE to perform the functions described below. Additionally or alternatively, a UE may perform aspects of the functions described below using special-purpose hardware.

At 1905, the UE may identify scheduling of a first uplink reference signal transmission and a second uplink reference signal transmission for a shared radio frequency channel. The operations of 1905 may be performed according to the methods described herein. In some aspects, aspects of the operations of 1905 may be performed by a reference signal scheduling manager as described with reference to FIGS. 10 through 13.

At 1910, the UE may identify a transmission gap between the first uplink reference signal transmission and the second uplink reference signal transmission based on a configured subcarrier spacing. The operations of 1910 may be performed according to the methods described herein. In some aspects, aspects of the operations of 1910 may be performed by a transmission gap manager as described with reference to FIGS. 10 through 13.

At 1915, the UE may transmit the first uplink reference signal transmission. The operations of 1915 may be performed according to the methods described herein. In some aspects, aspects of the operations of 1915 may be performed by a reference signal manager as described with reference to FIGS. 10 through 13.

At 1920, the UE may perform an LBT procedure during the transmission gap after transmitting the first uplink reference signal transmission. The operations of 1920 may be performed according to the methods described herein. In some aspects, aspects of the operations of 1920 may be performed by an LBT manager as described with reference to FIGS. 10 through 13.

At 1925, the UE may transmit the second uplink reference signal transmission based on the performed LBT procedure. The operations of 1925 may be performed according to the methods described herein. In some aspects, aspects of the operations of 1925 may be performed by a reference signal manager as described with reference to FIGS. 10 through 13.

Figure 20:
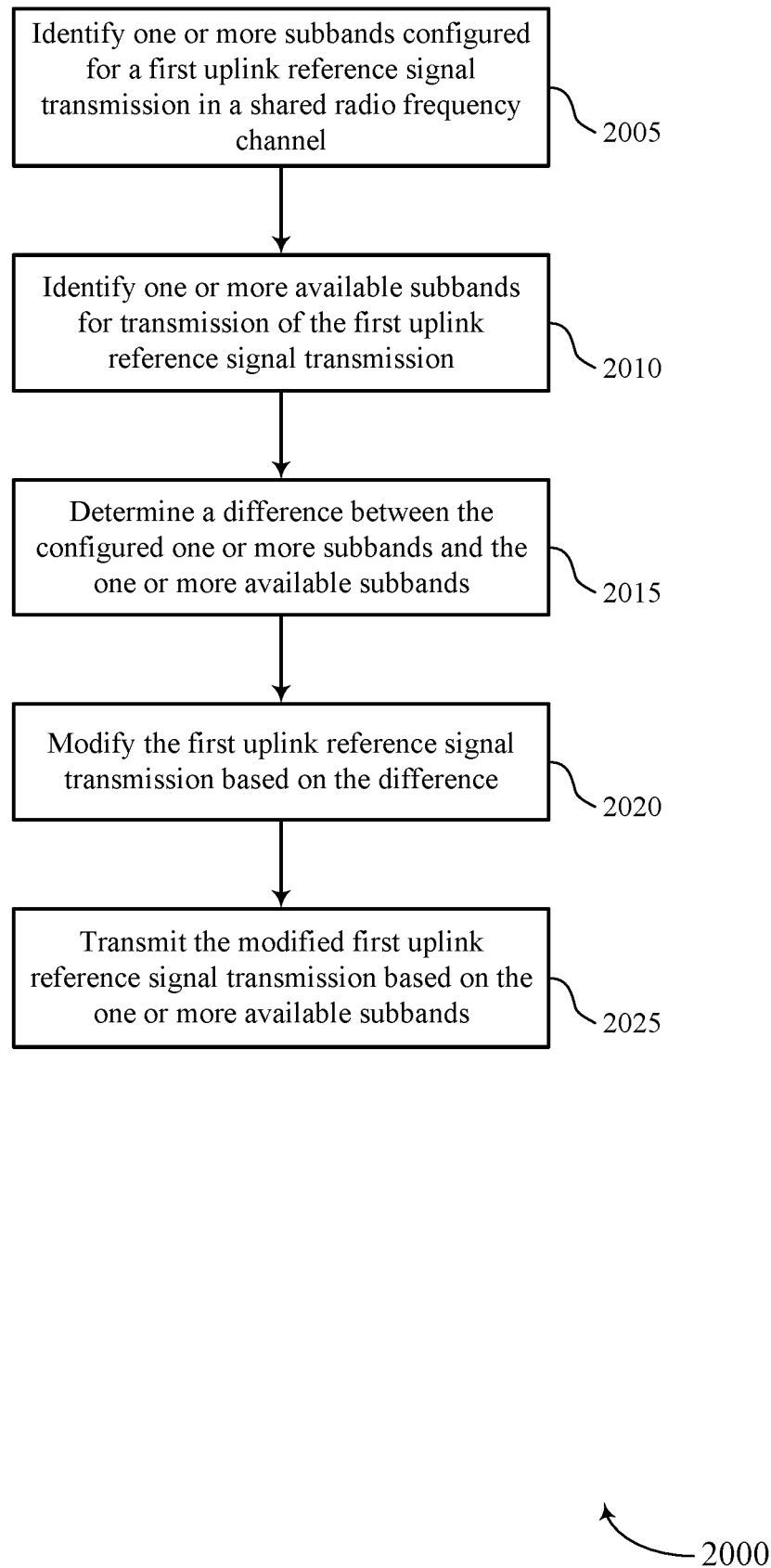

FIG. 20 shows a flowchart illustrating a method 2000 that supports SRS enhancements for unlicensed spectrum in accordance with aspects of the present disclosure. The operations of method 2000 may be implemented by a UE 115 or its components as described herein. For example, the operations of method 2000 may be performed by a communications manager as described with reference to FIGS. 10 through 13. In some aspects, a UE may execute a set of instructions to control the functional elements of the UE to perform the functions described below. Additionally or alternatively, a UE may perform aspects of the functions described below using special-purpose hardware.

At 2005, the UE may identify one or more subbands configured for a first uplink reference signal transmission in a shared radio frequency channel. The operations of 2005 may be performed according to the methods described herein. In some aspects, aspects of the operations of 2005 may be performed by a subband manager as described with reference to FIGS. 10 through 13.

At 2010, the UE may identify one or more available subbands for transmission of the first uplink reference signal transmission. The operations of 2010 may be performed according to the methods described herein. In some aspects, aspects of the operations of 2010 may be performed by a subband manager as described with reference to FIGS. 10 through 13.

At 2015, the UE may determine a difference between the configured one or more subbands and the one or more available subbands. The operations of 2015 may be performed according to the methods described herein. In some aspects, aspects of the operations of 2015 may be performed by a subband manager as described with reference to FIGS. 10 through 13.

At 2020, the UE may modify the first uplink reference signal transmission based on the difference. The operations of 2020 may be performed according to the methods described herein. In some aspects, aspects of the operations of 2020 may be performed by a reference signal modification manager as described with reference to FIGS. 10 through 13.

At 2025, the UE may transmit the modified first uplink reference signal transmission based on the one or more available subbands. The operations of 2025 may be performed according to the methods described herein. In some aspects, aspects of the operations of 2025 may be performed by a reference signal manager as described with reference to FIGS. 10 through 13.

Figure 21:
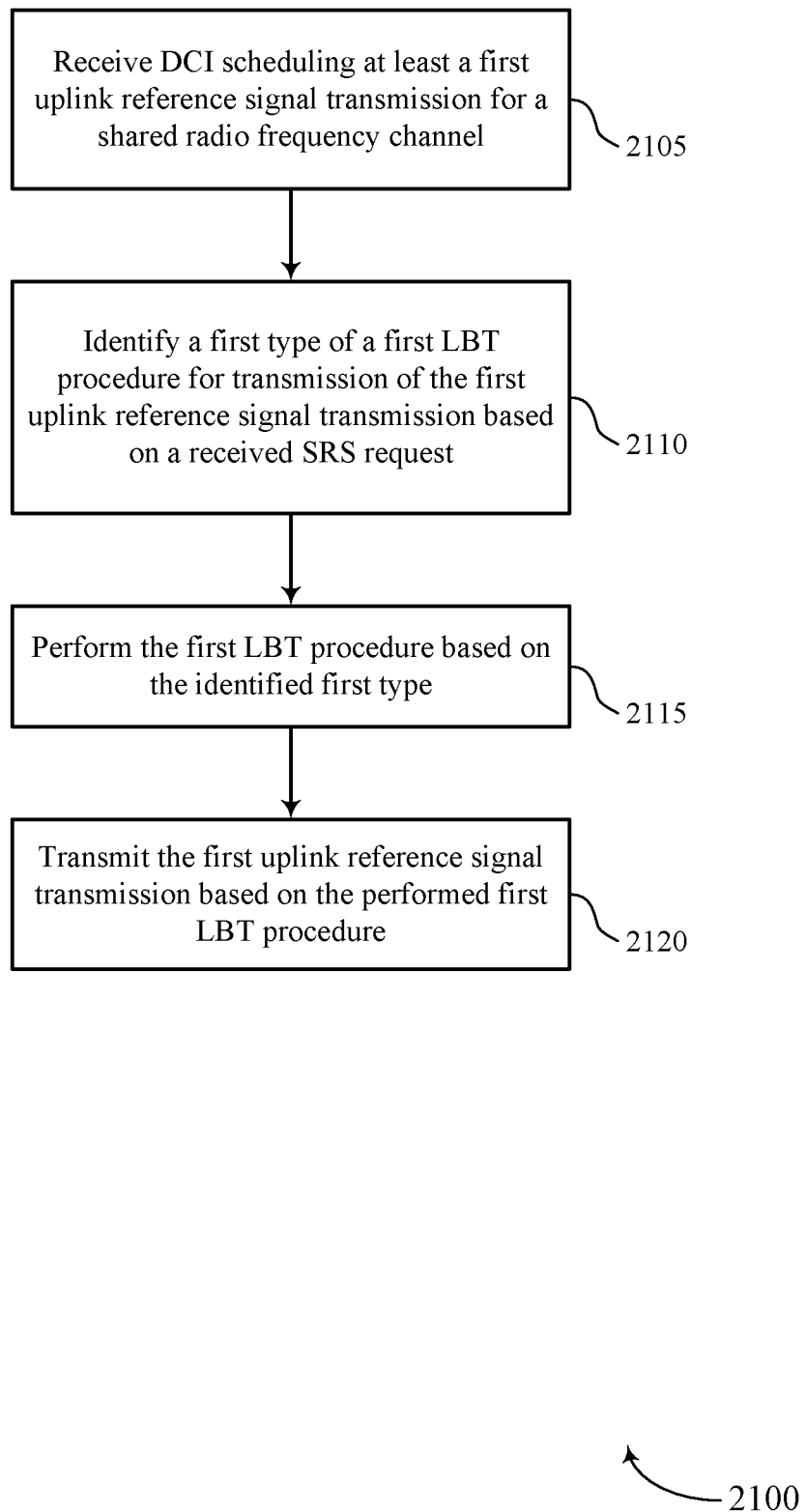

FIG. 21 shows a flowchart illustrating a method 2100 that supports SRS enhancements for unlicensed spectrum in accordance with aspects of the present disclosure. The operations of method 2100 may be implemented by a UE 115 or its components as described herein. For example, the operations of method 2100 may be performed by a communications manager as described with reference to FIGS. 10 through 13. In some aspects, a UE may execute a set of instructions to control the functional elements of the UE to perform the functions described below. Additionally or alternatively, a UE may perform aspects of the functions described below using special-purpose hardware.

At 2105, the UE may receive DCI scheduling at least a first uplink reference signal transmission for a shared radio frequency channel. The operations of 2105 may be performed according to the methods described herein. In some aspects, aspects of the operations of 2105 may be performed by a reference signal scheduling manager as described with reference to FIGS. 10 through 13.

At 2110, the UE may identify a first type of a first LBT procedure for transmission of the first uplink reference signal transmission based on the received SRS request. The operations of 2110 may be performed according to the methods described herein. In some aspects, aspects of the operations of 2110 may be performed by an LBT manager as described with reference to FIGS. 10 through 13.

At 2115, the UE may perform the first LBT procedure based on the identified first type. The operations of 2115 may be performed according to the methods described herein. In some aspects, aspects of the operations of 2115 may be performed by an LBT manager as described with reference to FIGS. 10 through 13.

At 2120, the UE may transmit the first uplink reference signal transmission based on the performed first LBT procedure. The operations of 2120 may be performed according to the methods described herein. In some aspects, aspects of the operations of 2120 may be performed by a reference signal manager as described with reference to FIGS. 10 through 13.

Figure 22:
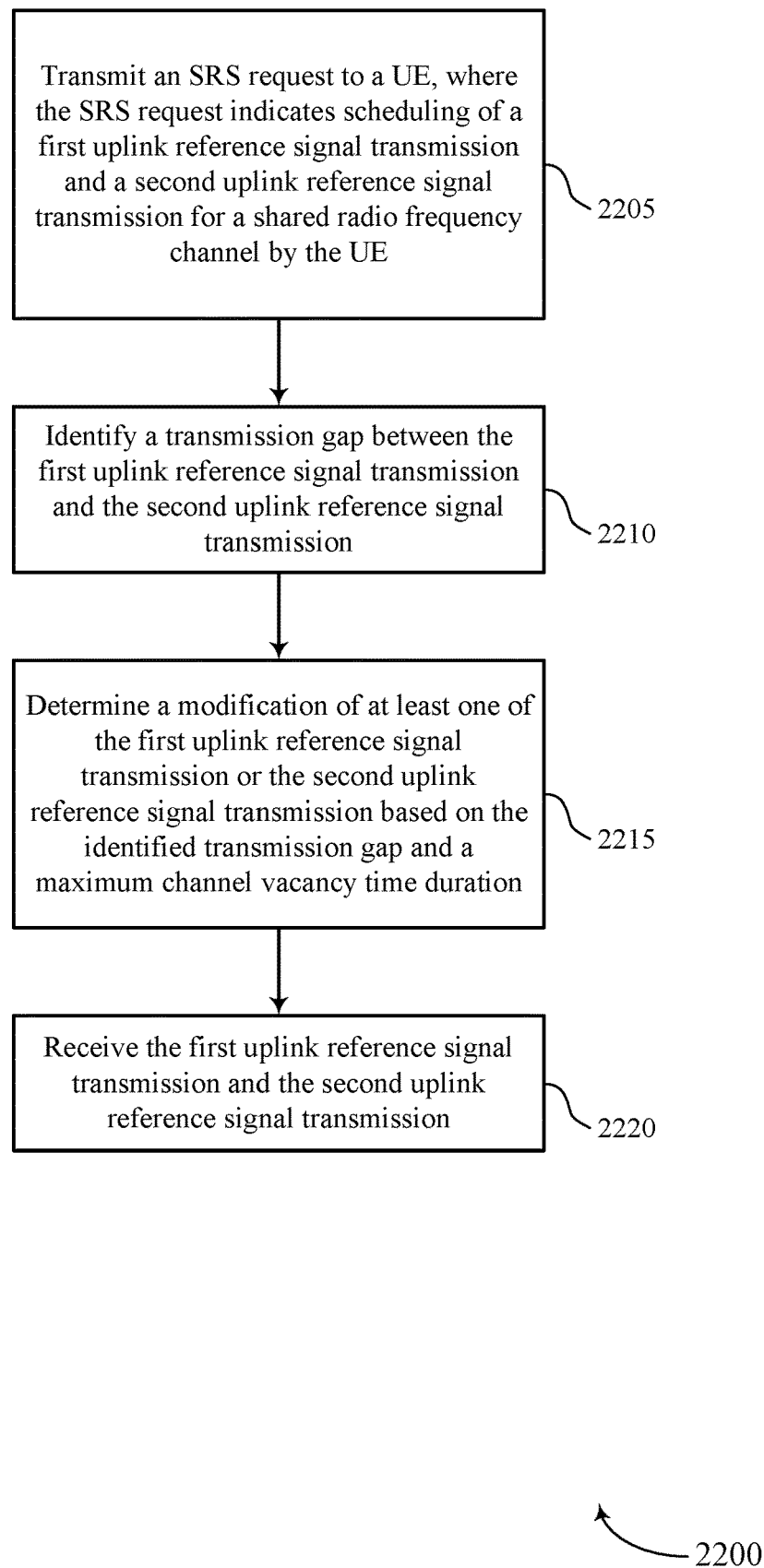

FIG. 22 shows a flowchart illustrating a method 2200 that supports SRS enhancements for unlicensed spectrum in accordance with aspects of the present disclosure. The operations of method 2200 may be implemented by a base station 105 or its components as described herein. For example, the operations of method 2200 may be performed by a communications manager as described with reference to FIGS. 14 through 17. In some aspects, a base station may execute a set of instructions to control the functional elements of the base station to perform the functions described below. Additionally or alternatively, a base station may perform aspects of the functions described below using special-purpose hardware.

At 2205, the base station may transmit an SRS request to a UE, where the SRS request indicates scheduling of a first uplink reference signal transmission and a second uplink reference signal transmission for a shared radio frequency channel by the UE. The operations of 2205 may be performed according to the methods described herein. In some aspects, aspects of the operations of 2205 may be performed by a reference signal scheduling manager as described with reference to FIGS. 14 through 17.

At 2210, the base station may identify a transmission gap between the first uplink reference signal transmission and the second uplink reference signal transmission. The operations of 2210 may be performed according to the methods described herein. In some aspects, aspects of the operations of 2210 may be performed by a transmission gap manager as described with reference to FIGS. 14 through 17.

At 2215, the base station may determine a modification of at least one of the first uplink reference signal transmission or the second uplink reference signal transmission based on the identified transmission gap and a maximum channel vacancy time duration. The operations of 2215 may be performed according to the methods described herein. In some aspects, aspects of the operations of 2215 may be performed by a reference signal modification manager as described with reference to FIGS. 14 through 17.

At 2220, the base station may receive the first uplink reference signal transmission and the second uplink reference signal transmission. The operations of 2220 may be performed according to the methods described herein. In some aspects, aspects of the operations of 2220 may be performed by a reference signal manager as described with reference to FIGS. 14 through 17.

Figure 23:
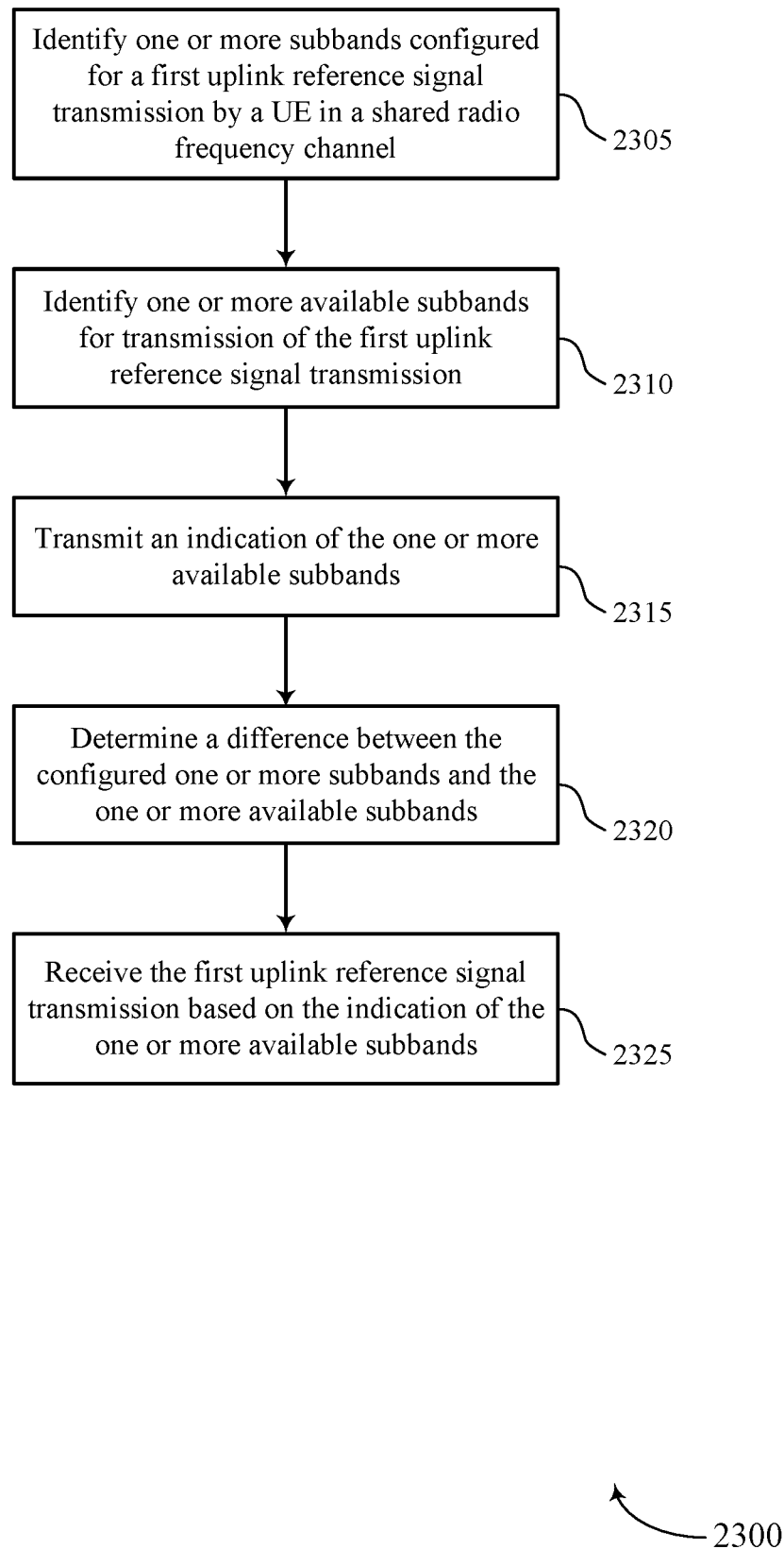

FIG. 23 shows a flowchart illustrating a method 2300 that supports SRS enhancements for unlicensed spectrum in accordance with aspects of the present disclosure. The operations of method 2300 may be implemented by a base station 105 or its components as described herein. For example, the operations of method 2300 may be performed by a communications manager as described with reference to FIGS. 14 through 17. In some aspects, a base station may execute a set of instructions to control the functional elements of the base station to perform the functions described below. Additionally or alternatively, a base station may perform aspects of the functions described below using special-purpose hardware.

At 2305, the base station may identify one or more subbands configured for a first uplink reference signal transmission by a UE in a shared radio frequency channel. The operations of 2305 may be performed according to the methods described herein. In some aspects, aspects of the operations of 2305 may be performed by a subband manager as described with reference to FIGS. 14 through 17.

At 2310, the base station may identify one or more available subbands for transmission of the first uplink reference signal transmission. The operations of 2310 may be performed according to the methods described herein. In some aspects, aspects of the operations of 2310 may be performed by a subband manager as described with reference to FIGS. 14 through 17.

At 2315, the base station may transmit an indication of the one or more available subbands. The operations of 2315 may be performed according to the methods described herein. In some aspects, aspects of the operations of 2315 may be performed by a subband manager as described with reference to FIGS. 14 through 17.

At 2320, the base station may determine a difference between the configured one or more subbands and the one or more available subbands. The operations of 2320 may be performed according to the methods described herein. In some aspects, aspects of the operations of 2320 may be performed by a subband manager as described with reference to FIGS. 14 through 17.

At 2325, the base station may receive the first uplink reference signal transmission based on the indication of the one or more available subbands. The operations of 2325 may be performed according to the methods described herein. In some aspects, aspects of the operations of 2325 may be performed by a reference signal manager as described with reference to FIGS. 14 through 17.

Figure 24:
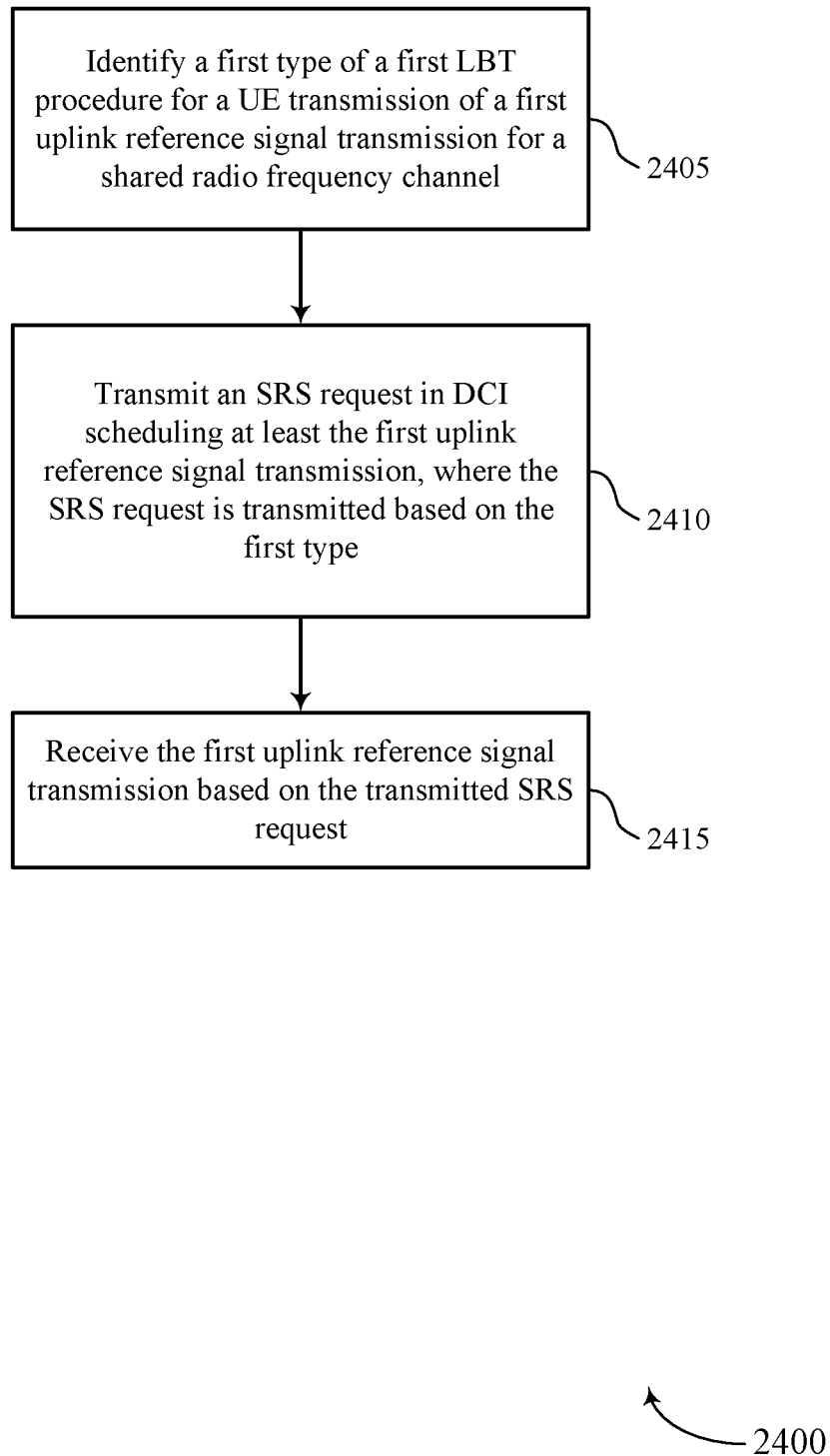

FIG. 24 shows a flowchart illustrating a method 2400 that supports SRS enhancements for unlicensed spectrum in accordance with aspects of the present disclosure. The operations of method 2400 may be implemented by a base station 105 or its components as described herein. For example, the operations of method 2400 may be performed by a communications manager as described with reference to FIGS. 14 through 17. In some aspects, a base station may execute a set of instructions to control the functional elements of the base station to perform the functions described below. Additionally or alternatively, a base station may perform aspects of the functions described below using special-purpose hardware.

At 2405, the base station may identify a first type of a first LBT procedure for a UE transmission of a first uplink reference signal transmission for a shared radio frequency channel. The operations of 2405 may be performed according to the methods described herein. In some aspects, aspects of the operations of 2405 may be performed by an LBT manager as described with reference to FIGS. 14 through 17.

At 2410, the base station may transmit an SRS request in DCI scheduling at least the first uplink reference signal transmission, where the SRS request is transmitted based on the first type. The operations of 2410 may be performed according to the methods described herein. In some aspects, aspects of the operations of 2410 may be performed by a reference signal scheduling manager as described with reference to FIGS. 14 through 17.

At 2415, the base station may receive the first uplink reference signal transmission based on the transmitted SRS request. The operations of 2415 may be performed according to the methods described herein. In some aspects, aspects of the operations of 2415 may be performed by a reference signal manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying scheduling of a first uplink reference signal transmission and a second uplink reference signal transmission for a shared radio frequency channel;
   identifying a transmission gap between a first set of scheduled resources for the first uplink reference signal transmission and a second set of scheduled resources for the second uplink reference signal transmission;
   modifying a timing relationship of the first uplink reference signal transmission relative to the first set of scheduled resources or of the second uplink reference signal transmission relative to the second set of scheduled resources based at least in part on the identified transmission gap, an antenna switching time, and a maximum channel vacancy time duration; and
   transmitting the first uplink reference signal transmission and the second uplink reference signal transmission.

2. The method of claim 1, wherein modifying the timing relationship of the first uplink reference signal transmission relative to the first set of scheduled resources or the second uplink reference signal transmission relative to the second set of scheduled resources comprises:
   extending a cyclic prefix of the second uplink reference signal transmission into the identified transmission gap, wherein a time duration between the first uplink reference signal transmission and the extended cyclic prefix of the second uplink reference signal transmission is less than the maximum channel vacancy time duration.

3. The method of claim 1, wherein modifying the timing relationship of the first uplink reference signal transmission relative to the first set of scheduled resources or the second uplink reference signal transmission relative to the second set of scheduled resources comprises:
   adding a postfix to the first uplink reference signal transmission during the identified transmission gap, wherein a time duration between the postfix of the first uplink reference signal transmission and the second uplink reference signal transmission is less than the maximum channel vacancy time duration.

4. The method of claim 1, wherein the first uplink reference signal transmission and the second uplink reference signal transmission are scheduled in a time period reserved by a base station for the shared radio frequency channel.

5. The method of claim 1, wherein transmitting the modified first uplink reference signal transmission and the modified second uplink reference signal transmission comprises:
transmitting the modified first uplink reference signal transmission via a first antenna;
switching a transmission path from the first antenna to a second antenna after transmitting the modified first uplink reference signal transmission; and
transmitting the modified second uplink reference signal transmission via the second antenna.

6. The method of claim 1, further comprising:
identifying scheduling of a third uplink reference signal transmission and a fourth uplink reference signal transmission, wherein the first, second, third, and fourth uplink reference signal transmissions are scheduled to be within a single slot.

7. An apparatus for wireless communication at a user equipment (UE), comprising:
a processor; and
memory coupled with the processor, the memory comprising instructions executable by the processor to cause the apparatus to:
identify scheduling of a first uplink reference signal transmission and a second uplink reference signal transmission for a shared radio frequency channel;
identify a transmission gap between a first set of scheduled resources for the first uplink reference signal transmission and a second set of scheduled resources for the second uplink reference signal transmission;
modify a timing relationship of the first uplink reference signal transmission relative to the first set of scheduled resources or the second uplink reference signal transmission relative to the second set of scheduled resources based at least in part on the identified transmission gap, an antenna switching time, and a maximum channel vacancy time duration; and
transmit the first uplink reference signal transmission and the second uplink reference signal transmission.

8. The apparatus of claim 7, wherein the instructions to modify the timing relationship of the first uplink reference signal transmission relative to the first set of scheduled resources or the second uplink reference signal transmission relative to the second set of scheduled resources are executable by the processor to cause the apparatus to:
extend a cyclic prefix of the second uplink reference signal transmission into the identified transmission gap, wherein a time duration between the first uplink reference signal transmission and the extended cyclic prefix of the second uplink reference signal transmission is less than the maximum channel vacancy time duration.

9. The apparatus of claim 7, wherein the instructions to modify the timing relationship of the first uplink reference signal transmission relative to the first set of scheduled resources or the second uplink reference signal transmission relative to the second set of scheduled resources are executable by the processor to cause the apparatus to:
add a postfix to the first uplink reference signal transmission during the identified transmission gap, wherein a time duration between the postfix of the first uplink reference signal transmission and the second uplink reference signal transmission is less than the maximum channel vacancy time duration.

10. The apparatus of claim 7, wherein the first uplink reference signal transmission and the second uplink reference signal transmission are scheduled in a time period reserved by a base station for the shared radio frequency channel.

11. The apparatus of claim 7, wherein the instructions to transmit the modified first uplink reference signal transmission and the modified second uplink reference signal transmission are executable by the processor to cause the apparatus to:
transmit the modified first uplink reference signal transmission via a first antenna;
switch a transmission path from the first antenna to a second antenna after transmitting the modified first uplink reference signal transmission; and
transmit the modified second uplink reference signal transmission via the second antenna.

12. The apparatus of claim 7, wherein the instructions are further executable by the processor to cause the apparatus to:
identify scheduling of a third uplink reference signal transmission and a fourth uplink reference signal transmission, wherein the first, second, third, and fourth uplink reference signal transmissions are scheduled to be within a single slot.

13. A method for wireless communication at a base station, comprising:
transmitting a sounding reference signal request to a user equipment (UE), wherein the sounding reference signal request indicates scheduling of a first uplink reference signal transmission and a second uplink reference signal transmission for a shared radio frequency channel by the UE;
identifying a transmission gap between a first set of scheduled resources for the first uplink reference signal transmission and a second set of scheduled resources for the second uplink reference signal transmission;
determining a modification of a timing relationship of the first uplink reference signal transmission relative to the first set of scheduled resources or the second uplink reference signal transmission relative to the second set of scheduled resources based at least in part on the identified transmission gap, an antenna switching time, and a maximum channel vacancy time duration; and
receiving the first uplink reference signal transmission and the second uplink reference signal transmission.

14. The method of claim 13, wherein receiving the first uplink reference signal transmission and the second uplink reference signal transmission comprises:
receiving the second uplink reference signal transmission based at least in part on a cyclic prefix of the second uplink reference signal transmission extended into the identified transmission gap, wherein a time duration between the first uplink reference signal transmission and the extended cyclic prefix of the second uplink reference signal transmission is less than the maximum channel vacancy time duration.

15. The method of claim 13, wherein receiving the first uplink reference signal transmission and the second uplink reference signal transmission comprises:
receiving the first uplink reference signal transmission based at least in part on a postfix of the first uplink reference signal transmission extended into the identified transmission gap, wherein a time duration between the second uplink reference signal transmission and the postfix of the first uplink reference signal transmission is less than the maximum channel vacancy time duration.

16. The method of claim 13, wherein the first uplink reference signal transmission and the second uplink reference signal transmission are scheduled in a time period reserved by the base station for the shared radio frequency channel.

17. The method of claim 13, further comprising:
identifying scheduling of a third uplink reference signal transmission and a fourth uplink reference signal transmission for the shared radio frequency channel, wherein the sounding reference signal request indicates the scheduling of the first uplink reference signal transmission, the second uplink reference signal transmission, the third uplink reference signal transmission, and the fourth uplink reference signal transmission within a single slot.

18. The method of claim 13, wherein the transmission gap is identified based at least in part on a subcarrier spacing configuration of the UE.

19. The method of claim 18, wherein the transmission gap comprises a number of symbols between the first uplink reference signal transmission and the second uplink reference signal transmission, the number of symbols based at least in part on the subcarrier spacing configuration of the UE.

20. An apparatus for wireless communication at a base station, comprising:
a processor; and
memory coupled with the processor, the memory comprising instructions executable by the processor to cause the apparatus to:
transmit a sounding reference signal request to a user equipment (UE), wherein the sounding reference signal request indicates scheduling of a first uplink reference signal transmission and a second uplink reference signal transmission for a shared radio frequency channel by the UE;
identify a transmission gap between a first set of scheduled resources for the first uplink reference signal transmission and a second set of scheduled resources for the second uplink reference signal transmission;
determine a modification of a timing relationship of the first uplink reference signal transmission relative to the first set of scheduled resources or the second uplink reference signal transmission relative to the second set of scheduled resources based at least in part on the identified transmission gap, an antenna switching time, and a maximum channel vacancy time duration; and
receive the first uplink reference signal transmission and the second uplink reference signal transmission.

21. The apparatus of claim 20, wherein the instructions to receive the first uplink reference signal transmission and the second uplink reference signal transmission are executable by the processor to cause the apparatus to:
receive the second uplink reference signal transmission based at least in part on a cyclic prefix of the second uplink reference signal transmission extended into the identified transmission gap, wherein a time duration between the first uplink reference signal transmission and the extended cyclic prefix of the second uplink reference signal transmission is less than the maximum channel vacancy time duration.

22. The apparatus of claim 20, wherein the instructions to receive the first uplink reference signal transmission and the second uplink reference signal transmission are executable by the processor to cause the apparatus to:
receive the first uplink reference signal transmission based at least in part on a postfix of the first uplink reference signal transmission extended into the identified transmission gap, wherein a time duration between the second uplink reference signal transmission and the postfix of the first uplink reference signal transmission is less than the maximum channel vacancy time duration.

23. The apparatus of claim 20, wherein the first uplink reference signal transmission and the second uplink reference signal transmission are scheduled in a time period reserved by the base station for the shared radio frequency channel.

24. The apparatus of claim 20, wherein the instructions are further executable by the processor to cause the apparatus to:
identify scheduling of a third uplink reference signal transmission and a fourth uplink reference signal transmission for the shared radio frequency channel, wherein the sounding reference signal request indicates the scheduling of the first uplink reference signal transmission, the second uplink reference signal transmission, the third uplink reference signal transmission, and the fourth uplink reference signal transmission within a single slot.

25. The apparatus of claim 20, wherein the transmission gap is identified based at least in part on a subcarrier spacing configuration of the UE.

26. The apparatus of claim 25, wherein the transmission gap comprises a number of symbols between the first uplink reference signal transmission and the second uplink reference signal transmission, the number of symbols based at least in part on the subcarrier spacing configuration of the UE.

* * * * *